(12) United States Patent
Bornfreedom et al.

(10) Patent No.: US 10,503,979 B2
(45) Date of Patent: Dec. 10, 2019

(54) VIDEO-RELATED SYSTEM, METHOD AND DEVICE

(71) Applicants: Power P. Bornfreedom, Syracuse, NY (US); Renato Smith-Bornfreedom, Syracuse, NY (US)

(72) Inventors: Power P. Bornfreedom, Syracuse, NY (US); Renato Smith-Bornfreedom, Syracuse, NY (US)

( * ) Notice: Subject to any disclaimer, the term of this patent is extended or adjusted under 35 U.S.C. 154(b) by 10 days.

(21) Appl. No.: 15/855,275

(22) Filed: Dec. 27, 2017

(65) Prior Publication Data

US 2019/0197316 A1    Jun. 27, 2019

(51) Int. Cl.
| | |
|---|---|
| G11B 27/34 | (2006.01) |
| H04N 21/435 | (2011.01) |
| H04N 21/8549 | (2011.01) |
| G11B 27/031 | (2006.01) |
| G06K 9/00 | (2006.01) |
| H04N 21/433 | (2011.01) |
| H04N 21/472 | (2011.01) |
| G06F 16/78 | (2019.01) |

(52) U.S. Cl.
CPC ..... *G06K 9/00751* (2013.01); *G06F 16/7867* (2019.01); *G11B 27/031* (2013.01); *G11B 27/34* (2013.01); *H04N 21/435* (2013.01); *H04N 21/4334* (2013.01); *H04N 21/47205* (2013.01); *H04N 21/8549* (2013.01)

(58) Field of Classification Search
CPC .......... H04N 21/435; H04N 21/8549; H04N 21/47205; H04N 21/4334; G11B 27/34; G11B 27/031; G06F 16/7867
See application file for complete search history.

(56) References Cited

U.S. PATENT DOCUMENTS

| | | | |
|---|---|---|---|
| 8,731,458 B2 | 5/2014 | Sullivan | |
| 9,202,526 B2 | 12/2015 | Hohteri | |
| 9,641,566 B1* | 5/2017 | Hiremath | H04N 21/4334 |
| 2006/0171515 A1* | 8/2006 | Hintermeister | G06Q 10/10 |
| | | | 379/110.01 |
| 2012/0064956 A1 | 3/2012 | Das | |
| 2015/0181301 A1* | 6/2015 | Bloch | H04N 21/47217 |
| | | | 725/41 |
| 2015/0318020 A1 | 11/2015 | Pribula | |

(Continued)

FOREIGN PATENT DOCUMENTS

WO    WO/2016/200692 A1    12/2016

OTHER PUBLICATIONS

The GivitVideo, YouTube, May 24, 2013 [online.], pp. 1-5, Retrieved from the Internet: https://www.youtube.com/watch?v=7cWu0GHOrSo.

(Continued)

*Primary Examiner* — Thai Q Tran
*Assistant Examiner* — Jose M Mesa

(57) ABSTRACT

A video-related method, system and device are disclosed herein. The method, system and device relate to videos and information of participants in events. The method, system and device, in an embodiment, involve receiving a plurality of clip inputs during a recording session that results in a video, receiving at least one descriptor of a participant, and enabling an interface to display the video in response to a search that is based, at least in part, on the descriptor.

20 Claims, 67 Drawing Sheets

(56) References Cited

U.S. PATENT DOCUMENTS

| | | |
|---|---|---|
| 2015/0348588 A1 | 12/2015 | Voss |
| 2016/0012857 A1* | 1/2016 | Leppanen .............. G11B 27/32 386/241 |
| 2016/0049173 A1 | 2/2016 | Anderson |
| 2016/0133295 A1 | 5/2016 | Boyle |
| 2016/0365116 A1 | 12/2016 | Galant |
| 2016/0365122 A1 | 12/2016 | Steinberg |
| 2017/0024614 A1 | 1/2017 | Sanil |
| 2017/0109008 A1* | 4/2017 | Darby ................. G06F 3/03545 |
| 2017/0110151 A1 | 4/2017 | Matias |

OTHER PUBLICATIONS

Too Much Tape? Highlight Hunter Finds Your Best Clips, Cuts Video Editing by 80%, TechCrunch, Aug. 19, 2017 [online], pp. 1-11, https://techcrunch.com/2012/04/02/highlight-hunter-launch/.

Create Instant Video Highlight Reels With Givit for iPhone, Marketwire, Oct. 2, 2012 [online], pp. 1-3,, https://www.yahoo.com/news/create-instant-video-highlight-reels-040100004.html.

YouTube, Dec. 26, 2017 [online], pp. 1-3, https://www.youtube.com/results?search_query=top+17+year+old+high+school+girl+basketball+players+in+cleveland%2C+ohio.

* cited by examiner

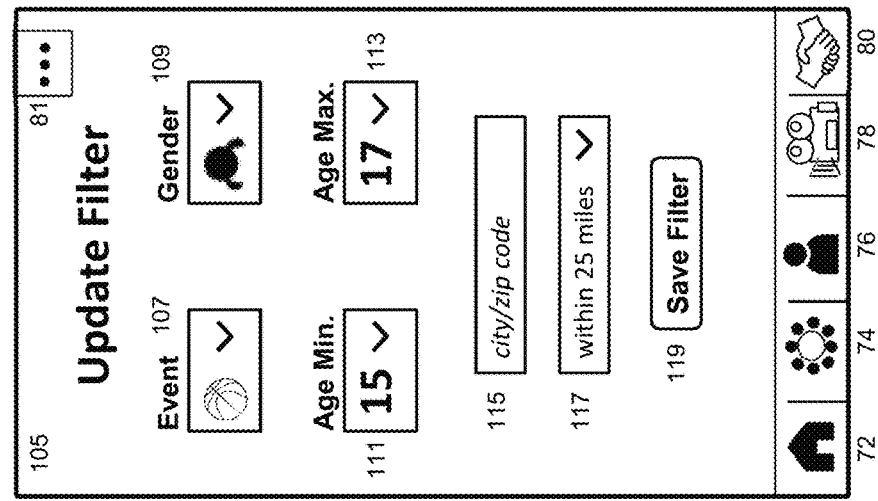
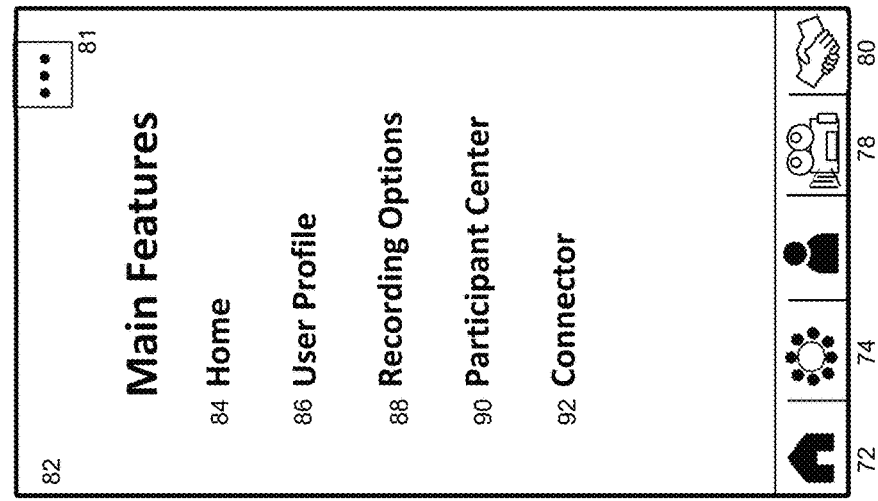
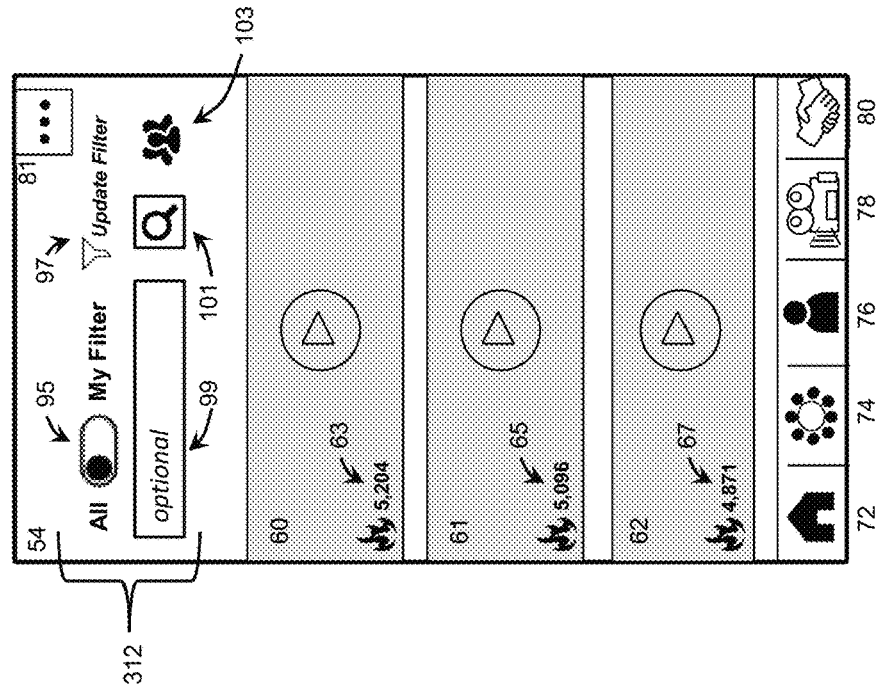

FIG. 7

| RECORDING - BASIC MODE | | 140 |
|---|---|---|
| ACTIVATE | PRESS VIDEO CAMERA SYMBOL TO ACTIVATE VIDEO RECORDER | |
| START | PRESS AND HOLD VIDEO WHEEL UNTIL IT SPINS | |
| CLIP | PRESS AND HOLD FINGER(S) ON SCREEN UNTIL THE PERIMETER FLASHES | |
| STOP | PRESS VIDEO WHEEL UNTIL IT STOPS SPINNING | |
| PUBLISH | COVER REAR CAMERA WITH HAND UNTIL THE PUBLISH SCREEN APPEARS | |

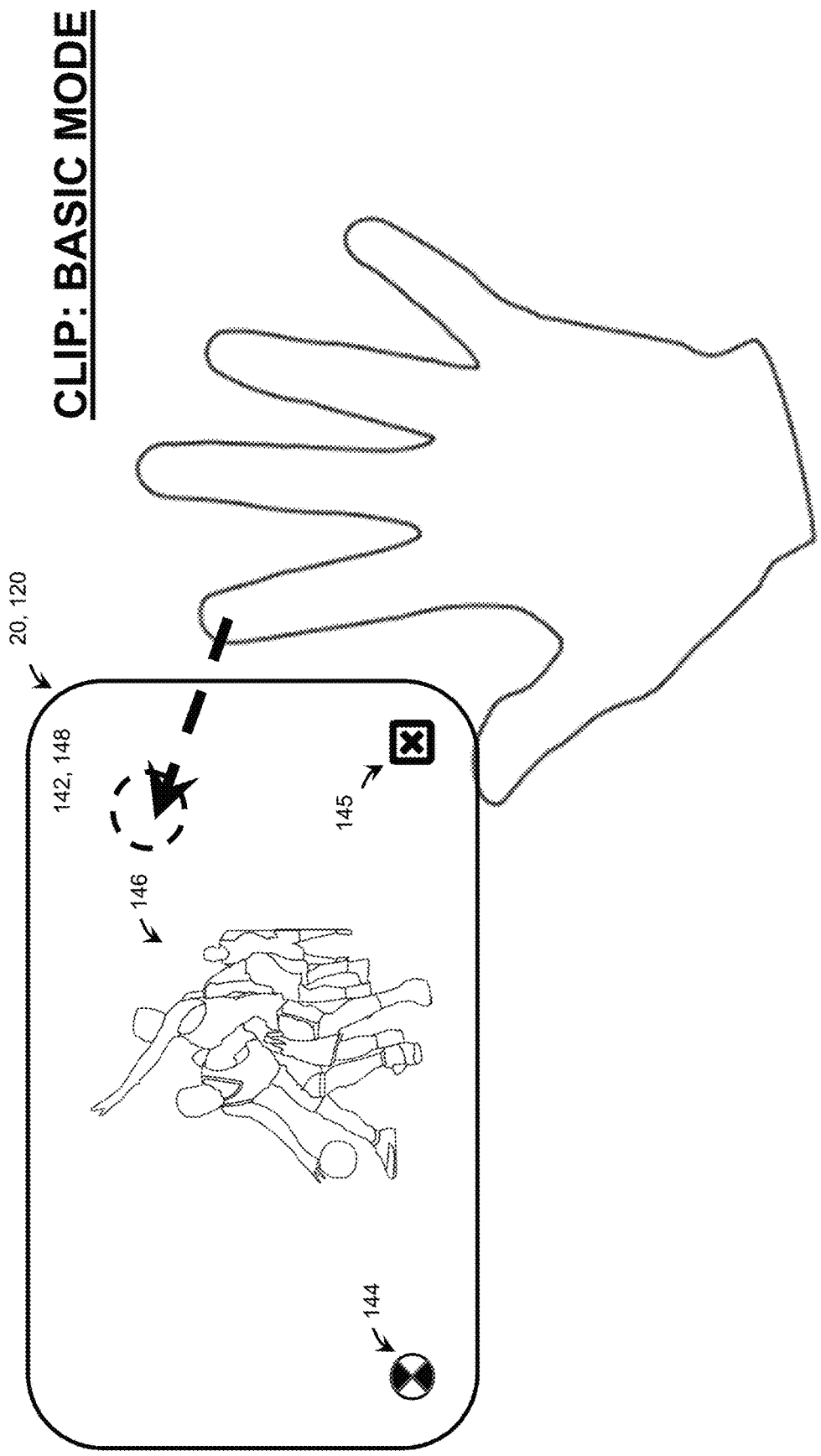

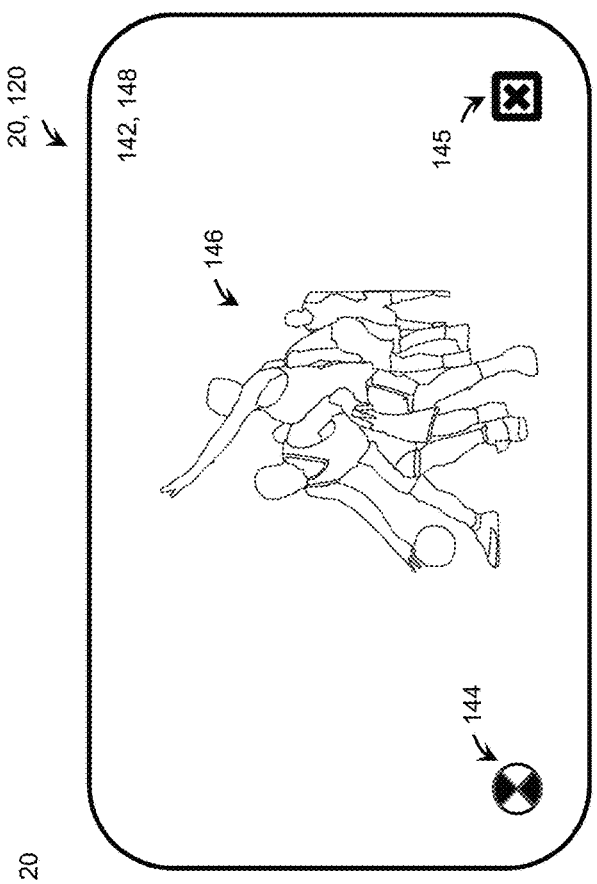
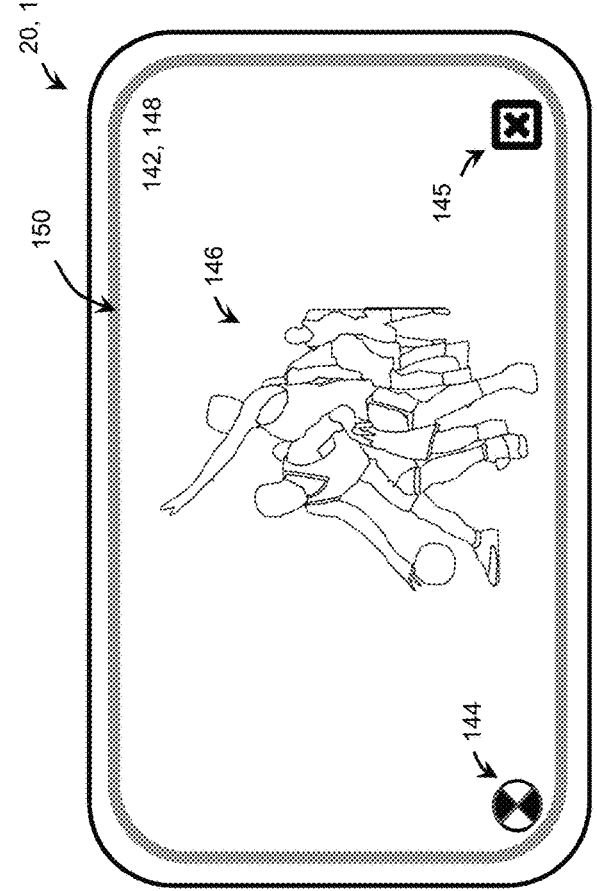

FIG. 14

RECORDING - ADVANCED MODE (BASKETBALL STATS) 162

| COMMAND | YOUR INPUT | STAT CAPTURE CONFIRMATION |
|---|---|---|
| ACTIVATE | PRESS VIDEO CAMERA SYMBOL TO ACTIVATE VIDEO RECORDER | |
| START | PRESS VIDEO WHEEL UNTIL IT SPINS | |
| CLIP 1 PT. | PRESS ONE FINGER ON SCREEN | "1" APPEARS AND DISAPPEARS |
| CLIP 2 PTS. | PRESS TWO FINGERS ON SCREEN | "2" APPEARS AND DISAPPEARS |
| CLIP 3 PTS. | PRESS THREE FINGERS ON SCREEN | "3" APPEARS AND DISAPPEARS |
| CLIP ASSIST | SWIPE LEFT OR RIGHT | "ASSIST" APPEARS AND DISAPPEARS |
| CLIP REBOUND | SWIPE STRAIGHT UP | "REBOUND" APPEARS AND DISAPPEARS |
| CLIP STEAL | PRESS FOUR FINGERS ON SCREEN | "STEAL" APPEARS AND DISAPPEARS |
| CLIP BLOCK | PRESS FIST EDGE ON SCREEN | "BLOCK" APPEARS AND DISAPPEARS |
| CLIP TURNOVER | DRAW X ON SCREEN | "TURNOVER" APPEARS AND DISAPPEARS |
| STOP | PRESS VIDEO WHEEL UNTIL IT STOPS SPINNING | |
| PUBLISH | COVER REAR CAMERA WITH HAND UNTIL THE PUBLISH SCREEN APPEARS | |

CORRELATIONS

| INPUT | INPUT CHARACTERISTIC | STAT CATEGORY | STAT ACTION | CLIP ACTION |
|---|---|---|---|---|
| PRESS ONE FINGER ON SCREEN | ONE | 1 PT. | SAVE 1 PT. | CLIP |
| PRESS TWO FINGERS ON SCREEN | TWO | 2 PTS. | SAVE 2 PTS. | CLIP |
| PRESS THREE FINGERS ON SCREEN | THREE | 3 PTS. | SAVE 3 PTS. | CLIP |
| SWIPE LEFT OR RIGHT | LATERAL/HORIZONTAL PATH | ASSIST | SAVE 1 ASSIST | CLIP |
| SWIPE STRAIGHT UP | UPWARD PATH | REBOUND | SAVE 1 REBOUND | CLIP |
| PRESS FINGERS ON SCREEN (THUMB OPTIONAL) | ALL FINGERS | STEAL | SAVE 1 STEAL | CLIP |
| PRESS FIST EDGE ON SCREEN | FIST | BLOCK | SAVE 1 BLOCK | CLIP |
| DRAW X ON SCREEN | THROWAWAY/DISCARD | TURNOVER | SAVE 1 TURNOVER | CLIP |

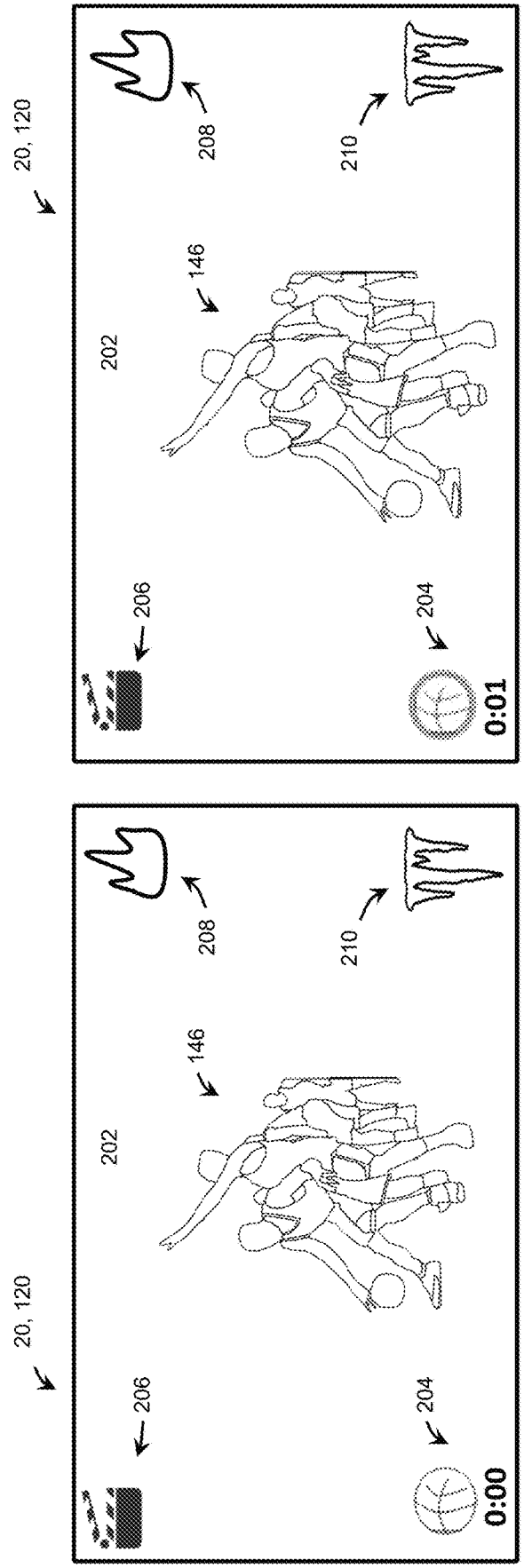

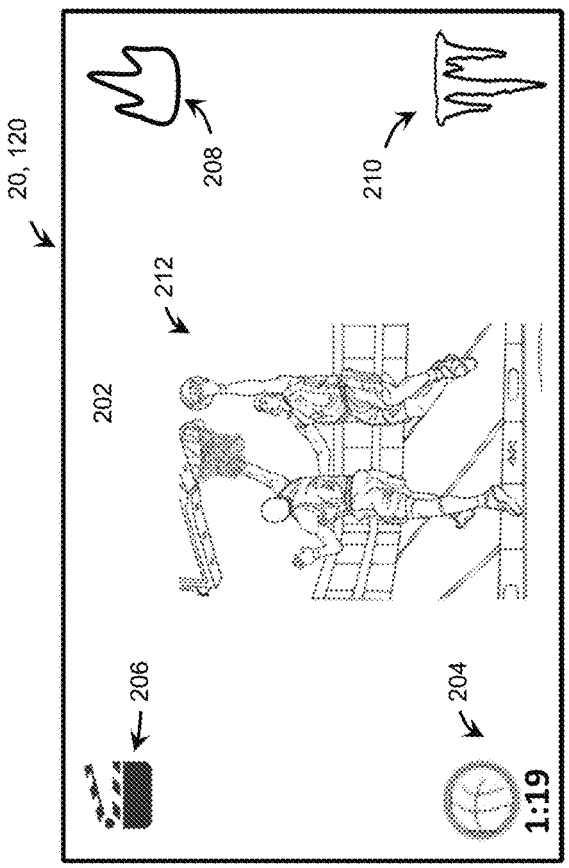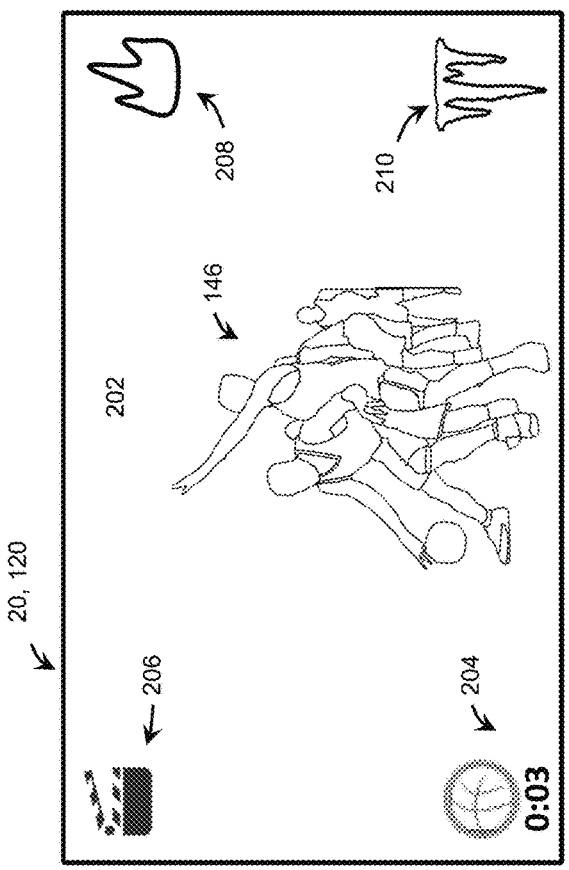

FIG. 28

DATA LIST 236

| Bookmark | Timestamp (seconds) | Description |
|---|---|---|
| | 1 | |
| | 2 | |
| | 3 | |
| | 4 | |
| | 5 | |
| | 6 | |
| A2 | 7 | 1st Rearward Point |
| | 8 | |
| | 9 | |
| | 10 | |
| | 11 | |
| A1 | 12 | 1st Clip Input |
| | 13 | |

FIG. 29

DATA LIST (CONT') 236

| Bookmark | Timestamp (seconds) | Description |
|---|---|---|
|  | 14 |  |
| A4 | 15 | 2nd Rearward Point |
|  | 16 |  |
|  | 17 |  |
|  | 18 |  |
|  | 19 |  |
| A3 | 20 | 2nd Clip Input |
|  | 21 |  |
|  | 22 |  |
|  | 23 |  |

FIG. 31

DATA LIST 244

| Bookmark | Timestamp (seconds) | Description |
|---|---|---|
|  | 1 |  |
|  | 2 |  |
|  | 3 |  |
| B2 | 4 |  |
|  | 5 | 1st Rearward Point |
|  | 6 |  |
|  | 7 |  |
|  | 8 |  |
| B1 | 9 |  |
|  | 10 | 1st Clip Input |
| B3 | 11 |  |
|  | 12 | 1st Forward Point |
|  | 13 |  |

FIG. 32

DATA LIST (CONT') 244

| Bookmark | Timestamp (seconds) | Description |
|---|---|---|
|  | 14 |  |
| B5 | 15 | 2nd Rearward Point |
|  | 16 |  |
|  | 17 |  |
|  | 18 |  |
|  | 19 |  |
| B4 | 20 | 2nd Clip Input |
|  | 21 |  |
| B6 | 22 | 2nd Forward Point |
|  | 23 |  |

FIG. 34

DATA LIST 250

| Bookmark | Timestamp (seconds) | Description |
|---|---|---|
| | 1 | |
| | 2 | |
| | 3 | |
| C2 | 4 | |
| | 5 | 1st Rearward Point |
| | 6 | |
| | 7 | |
| | 8 | |
| | 9 | |
| C1 | 10 | 1st Clip Input |
| | 11 | |
| C3 | 12 | 1st Forward Point; 2nd Rearward Point |
| | 13 | |

FIG. 35

DATA LIST (CONT') 250

| Bookmark | Timestamp (seconds) | Description |
|---|---|---|
| C4 | 14 | 2nd Clip Input |
|  | 15 |  |
| C5 | 16 | 2nd Forward Point |
|  | 17 |  |
|  | 18 |  |
|  | 19 |  |
|  | 20 |  |
|  | 21 |  |
|  | 22 |  |
|  | 23 |  |

FIG. 40A

Mixtape Complete!
Basic Event Info.

Event

Gender

Age
16 zip code

Next  289

FIG. 40B

Basketball
Select a Category

☑ Athlete Highlights
☐ Athlete Development
☐ Athlete Lowlights
☐ AAU Team
☐ Camp
☐ College Recruiter
☐ Physical Therapist
☐ Sports Agent
☐ Trainer
☐ Tutor Next  291

FIG. 40C

Post It
Athlete Highlights 60, 280, 292

Write caption
Game Date: dd/mm/yy
Athlete: Search
Video Shooter: MadSkilz TV
Home: Search
Mascot: Search
Visitor: Search
League: Search
Points: 
Assists: 
Rebounds: 
Steals: 
Blocks: 
Turnovers: 
Choose song Public Post!  294

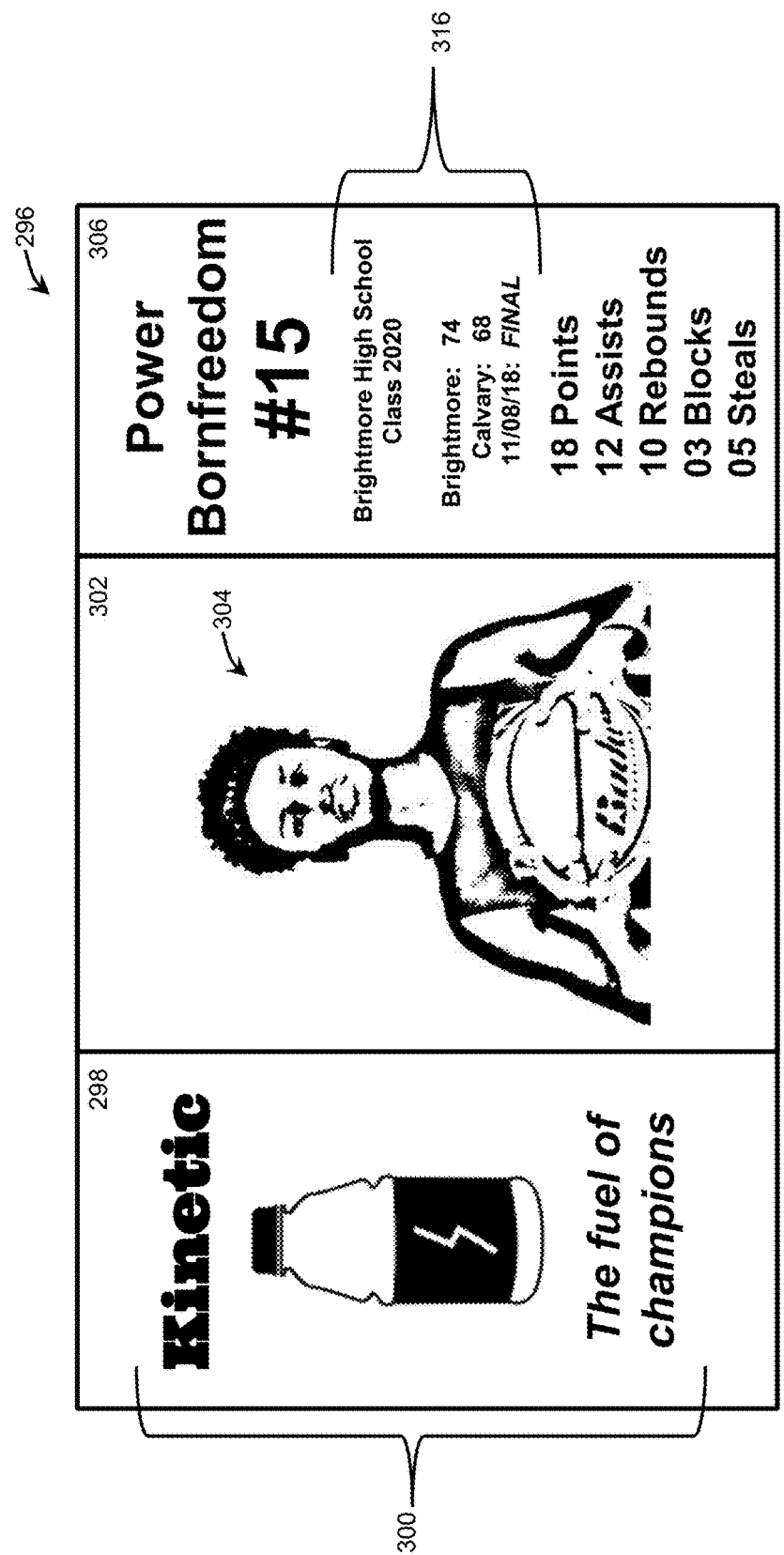

FIG. 43A

Mixtape Complete!

Select a Category

☐ Athlete Highlights
☐ Athlete Development
☑ Athlete Lowlights
☐ AAU Team
☐ Camp
☐ College Recruiter
☐ Physical Therapist
☐ Sports Agent
☐ Trainer
☐ Tutor

FIG. 43B

Post It
Athlete Lowlights

Write caption

Game Date: dd/mm/yyyy
Athlete: Justice Armstrong
Video Shooter: William Armstrong
Home: Search
Mascot: Search
Visitor: Search
League: Search
Points:          Steals:
Assists:         Blocks:
Rebounds:        Turnovers:
Choose song

Private Post!

FIG. 53B

Biography

Name:
Address:
Age:
School:
GPA:
ACT:
SAT:
Position:
Height:
Points Per Game:
Assists Per Game:
Rebounds Per Game:
Athletic Goals:
Education Goals:

Reference Videos

402 — Alan Wilson, Varsity Coach, 05/05/17

404 — Tina Bryer, History Teacher, 01/07/17

Sponsor Level

- 438 Athlete Rating: 133
- 440 Student Rating: 159
- 442 Followers: 3,954

444 $$$
$$
$

*You qualify for level $$.*

446 Get Sponsored!

FIG. 57B

Sponsors 448

450:
- Nike
- Gatorade
- Adidas 452
- Under Armour

FIG. 57C

Sponsor Account 454

- Sponsor: Adidas
- Expires: 04/30/18
- Level: $$
- Wallet: $239.17
- Gift: Shoes (free)
- Grant: Kaplan ACT/SAT Prep (Paid)

FIG. 58B

Add Listing

Category:
Name:
Address:
Descript.:
Logo:
Tryout:
Practice:
Games:
Fees:
Director:
Website:
Contact Info:
Payment Method:
Other:

FIG. 58A

Connector

*Get Listed*
AAU coaches, trainers, recruiters and others - join now!

*Get Connected*

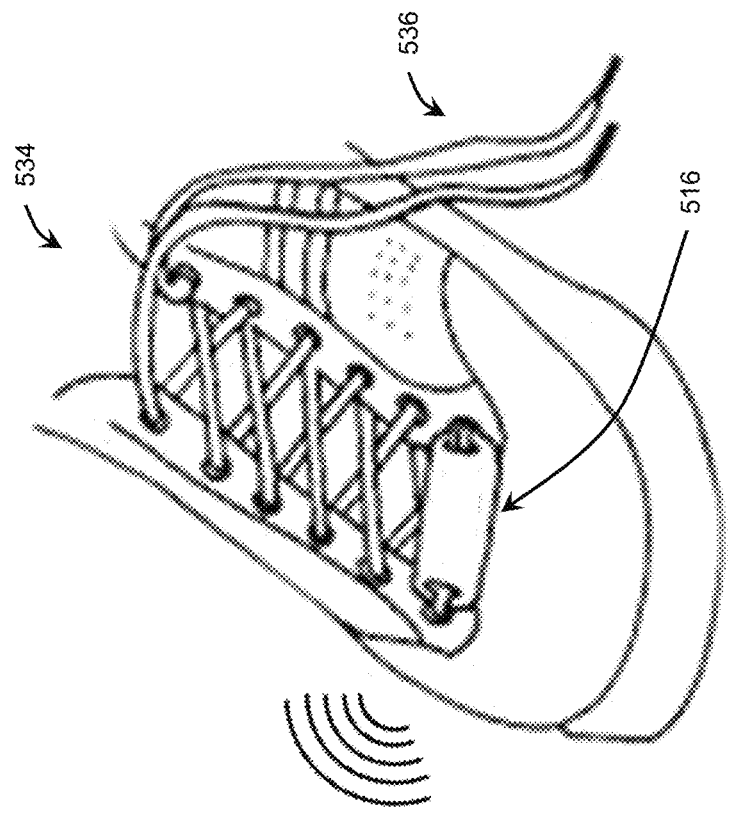
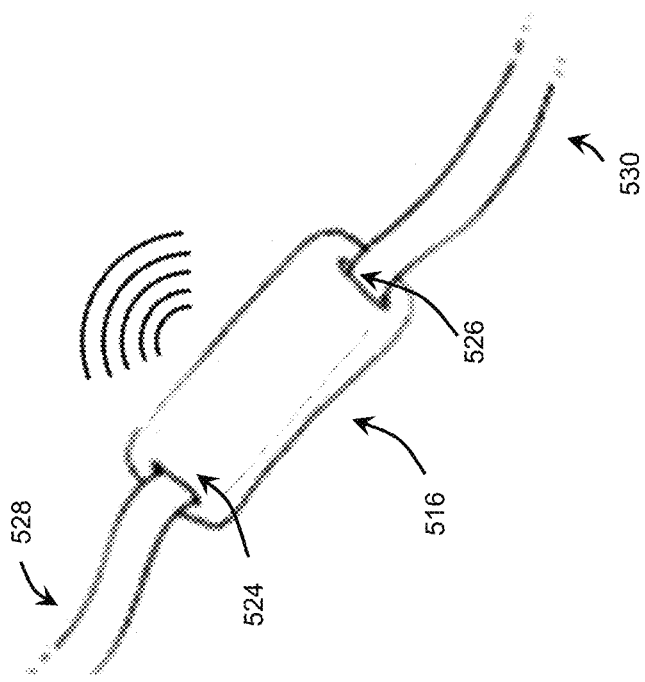
FIG. 64B
FIG. 64A

FIG. 67

VIDEO ANIMATIONS ← 544

| | |
|---|---|
| ANIMATION A (FOOT HIGHLIGHT): | DEFAULT |
| ANIMATION B1 (FOOT SMOKE): | STREAK OF TWO SHOTS MADE |
| ANIMATION B2 (FOOT FIRE): | STREAK OF OVER THREE SHOTS MADE |
| ANIMATION B3 (FOOT BLAZE): | SCORED OVER TWENTY POINTS |
| ANIMATION C1 (FOOT SNOWFLAKES): | STREAK OF THREE MISSED SHOTS |
| ANIMATION C2 (FOOT ICE CUBES): | OVER THREE TURNOVERS |
| ANIMATION C3 (FOOT ICICLES): | MISSES TO POINTS RATIO > X |

VIDEO-RELATED SYSTEM, METHOD AND DEVICE

BACKGROUND

It is popular to use mobile devices, such as smartphones, to record videos of various events. For example, people use smartphones to record family trips and activities, sports games, ceremonies, and performances of family members, friends and others in the fields of athletics, education, entertainment and business. Many of these events involve interesting moments that occur over long stretches of time. During the events, it can be difficult to anticipate or predict when these interesting moments will occur. Consequently, even though a viewer may wish to only capture the interesting moments, the viewer must record the entire event to avoid missing the interesting moments. To develop highlight videos, the viewers must edit these videos after the recording, which can be painstaking, time consuming and labor intensive.

Also, while recording the video, it can be difficult to take note of important information. Conventionally, this requires the use of at least two separate tools—the smartphone's video recorder and a separate software program or paper. The viewer operates the video recorder to record the event. Another person, such as a friend or statistician, uses the software program or paper to note the important information regarding the interesting moments. For example, the statistician might note that a specific participant scored a point or made a particular action.

It can be challenging for two people to manage these separate tools especially in high-paced events. If there is only one person available to view an event, the person may decide not to use one of the tools, losing the opportunity to gain valuable video or event information. Alternatively, the person may attempt to manage both of these tools at the same time. This can cause difficulty, stress, errors and oversights in the video recording process and note-taking process.

Furthermore, there are several shortcomings in the known processes for recording, storing, publishing, finding, rating and acting upon videos of participants in events. The shortcomings include, but are not limited to, the burdens of labor and time required to edit videos after they are recorded, inefficiencies in the processes of the human machine interface, the difficulty to find videos of a desired category, the overuse of data storage centers, the loss of data storage capacity on mobile devices such as smartphones, and the inaccuracies in the event information that is published in connection with videos. These shortcomings result in disadvantages and lost opportunities for viewers who record videos, the event participants and the viewers who watch videos.

The foregoing background describes some, but not necessarily all, of the problems, disadvantages and challenges related to video recording, video management, video access, video-related activities, event reporting, and the pursuits of event participants and viewers.

BRIEF DESCRIPTION OF THE DRAWINGS

FIG. 3A is a top view of an embodiment of the home interface of the programmed device.

FIG. 3B is a top view of an embodiment of the main features interface of the programmed device.

FIG. 3C is a top view of an embodiment of the update filter interface of the programmed device.

FIG. 7 is table illustrating an embodiment of the basic mode for recording with the programmed device.

FIG. 9 is a top view of an embodiment of the programmed device, illustrating the user's single finger touching the screen of the programmed device during the basic mode recording session to generate a clip input.

FIG. 10A is a top view of an embodiment of the programmed device, illustrating the flash in response to the user's clip input (e.g., touching of the screen of the programmed device) during the basic mode recording session.

FIG. 10B is a top view of an embodiment of the programmed device, illustrating the disappearance of the flash of FIG. 10A during the basic mode recording session.

FIG. 14 is table illustrating an embodiment of the advanced mode for recording video and statistics with the programmed device.

FIG. 15 is table illustrating an embodiment of the correlations for the advanced mode of FIG. 14.

FIG. 24A is a top view of an embodiment of the programmed device, illustrating a recording interface having different categories of clip elements (e.g., highlight clip elements and lowlight clip elements) for the advanced mode recording session.

FIG. 24B is a top view of an embodiment of the programmed device, illustrating the recording interface of FIG. 24A after one second has elapsed.

FIG. 25A is a top view of an embodiment of the programmed device, illustrating the recording interface of FIG. 24A after three seconds have elapsed.

FIG. 25B is a top view of an embodiment of the programmed device, illustrating the recording interface of FIG. 24A when the user selected a highlight clip element at the point of one minute and nineteen seconds.

FIG. 28 is the first part of a table illustrating an example of an embodiment of a data list generated by the video generator of the programmed device during a recording session.

FIG. 29 is the second part of the table of FIG. 28.

FIG. 31 is the first part of a table illustrating another example of an embodiment of the data list generated by the video generator of the programmed device during a recording session.

FIG. 32 is the second part of the table of FIG. 31.

FIG. 34 is the first part of a table illustrating yet another example of an embodiment of a data list generated by the video generator of the programmed device during a recording session.

FIG. 35 is the second part of the table of FIG. 34.

FIG. 40A is a top view of an embodiment of the primary video categorizer interface of the programmed device.

FIG. 40B is a top view of an embodiment of the secondary video categorizer interface of the programmed device.

FIG. 40C is a top view of an embodiment of the public publication interface of the programmed device.

FIG. 41 is a top view of an embodiment of the front video interface of the programmed device.

FIG. 43A is a top view of an embodiment of the secondary video categorizer interface of FIG. 40B, illustrating a selection of the athlete lowlights category.

FIG. 43B is a top view of an embodiment of the private posting interface of the programmed device.

FIG. 53A is a top view of an embodiment of the reference video interface of the programmed device.

FIG. 53B is a top view of an embodiment of the biography interface of the programmed device.

FIG. 57A is a top view of an embodiment of the sponsor level interface of the programmed device.

FIG. 57B is a top view of an embodiment of the sponsors interface of the programmed device.

FIG. 57C is a top view of an embodiment of the sponsor account interface of the programmed device.

FIG. 58A is a top view of an embodiment of the connector interface of the programmed device.

FIG. 58B is a top view of an embodiment of the listing interface of the programmed device.

FIG. 64A is a top view of the shoestring tag of FIG. 63B, illustrating the coupling of the shoestring tag to a shoestring.

FIG. 64B is an isometric view of an embodiment of a shoe having the shoestring tag of FIG. 63B.

FIG. 67 is a table illustrating an embodiment of an animation set generated by the programmed device.

DETAILED DESCRIPTION

Figure 1:
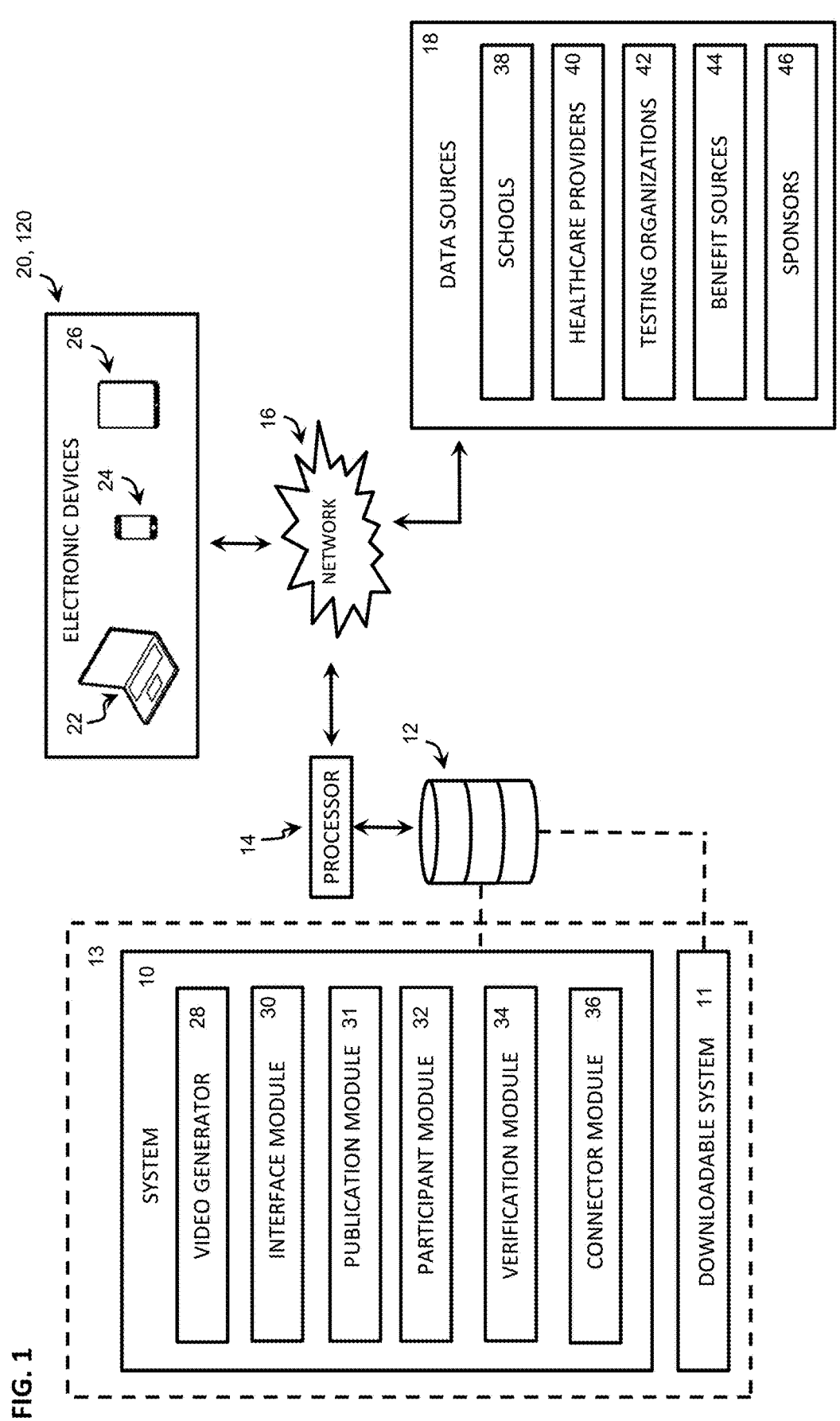
FIG. 1 is a schematic, block diagram illustrating an embodiment of the system operatively coupled to devices and data sources over a network.

As illustrated in FIG. 1, in an embodiment, the system 10 is stored within one or more databases or data storage devices 12. The one or more data storage devices 12 are accessible to one or more processors, such as processor 14, over a data network 16, such as the Internet. The processor 14 is operatively coupled to a plurality of data sources 18 over the data network 16. Users can operate a plurality of types of electronic devices 20 to access the system 10 through the network 16. The electronic devices 20 can include a personal computer 22, smartphone 24, tablet 26 or any other type of network access device.

The system 10 includes a plurality of computer-readable instructions, software, computer code, computer programs, logic, algorithms, data, data libraries, data files, graphical data and commands that are executable by the processor 14 and the electronic devices 20. In operation, the processor 14 and the electronic devices 20 cooperate with the system 10 to perform the functions described in this description.

In an embodiment, the system 10 includes a video generator 28, interface module 30, publication module 31, participant module 32, verification module 34 and connector module 36. The one or more data storage devices 12 store the system 10 for execution by the processor 14. The electronic devices 20 can access the system 10 over the network 16 to enable users to provide inputs and receive outputs as described below.

In addition, the one or more data storage devices 12 store a downloadable system 11. In an embodiment, the downloadable system 11 includes part or all of the system 10 in a format that is configured to be downloaded and installed onto the electronic devices 20. For example, in an embodiment, the downloadable system 11 includes: (a) a mobile app version of the system 10 that is compatible with the iOS™ mobile operating system; and (b) a mobile app version of the system 10 that is compatible with the Android™ mobile operating system. In an embodiment, the data sources 18 include databases of schools 38, databases of healthcare providers 40, databases of testing organizations 42, databases of benefit sources 44 and databases of sponsors 46.

From time to time in this description, the system 13, which includes the systems 10 and 11 or portions thereof, may be described as performing various functions with the understanding that such functions involve the execution role of the processor 14, another processor or the electronic devices 20. Depending upon the embodiment, the processor 14 and the electronic devices 20 can include one or more microprocessors, circuits, circuitry, controllers or other data processing devices. Although the system 13 is operable to control the input and output devices of the electronic devices 20, the system 13 may be described herein as generating outputs, displaying interfaces and receiving inputs.

The electronic devices 20 are configured to download, store and execute the downloadable system 11. As illustrated in FIG. 2, once downloaded on one of the electronic devices 20, the downloadable system 11 causes the electronic device 20 to perform various functions. The term, programmed device 120, may be used herein to refer to an electronic device 20 that is operable according to, or based on the commands, instructions and functionality of the system 13, including the downloadable system 11.

There are a variety of different types of users of the programmed devices 120 and the system 13, including, but not limited to, event participants (e.g., students and athletes), family members and friends of event participants, news media professionals and journalists, video producers, schools, colleges, coaches, sponsors of event participants, merchants (e.g., restaurants) and providers (e.g., sports clubs/teams, camp hosts, college recruiters, physical therapists, sports agents, trainer, academic tutors and others).

In an embodiment, the programmed device 120 includes an imaging device configured to record videos and generate images or photographs. The imaging device can include dual cameras or a camera unit with dual lenses (one for front imaging and one for rear imaging) to detect the user's gestures at the front while recording videos of action at the rear. In an embodiment, the imaging device has auto-zoom (zoom-in and zoom-out) functionality to maximize the capture of a tracked participant or wearable item (e.g., the bracelet 508 or shoestring tag 516 described below) that is paired with the programmed device 120.

Figure 2B:
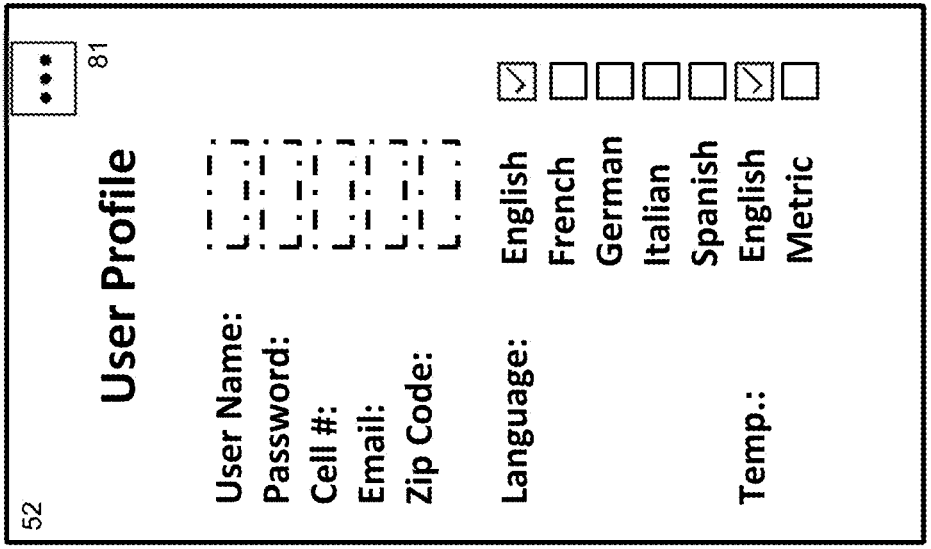
FIG. 2B is a top view of an embodiment of the user profile interface of the programmed device.
Figure 2A:
FIG. 2A is a top view of an embodiment of the login interface of the programmed device.

As illustrated in FIG. 2A, the programmed device 120 initially displays a login interface 48. In an embodiment, the login interface 48 includes a login element 50. After the user activates the login element 50, the programmed device 120 displays the user profile interface 52 illustrated in FIG. 2B. As shown, the user profile interface 52 enables the user to create login credentials (e.g., username and password), enter personal information (e.g., cell phone number, email address and zip code), select a preferred language (e.g., English) and select a preferred temperature standard (e.g. English).

Once logged-in, the programmed device 120 displays the home interface 54 as illustrated in FIG. 3A. The home interface 54 displays a plurality of compilation videos 60, 61, 62 and other compilation videos, below the compilation video 62, that are visible via swiping. As described further below, the compilation videos 60, 61, 62 have ratings 63, 65, 67, respectively. The programmed device 120 is operable to sort the videos, by default, according to the ratings such that the video with the highest rating is displayed at the top of the home interface 54. In an embodiment, the ratings represent likeness or flame per view, as described below.

In addition, the home interface 54 includes a plurality of icons or symbols at the bottom of the home interface 54. In the example shown, the home interface 54 displays a home symbol 72 that, upon selection, causes the programmed device 120 to display the home interface 54. The home interface 54 also displays a participant map symbol 74, a people follower symbol 76 enabling the user to search for, select and follow other users (e.g., athletes or participants), a video camera symbol 78, and a connection symbol 80, each of which is described below.

It should be appreciated that the home interface 54 can be a mobile app interface, a website, or another online or network-accessible portal or medium, including, but not limited to, a social media, cloud-based platform. For example, the home interface 54 can be the front interface of the YouTube™ online video platform.

As illustrated in FIGS. 2B and 3A, the programmed device 120 also displays a menu element 81. In response to the user's selection or activation of the menu element 81, the programmed device 120 displays a features interface 82 as illustrated in FIG. 3B. The features interface 82 displays a plurality of functions of the system 13. In the example shown, the features interface 82 displays: (a) a home element 84 selectable by the user, which serves the same function as the home symbol 72; (b) a user profile element 86 selectable by the user, enabling the user to log-out or change user accounts; (c) a filming options or video recording options element 88; (d) a participant center element 90; and (e) a connector element 92, which serves the same function as the connection symbol 80.

In the embodiment shown in FIG. 3A, the home interface 54 displays a search interface 312. The search interface 312 displays a filter switch 95, an update filter element 97, a text search field 99, a search activator 101 and a follower search element 103. The sliding of the filter switch 95 to the left (corresponding to "all") effectively turns-off the search filter. The sliding of the filter switch 95 to the right (corresponding to "my filter") effectively turns-on the search filter.

Figure 4:
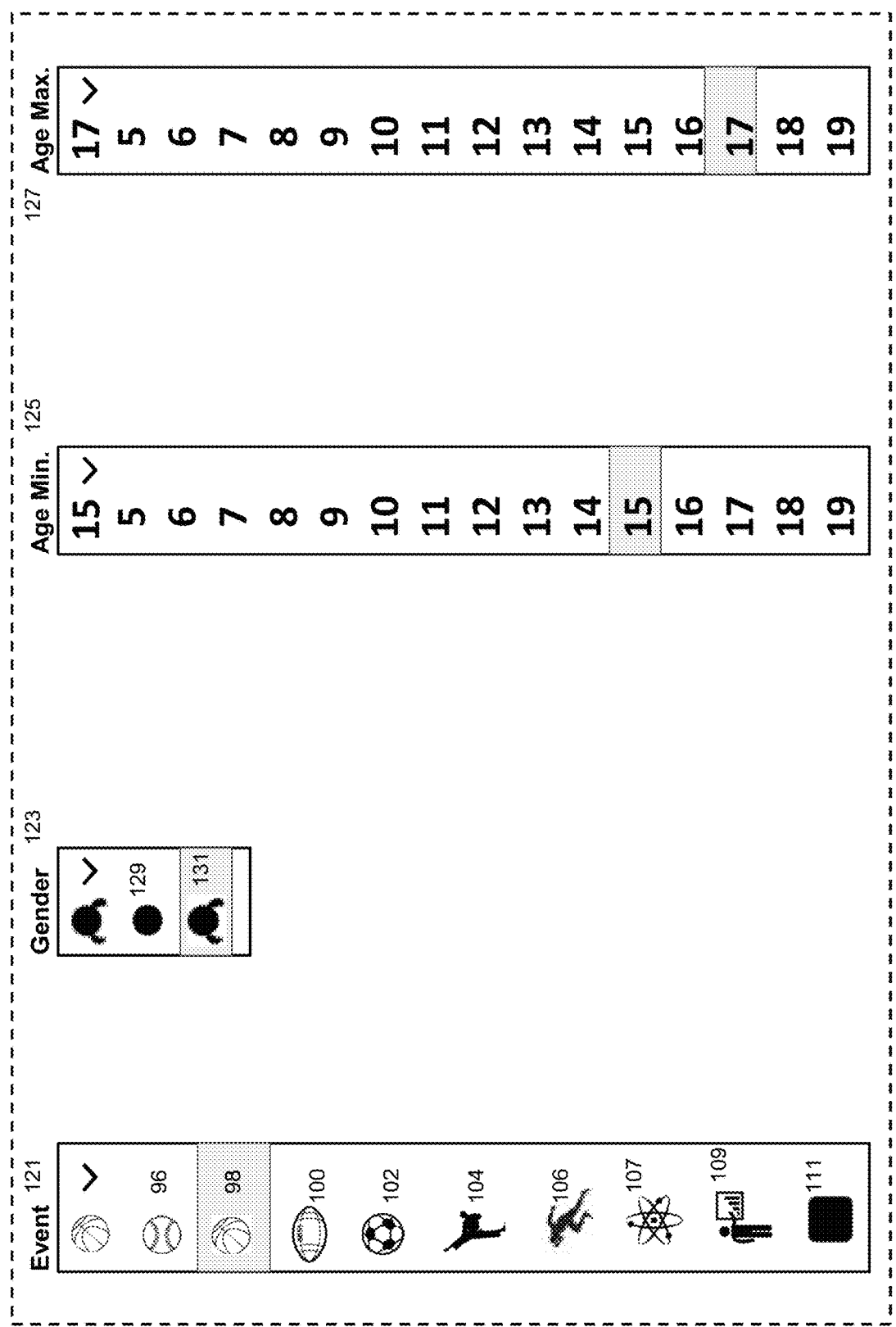
FIG. 4 is a top view of an embodiment of the filter strips of the programmed device.

Also, the user can select the update filter element 97. In response to the user's selection of the update filter element 97, the programmed device 120 displays the update filter interface 105 as illustrated in FIG. 3C. The update filter interface 105 displays an event selector 107, a gender selector 109, a minimum age selector 111, a maximum age selector 113, a location field 115, a proximity field 117 and a save filter element 119. Referring to FIG. 4, the programmed device 120 displays: (a) an event descriptor category, event reel or event strip 121 in response to the user's selection of the event selector 107; (b) a gender descriptor category, a gender reel or gender strip 123 in response to the user's selection of the gender selector 109; (c) a minimum age descriptor category, a minimum age reel or a minimum age strip 125 in response to the user's selection of the minimum age selector 111; and (d) a maximum age descriptor category, a maximum age reel or a maximum age strip 127 in response to the user's selection of the maximum age selector 113. In the example shown, the event strip 121 displays a strip of elements associated with different types of events, including a baseball element 96, basketball element 98, football element 100, soccer element 102, martial arts element 104, track and field element 106, science technology engineering and math (STEM) element 107 (associated with presentations at science fairs and other STEM venues), business presentation element 109 (associated with business plan/investor pitch competitions), and a general element 111 associated with any other type of non-categorized event, including, but not limited to, any sport or non-sport activity, such as debate club, acting, music, dancing and other activities.

In response to the user's selection of one of these event elements, the system 13 changes the event element to correspond to the selected event element. In the example shown, the user selected basketball element 102, the programmed device 120 highlighted the basketball element 98, and the programmed device 120 displayed the basketball element 98 at the top of the event strip 121. In response to the user's selection of one of the gender elements, the system 13 changes the gender element to correspond to the selected gender element. In the example shown, the user selected female element 131, the programmed device 120 highlighted the female element 131, and the programmed device 120 displayed the female element 131 at the top of the gender strip 123. In response to the user's selection of one of the minimum age elements, the system 13 changes the minimum age element to correspond to the selected minimum age element. In the example shown, the user selected minimum age fifteen, the programmed device 120 highlighted the numeral fifteen, and the programmed device 120 displayed the numeral fifteen at the top of the minimum age strip 125. In response to the user's selection of one of the maximum age elements, the system 13 changes the maximum age element to correspond to the selected maximum age element. In the example shown, the user selected maximum age seventeen, the programmed device 120 highlighted the numeral seventeen, and the programmed device 120 displayed the numeral seventeen at the top of the maximum age strip 127. Accordingly, in this example, the user set a custom filter for videos that involve basketball and female participants (i.e., female basketball players) having an age within the range of fifteen to seventeen years old. The update filter interface 105 (FIG. 3C) then indicates the user's filter setting and provides the user with the opportunity to narrow the search further by: (a) entering a location (e.g., city, zip code, state or country) in the location descriptor category or location field 115; and/or (b) entering a radial distance in the proximity descriptor category or proximity field 117, such as twenty-five miles or kilometers from such location. In response to the user's selection of the save filter element 119, the system 13 saves the filter setting indicated by the update filter interface 105.

It should be appreciated that the search interface 312 can include or be operatively coupled to a plurality of descriptor categories other than those illustrated in FIGS. 3A-4, including, but not limited to, country, city, state, language, race, ethnicity, school name, grade point average ("GPA"), ACT score, SAT score, coach's name, position, height, weight, shooting percentage, points per game, other performance statistics, and other types of participant characteristics.

Returning to the home interface 54 (FIG. 3A), if the user swipes the filter switch 95 to the right, the programmed device 120 displays the compilation videos 60, 61, 62 according to the filter setting indicated by the update filter interface 105. If the user swipes the filter switch 95 to the left, the programmed device 120 displays the compilation videos 60, 61, 62 without any filtering. If the user enters text in the text search field 99 (e.g., an athlete's name) and then selects the search activator 101, the programmed device 120 processes a search request and displays the compilation videos 60, 61, 62 according to the text entered in the text search field 99. If the user selects the follower search element 103, the programmed device 120 blocks or deactivates any filter settings and displays the compilation videos 60, 61, 62 of those users who are followed by the user in accordance with the settings input through the people follower symbol 76.

Figure 5B:
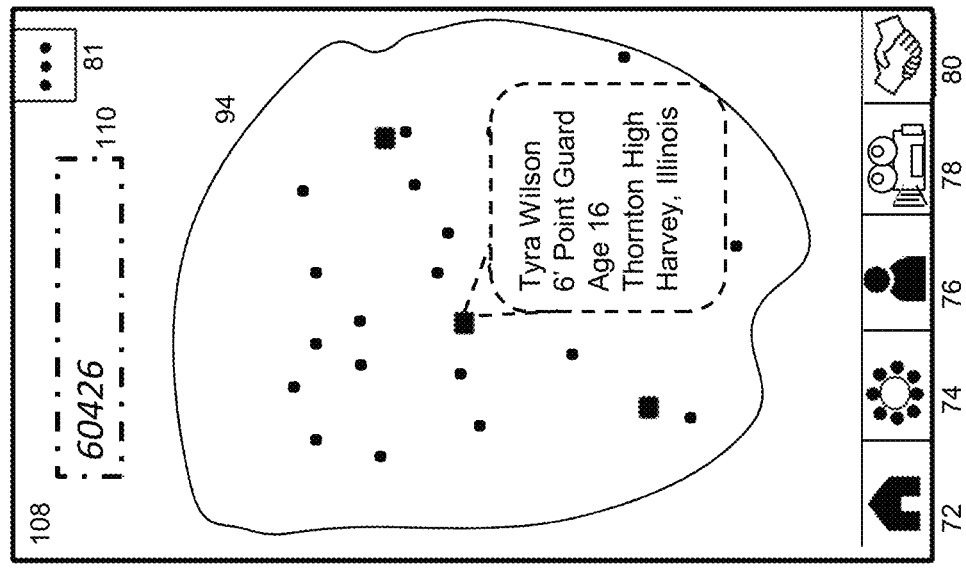
FIG. 5B is a top view of an example of the map search interface of FIG. 5A.
Figure 5A:
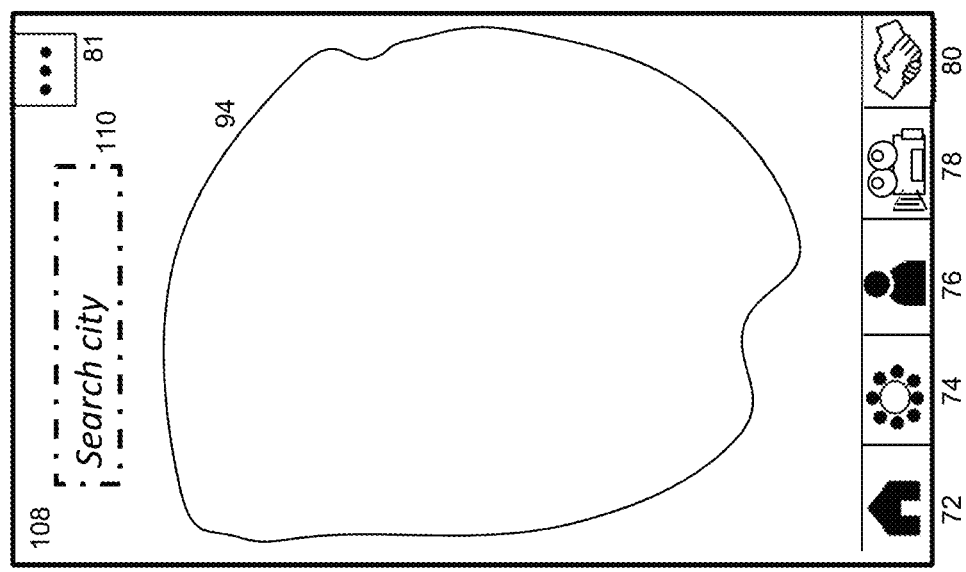
FIG. 5A is a top view of an embodiment of the map search interface of the programmed device.

As illustrated in FIGS. 5A-5B, in response to the user's selection of the participant map symbol 74, the system 13 displays the map interface 108. The map interface 108 displays a search field 110 that enables the user to enter a zip code or name of city, state or other territory. Upon entering the data in the field 110 (e.g., zip code 60426 of Harvey, Ill.), the system 13 displays a geographic map 94 of users who are registered through the system 13 as participants. In an embodiment, the geographic map 94 graphically represents participants according to the update filter interface 105 (FIG. 3C). The map displays symbols or different sizes, shapes or colors to indicate the athletes of varying ratings. In the example shown, the relatively small squares indicate athletes with ratings below a designated level, and the three relatively large squares indicate athletes with ratings above the designated level. In response to the user's selection of one of the symbols, the system 13 displays biographical information regarding the corresponding athlete. In the example shown, the user entered zip code 60426 of Harvey, Ill. for a search for high school female basketball players, and the map interface 108 displayed a map of Harvey, Ill. populated with the locations or school addresses of high school female basketball players indicated by squares. Next, the user selected the large central square, and the map interface 108 displayed information regarding the corresponding basketball player—Tyra Wilson, 6' point guard, age 16, Thornton High School, Harvey, Ill.

The search interface 312 (FIG. 3A) and the map interface 108 (FIGS. 5A-5B) overcome challenges and barriers encountered by participants, such as athletes aspiring to play sports in college. For example, it is common for talented high school athletes to be overlooked because they attend low profile high schools, reside in relatively small cities or towns, do not satisfy the ideal height and weight for a given sport, lack the personal connections, or lack the financial resources to pay recruiting consultants. These athletes, who play on high school and Amateur Athletic Union ("AAU") teams, often find it difficult to gain adequate exposure to recruiters, colleges, teams and media.

Using conventional (prior art) video platforms like YouTube™, it can be difficult, burdensome and time consuming for recruiters and sports enthusiasts to identify athletes who match a desired profile, such as age, gender, sport type, performance statistic, height, weight, GPA or other descriptors of various descriptor categories. For example, a YouTube™ search for "top 17 year old high school girl basketball players in Cleveland, Ohio" may result in 83,900 results with the first five including: (a) The Best High School Basketball Player From Every State; (b) 7'7 freshman makes varsity debut; (c) 7-Foot-7 190 lbs Freshman; (d) 7'7" basketball player in Ohio; and (e) Chargrin Falls' senior Hallie Thome named Cleveland.com's Girls Basketball Player of the Year. Four of the top five results do not even involve girl basketball players, and the fifth result involves a eighteen year old girl basketball player. The sought-after player may be buried in the 83,900 results, requiring searchers to spend hours to identify 17 year old girl basketball players in Cleveland, Ohio. The system 13 provides an improvement that overcomes or decreases the effects of this problem. In particular, the search interface 312 (FIG. 3A) enables users to use the filter 95 to find compilation videos of participants that satisfy the specific descriptors selected by the users. In an embodiment described below, the system 13 requires the video submitter to input descriptors, such as event type, gender, age and zip code, into the primary video categorizer interface 287 (FIG. 40A).

The map interface 108 enables recruiters to conveniently investigate the athletes within a desired geography. For example, without the map interface 108, recruiters might avoid traveling to a small town to view a single athlete. With the improvement and advantage provided by the map interface 108, a recruiter can virtually visit small towns and view the videos and information regarding the athletes there. In addition, as described above, the search interface 31 (FIG. 3) enables recruiters to filter and narrowly search for athletes and participants who satisfy specific criteria input by the recruiters. This functionality and the advantages of the connector module 36 described below, provide important improvements that overcome or lessen the disadvantages described above.

Figure 6B:
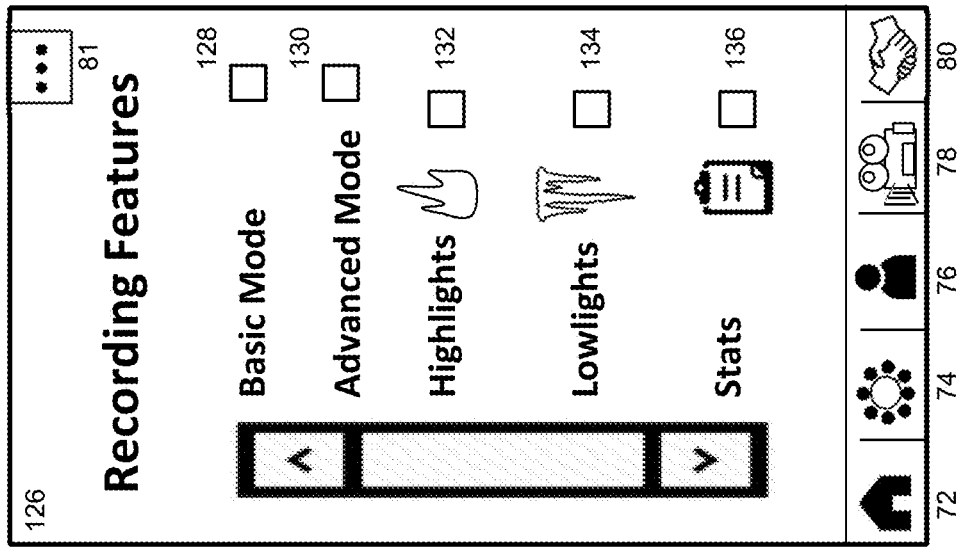
FIG. 6B is a top view of an embodiment of the recording features interface of the programmed device.
Figure 6A:
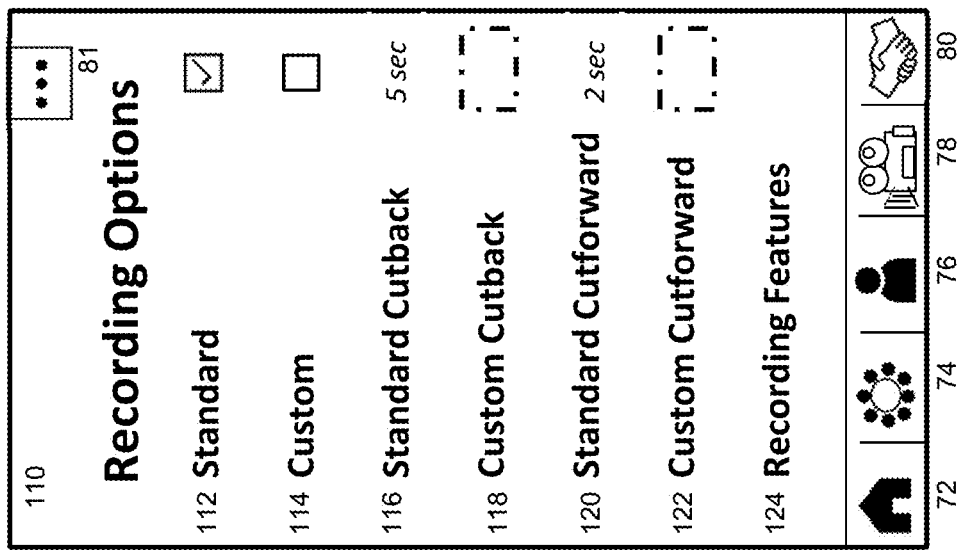
FIG. 6A is a top view of an embodiment of the recording options interface of the programmed device.

As illustrated in FIG. 6A, when a user selects the recording options element 88 (FIG. 3B), the programmed device 120 displays the recording options interface 110. The recording options interface 110 displays a standard mode element 112, custom mode element 114, standard cutback 116, custom cutback field 118, standard cutforward 120, custom cutforward field 122, and recording features element 124.

If the user selects the standard mode element 112, the programmed device 120 automatically activates the standard cutback 116 and standard cutforward 120. The standard cutback 116 and standard cutforward 120 are the default values. In the example shown, the value of the standard cutback 116 is set at five seconds, and the value of the standard cutforward 122 is set at two seconds. It should be appreciated that these values can be adjusted by the implementor of the system 13.

If the user selects the manual mode element 114, the programmed device 120 deactivates the default cutback 116 and default cutforward 120, and the programmed device 120 enables the user to enter the desired data (e.g., time values in seconds) in the custom cutback field 118 and custom cutforward field 122. As described further below, the time values established in the recording options interface 110 affect the video clipping process.

In response to the user's selection of the recording features element 124, the programmed device 120 displays the recording features interface 126 as illustrated in FIG. 6B. In an embodiment, the recording features interface 126 displays: (a) a basic mode element 128; (b) an advanced mode element 130; (c) a highlights element 132 associated with success or positive activity of a participant's performance; (d) a lowlights elements 134 associated with failure, weakness or negative activity that indicates areas for training or improvement in a participant's skills; and (e) a stats element 136 associated with a set of statistics symbols 216 (FIG. 26) described below.

Figure 8:
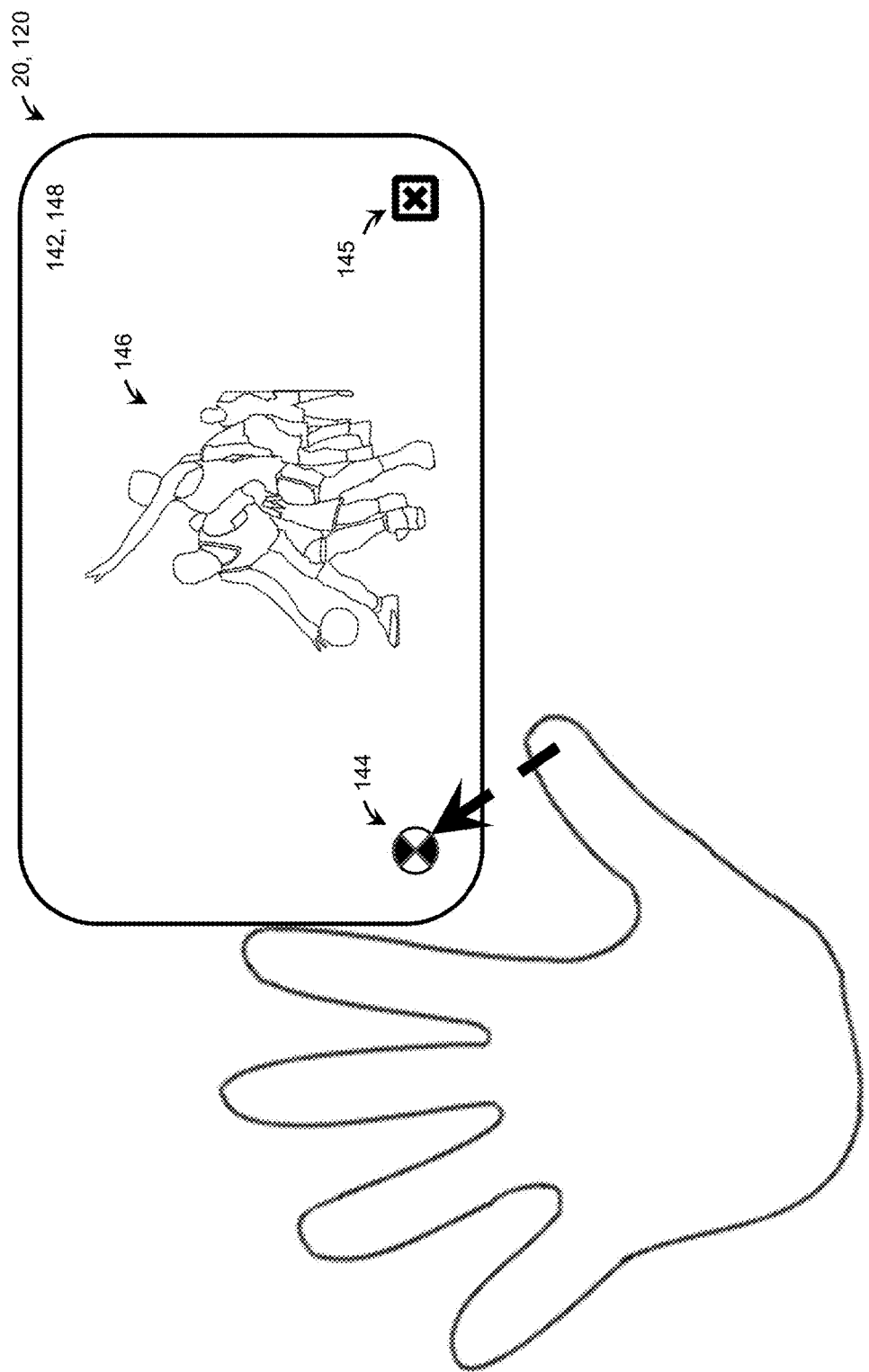
FIG. 8 is a top view of an embodiment of the programmed device, illustrating the user's thumb touching the start/stop element to start the basic mode recording session.

In response to the user's selection of the basic mode element 128, the system 13 activates a basic recording mode 140 as illustrated in FIG. 7. According to the basic method of use indicated in FIG. 7:

(a) To activate the recording function of the programmed device 120, the user presses or taps the video camera symbol 78 as illustrated in FIGS. 3A and 6A-6B. In response, the programmed device 120 displays a recording interface 142 as illustrated in FIG. 8.

(b) To start recording, the user presses and holds the start/stop element 144 (FIG. 7) which, in the example shown, is a wheel symbol. After the user continuously presses the start/stop element 144 for a designated period (e.g., one second), the programmed device 120 animates the start/stop element 144 and starts the recording of the event. In the example shown, the programmed device 120 causes the wheel symbol to spin or rotate. The continuous motion of the wheel symbol indicates that recording is in progress. It should be appreciated that, in other embodiments, the start/stop element 144 can include other animated symbols, such as a spinning basketball, spinning football, spinning baseball, spinning soccer ball, another spinning or moving sports object associated with a particular sport, or a dot or ball that travels clockwise around the perimeter (the path of flash 150).

(c) To capture video footage 146 (FIG. 8) of the recorded event, the user presses and holds one or more fingers (or another part of the user's body) on the touchscreen 148 (FIG. 9) of the programmed device 120 until the system 13 displays a relatively bright flash 150 (FIG. 10A) located at the perimeter of the recording interface 142. In this embodiment, the programmed device 120 has a designated confirmation period, such as two seconds. The programmed device 120 checks to determine whether the user has made a continuous, intentional input onto the touchscreen 148 for the confirmation period. Once the programmed device 120 confirms that the user has satisfied this condition, the programmed device 120 proceeds to generate the flash 150 and capture the video footage 146. It should be appreciated that, in other embodiments, the programmed device 120 is configured to receive other types of actions or inputs to generate the desired video footage 146, including, but not limited to, voice, audible, retinal, biometric and gesture inputs, user actions, movements of the programmed device 120 relative to other objects, and electronic signals from ancillary devices, sensors or accessories. The flash 150 (FIG. 10A) indicates to the user that the programmed device 120 has successfully received the user's input to generate the desired video footage 146. In an embodiment, the flash 150 is bright white, silver, yellow, orange or red. In another embodiment, the flash 150 is a graphical animation of a rectangular path or line of fire showing a line of red and orange flames in motion. In yet another embodiment, the programmed device 120 displays a sequence of flashes 150 in which flash 150 quickly changes between illuminated and non-illuminated appearances. After the flashing or flash period ends, the programmed device 120 deactivates the flash 150, returning to the recording interface 142 shown in FIG. 10B.

(d) To pause or stop the recording, the user presses and holds the start/stop element 144. After the user continuously presses the start/stop element 144 for a designated period (e.g., one second), the programmed device 120 stops the animation of the start/stop element 144 and stops the recording of the event. In the example shown, the programmed device 120 stops the spinning and rotation of the wheel symbol. The stationary display of the wheel symbol indicates that recording has stopped or paused.

Figure 11:
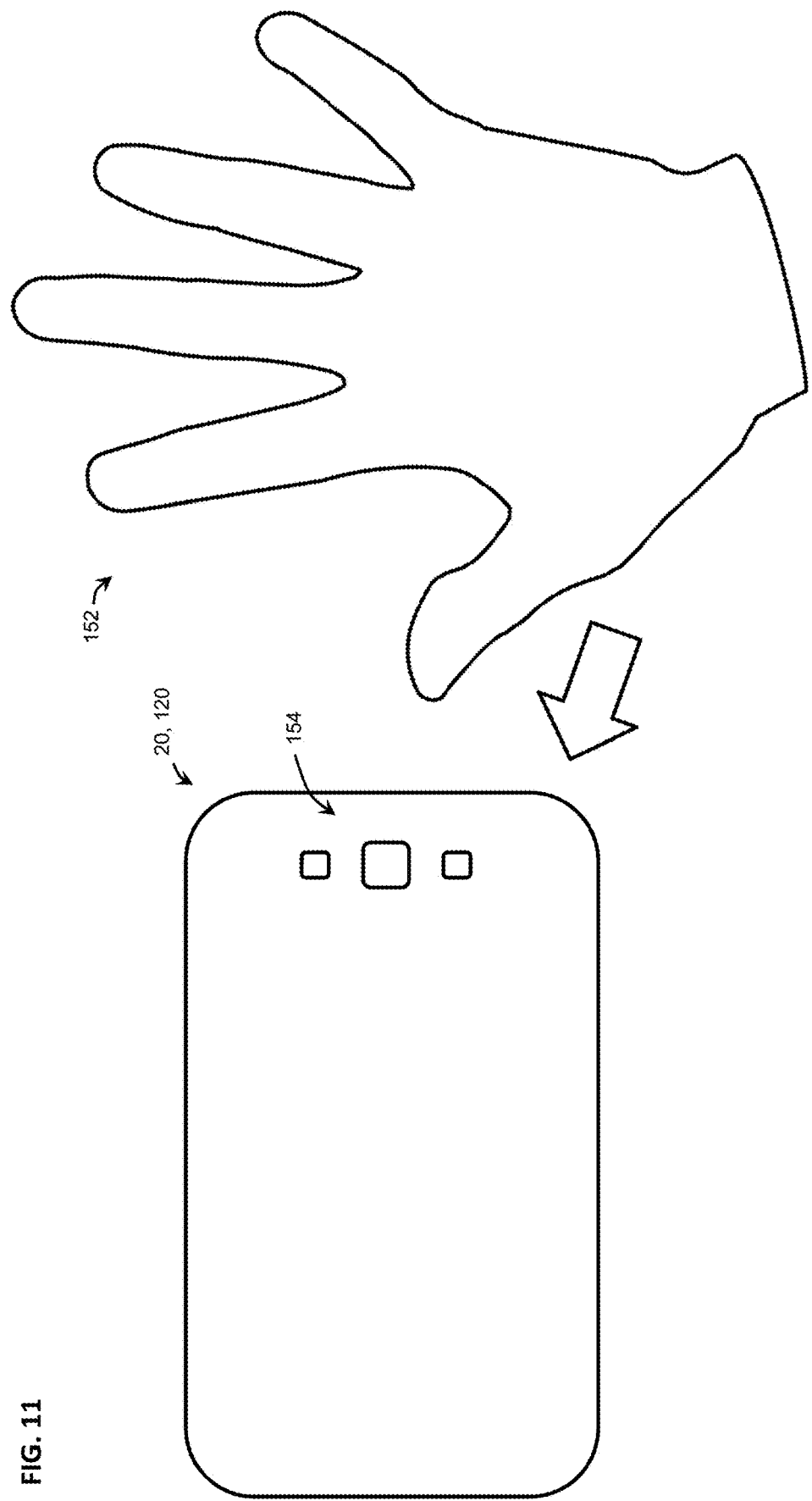
FIG. 11 is a rear view of an embodiment of the programmed device, illustrating the rear lens.
Figure 12:
FIG. 12 is a rear view of an embodiment of the programmed device, illustrating the rear lens covered by the user's hand to end or exit the basic mode recording session.
Figure 13B:
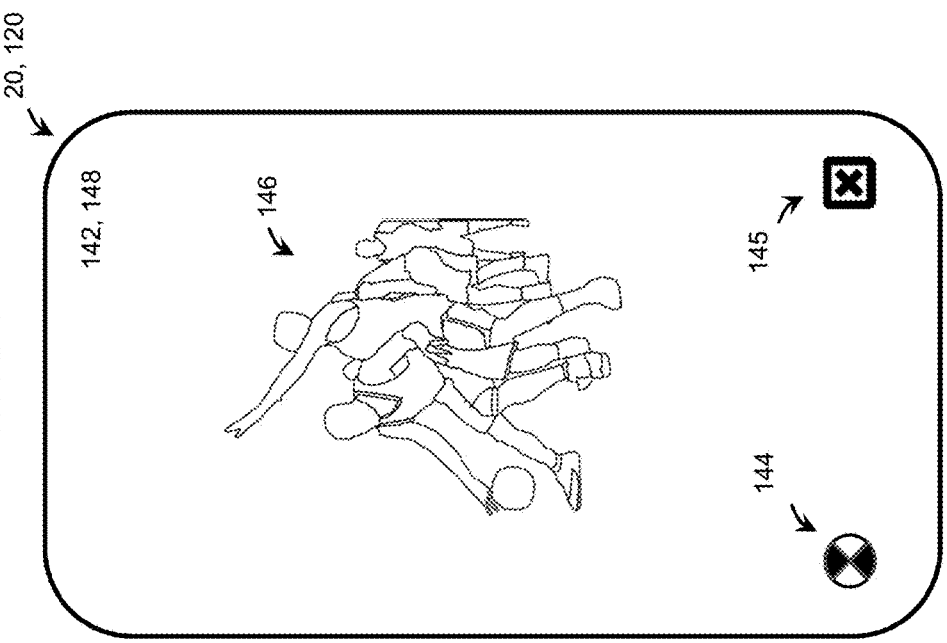
FIG. 13B is a top view of an embodiment of the programmed device, illustrating the programmed device oriented in a vertical or portrait position during the basic mode recording session.
Figure 13A:
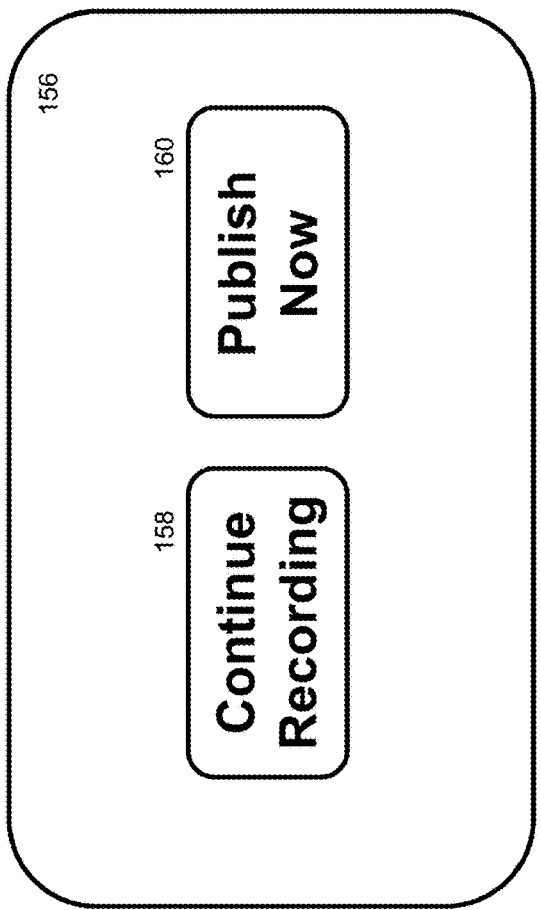
FIG. 13A is a top view of an embodiment of the publish decision interface of the programmed device.

(e) To wrap-up, end or terminate the recording session, the user presses or selects the recording exit element 145. In addition, the user can use his/her hand 152 to cover the rear camera lens 154 of the programmed device 120 as illustrated in FIGS. 11-12. The programmed device 120 checks to determine whether the user has made a continuous, intentional covering of the lens 154 for a confirmation period, such as one second. Once the programmed device 120 confirms that the user has satisfied this condition, the programmed device 120 recognizes an exit input. In an embodiment, in response to an exit input through the exit element 145 or the rear camera lens 154, the programmed device 120 automatically displays a publish decision interface 156 as illustrated in FIG. 13A. The publish decision interface 156 displays a continue recording element 158 and a publish now element 160. Depending upon the embodiment, the publish decision interface 156 can cover or replace the entire recording interface 142, or the publish decision interface 156 can be a pop-up window that overlays only part of the recording interface 142. If the user selects the continue recording element 158, the programmed device 120 displays the recording interface 142. If the user selects the publish now element 160, the programmed device 120 automatically publishes a highlight video having a compilation of select video clips of the video footage 146, or the programmed device 120 enables the user to add information before publishing such video, as described further below. The publish decision interface 156 provides a secondary safeguard against an unintentional stoppage of recording. The confirmation period for the lens covering can serve as a primary safeguard.

In response to the user's selection of the advanced mode element 130 (FIG. 6B), the programmed device 120 activates an advanced recording mode 162 as illustrated in FIGS. 14-15. According to the advanced method of use described in FIGS. 14-15:

(a) To activate the recording function of the programmed device 120, the user presses or taps the video camera symbol 78 as illustrated in FIGS. 3A and 6A-6B. In response, the programmed device 120 displays a recording interface 142 as illustrated in FIG. 16.

(b) To start recording, the user presses and holds the start/stop element 144 (FIG. 16) which, in the example shown, is a wheel symbol. After the user continuously presses the start/stop element 144 for a designated period (e.g., one second), the programmed device 120 animates the start/stop element 144 and starts the recording of the event. In the example shown, the programmed device 120 causes the wheel symbol to spin or rotate. The continuous motion of the wheel symbol indicates that recording is in progress. It should be appreciated that, in other embodiments, the start/stop element 144 can include other animated symbols, such as a spinning basketball, spinning football, spinning baseball, spinning soccer ball or another spinning or moving sports object associated with a particular sport.

(c) To generate or capture a video clip while, at the same time, recording the statistic associated with the video clip, the user provides one of the clip-stat commands 164 (FIG. 14), multi-functional commands. As shown in FIG. 15, the programmed device 120 stores a plurality of correlations 166 related to the clip-stat commands 164.

Figure 16:
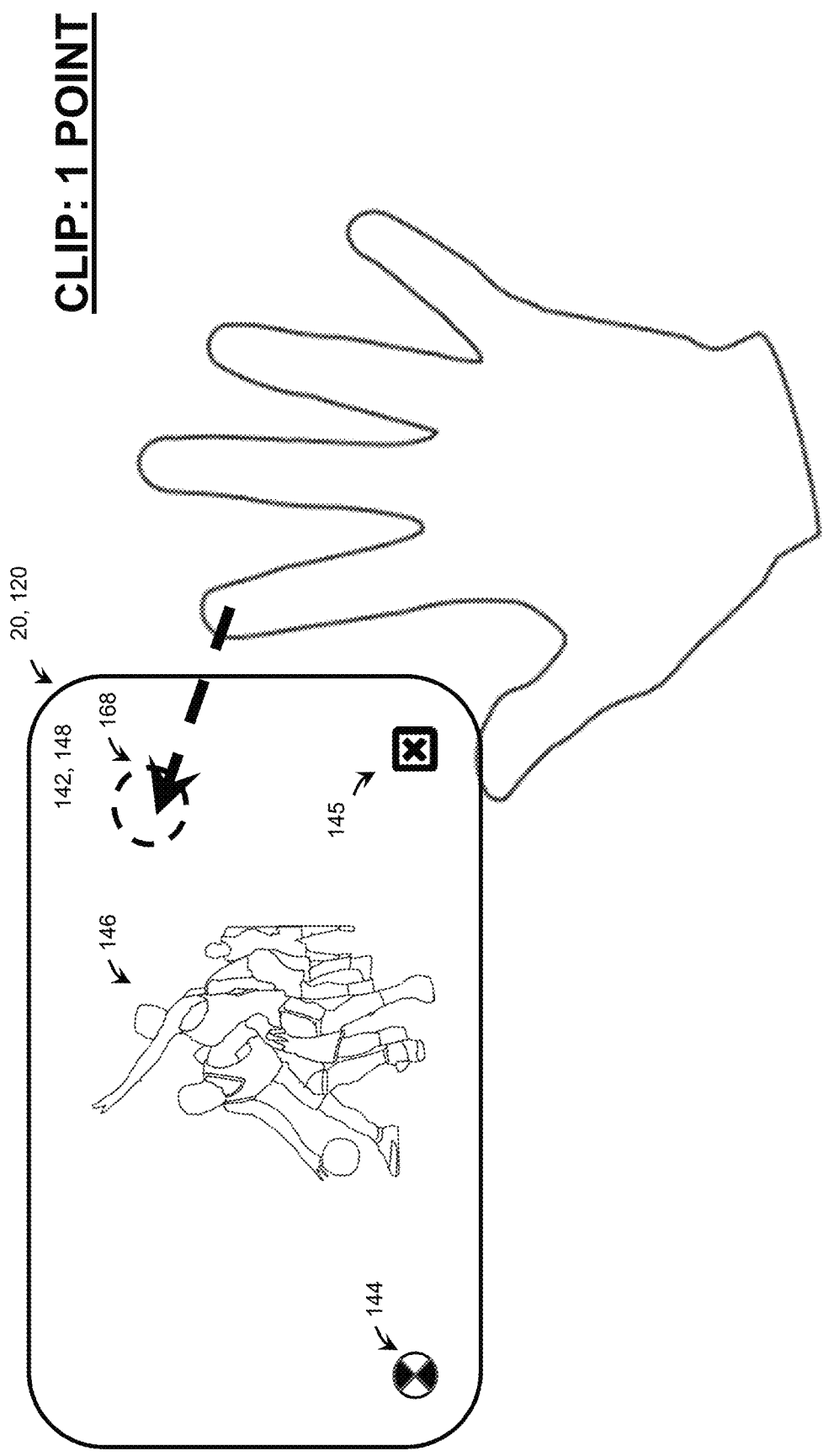
FIG. 16 is a top view of an embodiment of the programmed device, illustrating the user's single finger touching the screen to generate a clip input and record one point during the advanced mode recording session.

(d) As illustrated in FIG. 16, if the user presses or taps one finger at any single spot 168 on the touchscreen 148, this single-finger input has a one input characteristic associated with a scoring of one point (e.g., a basketball free throw or soccer goal). This causes the programmed device 120 to simultaneously save or record one point and generate or capture the associated video clip, as described below. In an embodiment illustrated in FIGS. 14 and 16, if the user presses or taps one finger at any single spot 168 on the touchscreen 148, the programmed device 120 simultaneously: (i) saves or records one point; (ii) generates or captures the associated video clip, as described below; and (iii) displays a statistics capture confirmation, such as a "1" appearing momentarily on the touchscreen 148 and then disappearing as indicated in FIG. 14.

Figure 17:
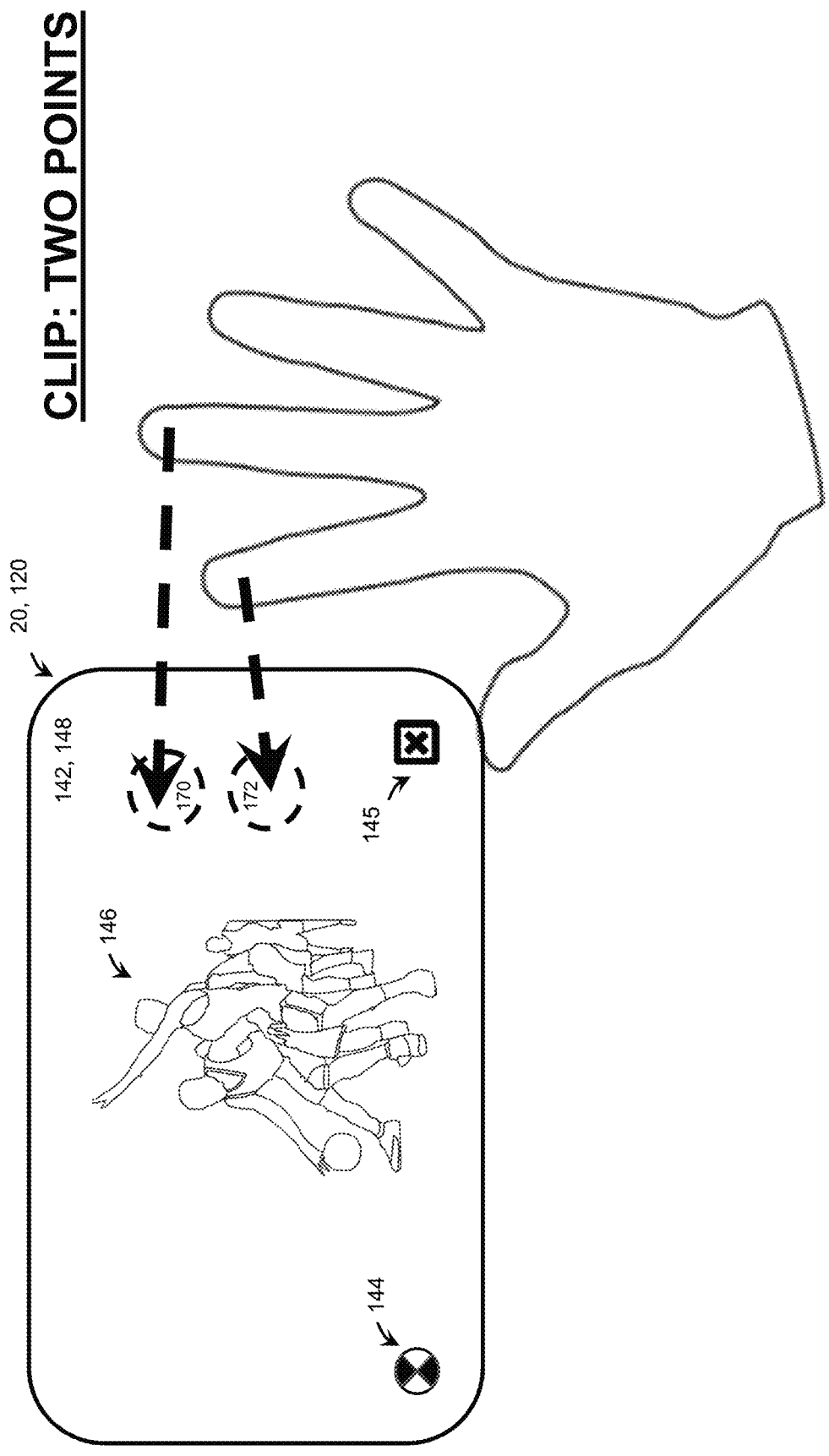
FIG. 17 is a top view of an embodiment of the programmed device, illustrating two fingers touching the screen to generate a clip input and record two points during the advanced mode recording session.

(e) As illustrated in FIG. 17, if the user simultaneously presses or taps two fingers at any two spots 170, 172 on the touchscreen 148, this two-finger input has a two input characteristic associated with a scoring of two points (e.g., a basketball field goal). This causes the programmed device 120 to simultaneously save or record two points and generate or capture the associated video clip, as described below. In an embodiment illustrated in FIGS. 14 and 17, if the user simultaneously presses or taps two fingers on any two spots 172, 174 on the touchscreen 148, the programmed device 120 simultaneously: (i) saves or records two points; (ii) generates or captures the associated video clip, as described below; and (iii) displays a statistics capture confirmation, such as a "2" appearing momentarily on the touchscreen 148 and then disappearing as indicated in FIG. 17.

Figure 18:
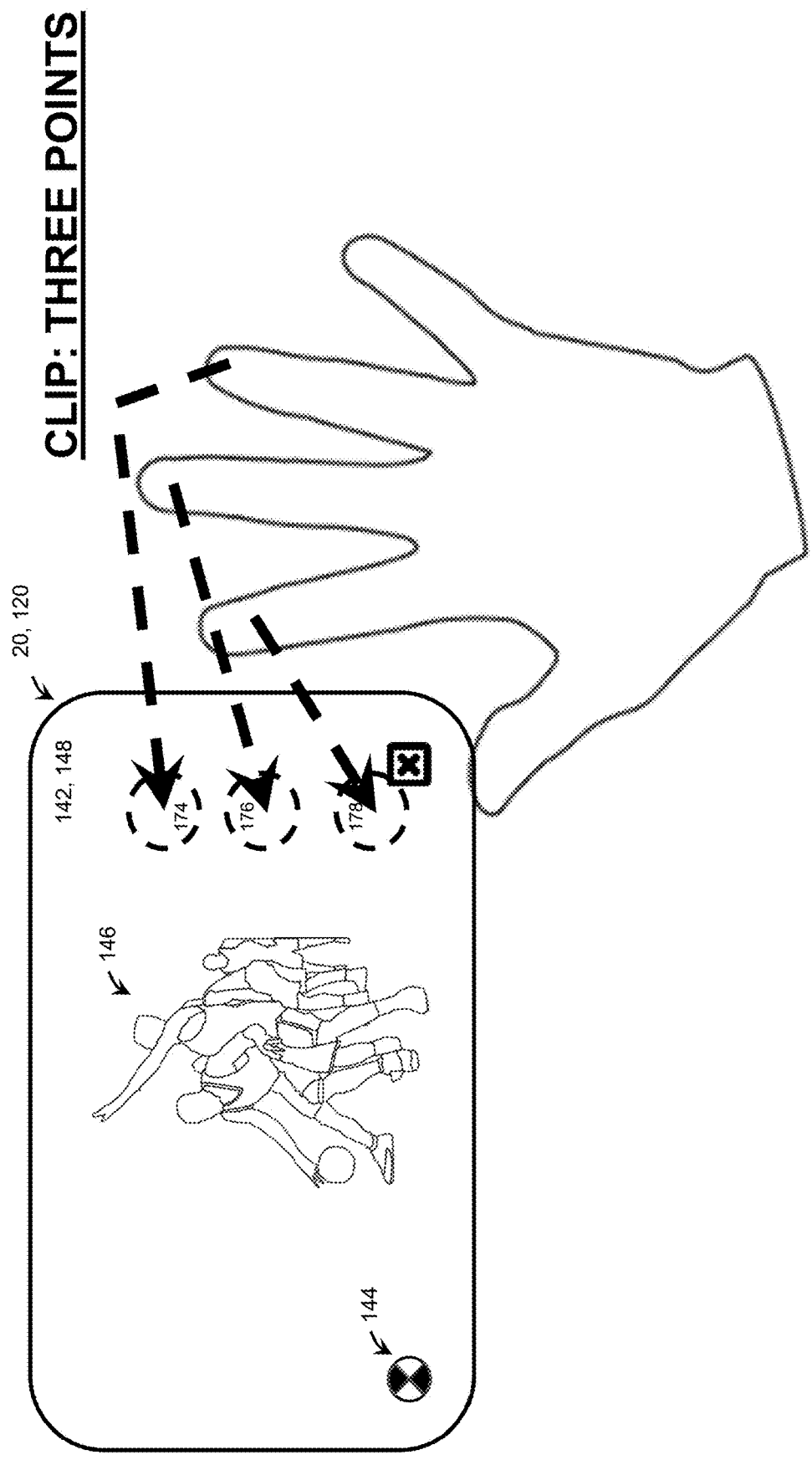
FIG. 18 is a top view of an embodiment of the programmed device, illustrating three fingers touching the screen to generate a clip input and record three points during the advanced mode recording session.

As illustrated in FIG. 18, if the user simultaneously presses or taps three fingers at any three spots 174, 176, 178 on the touchscreen 148, this three-finger input has a three input characteristic associated with a scoring of three points (e.g., a basketball field goal behind the three point arc). This causes the programmed device 120 to simultaneously save or record three points and generate or capture the associated video clip, as described below. In an embodiment illustrated in FIGS. 14 and 18, if the user simultaneously presses or taps three fingers on any three spots 174, 176, 178 on the touchscreen 148, the programmed device 120 simultaneously: (i) saves or records three points; (ii) generates or captures the associated video clip, as described below; and (iii) displays a statistics capture confirmation, such as a "3" appearing momentarily on the touchscreen 148 and then disappearing as indicated in FIG. 14.

Figure 19:
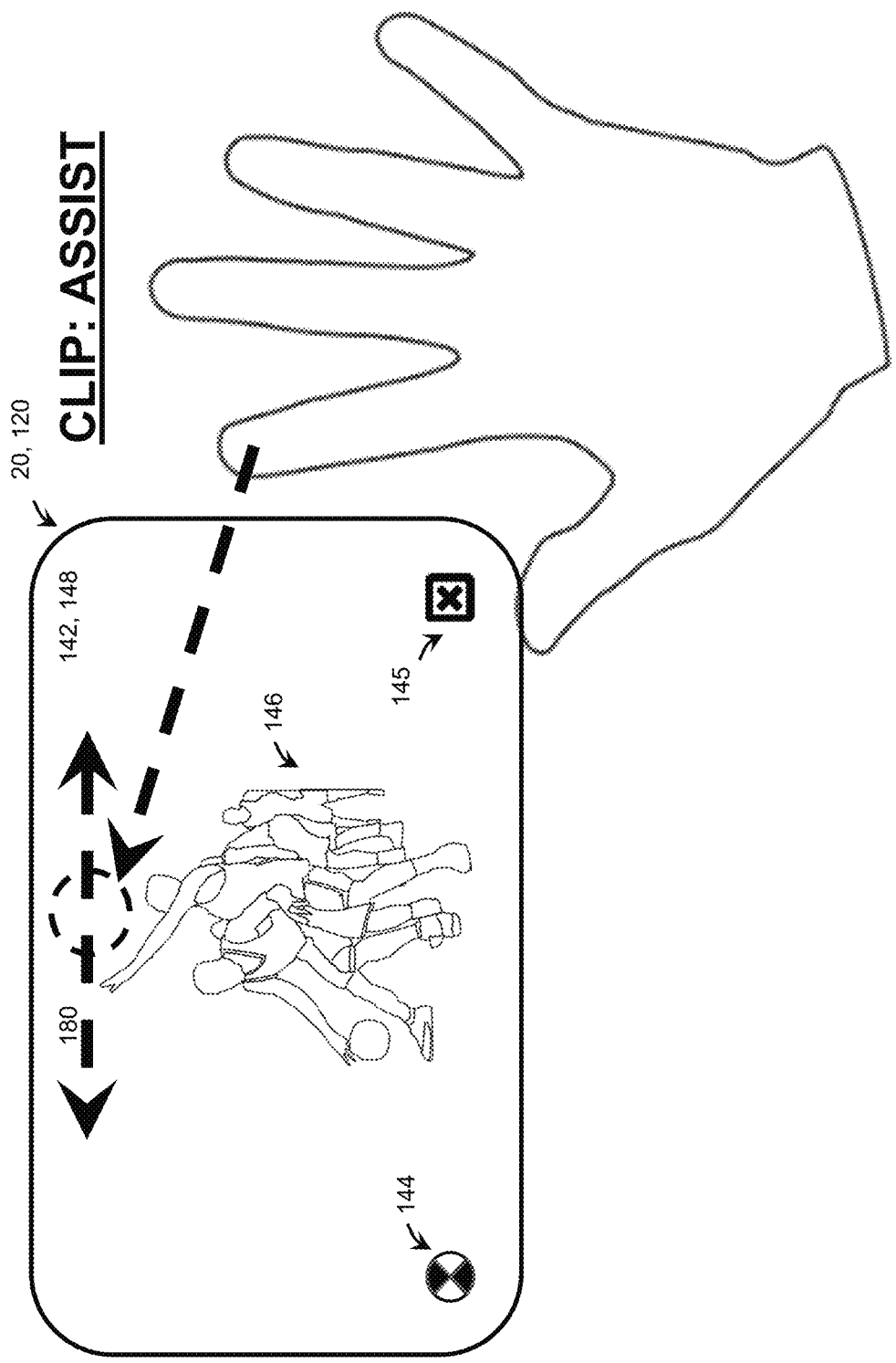
FIG. 19 is a top view of an embodiment of the programmed device, illustrating one finger swiping laterally on the screen to generate a clip input and record an assist during the advanced mode recording session.

(g) As illustrated in FIG. 19, if the user laterally drags or swipes one or more fingers from left to right or right to left on the touchscreen 148 along a lateral or substantially lateral path 180, the lateral swiping input has a lateral or horizontal input characteristic associated with a lateral or horizontal path of a passed ball (e.g., the passing of a basketball from one player to another player who scores). In an embodiment, this lateral or horizontal input characteristic is associated with the passing or movement of a ball or sports object substantially laterally or horizontally across a court or sports area. In basketball, the user could provide this input when a player passes a ball that results in an assist. This input causes the programmed device 120 to simultaneously save or record one assist and generate or capture the associated video clip, as described below. In an embodiment illustrated in FIGS. 14 and 19, if the user drags one or more fingers along substantially lateral path 180, the programmed device 120 simultaneously: (i) saves or records one assist; (ii) generates or captures the associated video clip, as described below; and (iii) displays a statistics capture confirmation, such as a "ASSIST" appearing momentarily on the touchscreen 148 and then disappearing as indicated in FIG. 14.

Figure 20:
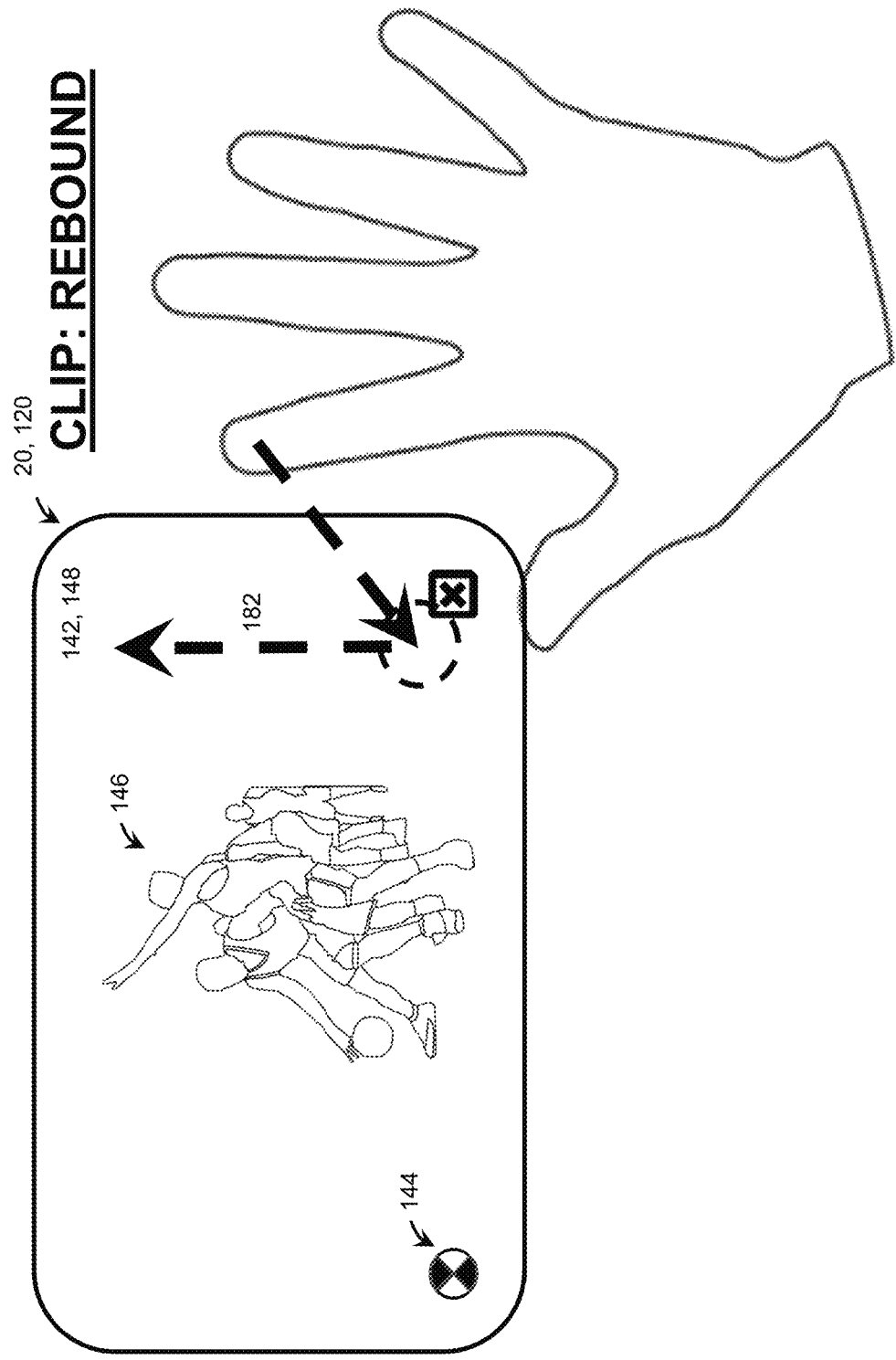
FIG. 20 is a top view of an embodiment of the programmed device, illustrating one finger swiping vertically on the screen to generate a clip input and record a rebound during the advanced mode recording session.

(h) As illustrated in FIG. 20, if the user vertically drags or swipes one or more fingers upward on the touchscreen 148 along an upward or substantially upward path 182, the upward swiping input has a rise, jumping, vertical or upward input characteristic associated with the substantially upward path 182 of the rising motion of a player jumping upward (e.g., the upward jumping of a basketball player to rebound a ball). In an embodiment, this upward input characteristic is associated with the rebounding of a ball or sports object. In basketball, the user could provide this input when a player successfully rebounds a ball. This input causes the programmed device 120 to simultaneously save or record one rebound and generate or capture the associated video clip, as described below. In an embodiment illustrated in FIGS. 14 and 20, if the user drags one or more fingers along the substantially upward path 182, the programmed device 120 simultaneously: (i) saves or records one rebound; (ii) generates or captures the associated video clip, as described below; and (iii) displays a statistics capture confirmation, such as a "REBOUND" or a symbol thereof appearing momentarily on the touchscreen 148 and then disappearing as indicated in FIG. 14.

Figure 21:
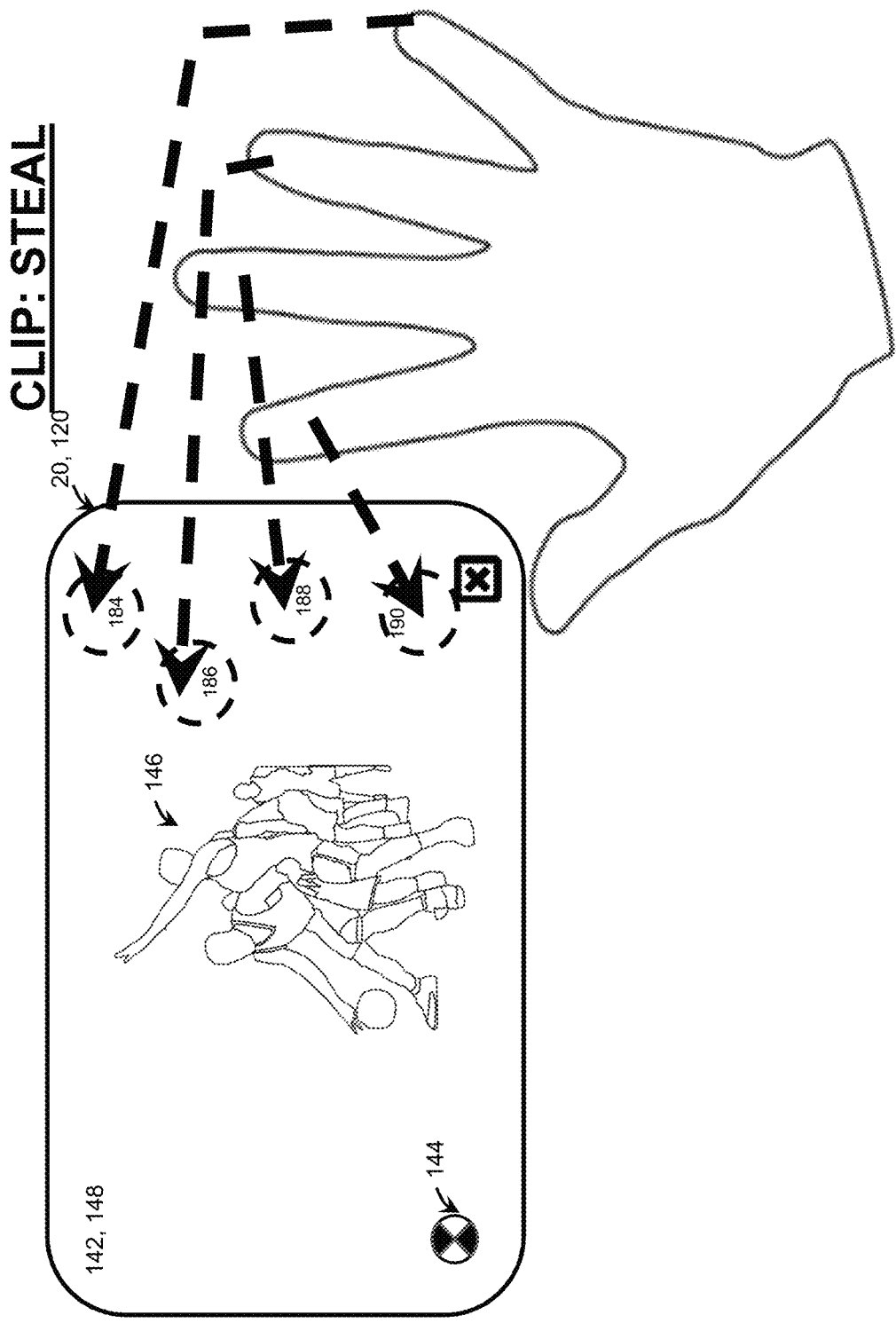
FIG. 21 is a top view of an embodiment of the programmed device, illustrating four fingers touching the screen to generate a clip input and record a steal during the advanced mode recording session.

(i) As illustrated in FIG. 21, if the user simultaneously presses or taps all four fingers (and optionally, the thumb) at any four spots 184, 186, 188, 190 or more on the touchscreen 148, this four-finger input has a hand input characteristic associated with an entire hand that is typically involved in stealing a ball from an opponent (e.g., a steal in basketball). This input causes the programmed device 120 to simultaneously save or record one steal and generate or capture the associated video clip, as described below. In an embodiment illustrated in FIGS. 14 and 21, if the user simultaneously presses or taps four fingers on any four spots 184, 186, 188 and 190 on the touchscreen 148, the programmed device 120 simultaneously: (i) saves or records one steal; (ii) generates or captures the associated video clip, as described below; and (iii) displays a statistics capture confirmation, such as "STEAL" or a symbol thereof appearing momentarily on the touchscreen 148 and then disappearing as indicated in FIG. 4.

Figure 22:
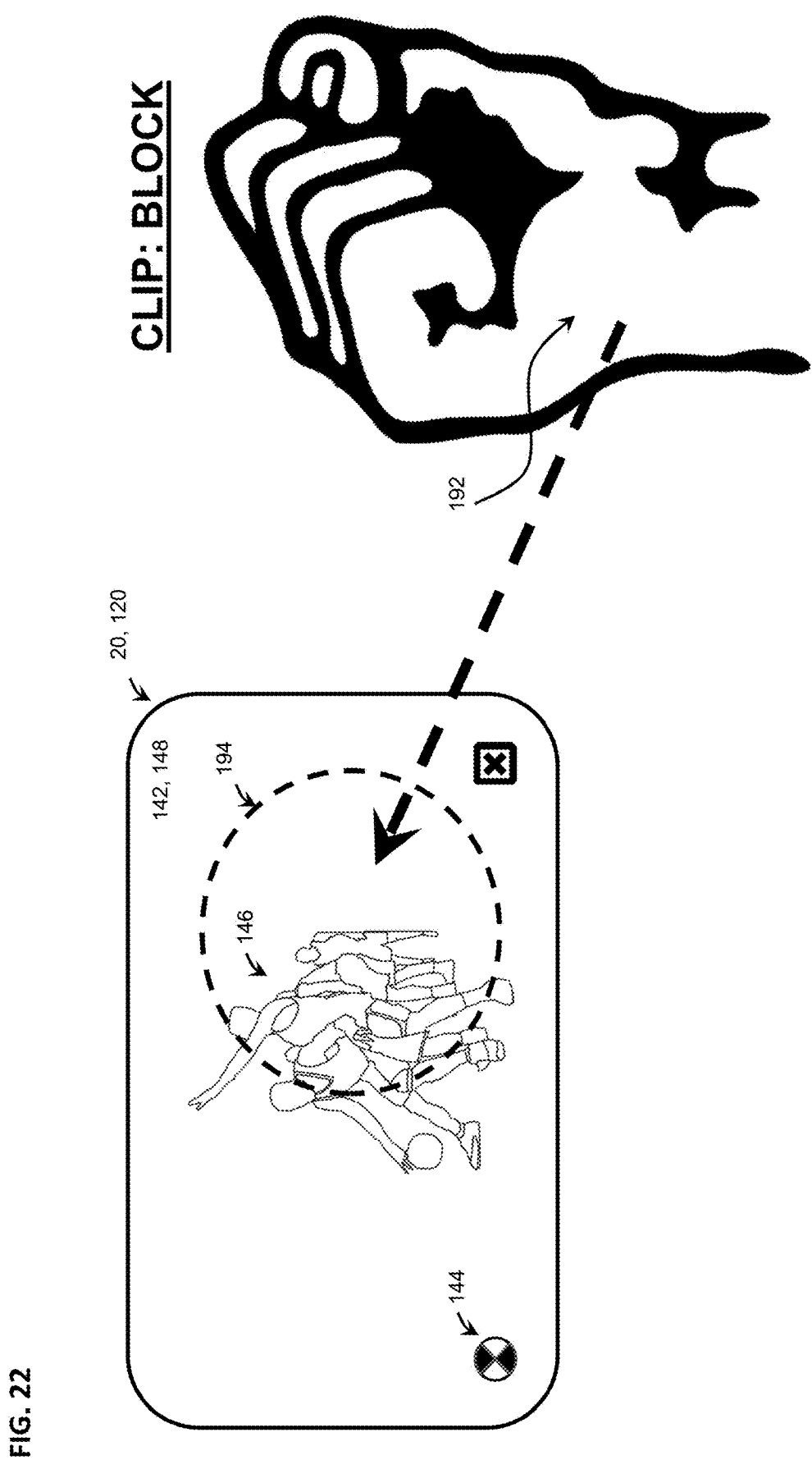
FIG. 22 is a top view of an embodiment of the programmed device, illustrating the base of a fist or hand touching the screen to generate a clip input and record a block during the advanced mode recording session.

(j) As illustrated in FIG. 22, if the user simultaneously presses or taps the palm or base 192 of a fist at any spot 194 on the touchscreen 148, this large surface or fist-shaped input has a powerful or protective input characteristic associated with a fight or action to block or reject an opponent (e.g., a block in basketball). This input causes the programmed device 120 to simultaneously save or record one block and generate or capture the associated video clip, as described below. In an embodiment illustrated in FIGS. 14 and 22, if the user simultaneously presses or taps the base 192 of the hand on any spot 194 on the touchscreen 148, the programmed device 120 simultaneously: (i) saves or records one block; (ii) generates or captures the associated video clip, as described below; and (iii) displays a statistics capture confirmation, such as "BLOCK" or a symbol thereof appearing momentarily on the touchscreen 148 and then disappearing as indicated in FIG. 14.

Figure 23:
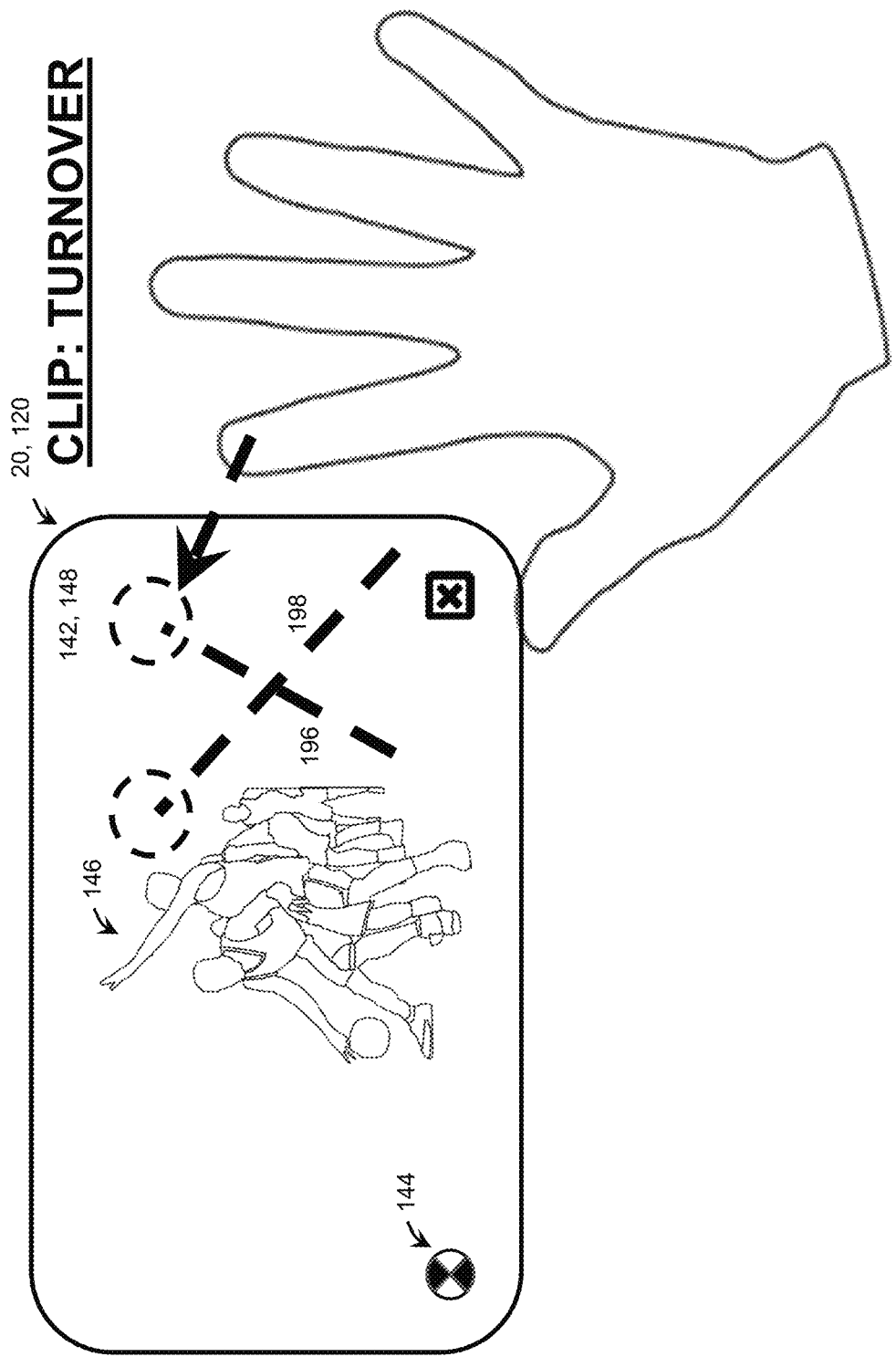
FIG. 23 is a top view of an embodiment of the programmed device, illustrating a finger marking an X on the screen to generate a clip input and record a turnover during the advanced mode recording session.

(k) As illustrated in FIG. 23, if the user vertically drags or swipes one or more fingers to draw an X by swiping along intersecting paths 196, 198, the X-shaped input has a cancel, error or negative input characteristic associated with a mistake, error or underperformance of a player (e.g., a turnover by a basketball player). In an embodiment, this negative input characteristic is associated with a turnover caused by a basketball, football or other athlete. In basketball, the user could provide this input when a player loses the ball or otherwise performs a turnover. This input causes the programmed device 120 to simultaneously save or record one turnover and generate or capture the associated video clip, as described below. In an embodiment illustrated in FIGS. 14 and 23, if the user drags one or more fingers along the intersecting paths 196, 198, the programmed device 120 simultaneously: (i) saves or records one turnover; (ii) generates or captures the associated video clip, as described below; and (iii) displays a statistics capture confirmation, such as a "TURNOVER" or a symbol thereof appearing momentarily on the touchscreen 148 and then disappearing as indicated in FIG. 14.

There are several challenges and difficulties that event attendees encounter when video recording events (e.g., games) while, at the same time, trying to document important statistics regarding the events. First, the attendee experiences a series of emotional rises and falls throughout the event. Often, the pivotal moments in the event can cause the attendee to momentarily lose attention of the video recording or statistics. These emotions increase the difficulty to reliably video record all of the important footage of a designated player while reliably recording all of the important statistics of such player.

The programmed device 120 overcomes or substantially decreases this difficulty by providing several technical advantages. As described further below, the video generator 28 of the programmed device 120 has a clipping logic that enables the attendee to capture important footage after the pivotal moments have occurred. This avoid the burden of trying to remember to cut or clip pivotal moments while the moments are occurring. Also, the correlations 166 of the advanced recording mode 162, described above, enable the attendee to seamlessly capture a video clip and the associated statistic at the same time based on a single input. In addition, the characteristic of the input resembles or relates to the statistic. For example, a tap of one finger relates to a statistic of one point. This provides a cognitive learning and memory advantage by making it easier to remember which type of input to provide for a given statistic. This enhanced human machine interface simplifies the overall process of capturing important video clips and recording important statistics related to the video clips.

In another embodiment illustrated in FIGS. 24A-25B, the programmed device 120 generates a recording interface 202 in response to the user's activation of the video camera symbol 78 (FIG. 3A). The recording interface 202 includes a start/stop element 204, a wrap-up or exit element 206, a highlight clip element 208 and a lowlight clip element 210. The start/stop element 204 includes an on indicator, such as an illuminated or colored graphic as well as a timer. In the example shown in FIG. 24A, the start/stop element 204 is a basketball symbol, and once the user presses or taps the start/stop element 204, the perimeter of the basketball symbol has an illuminated orange circle or arc, and the timer continuously increments from 0:00 to 0:01 to 0:02 to 0:03 and eventually to 1:19 and onward. To generate or capture a video clip of important, positive footage (e.g., a score, steal, assist, rebound or other highlight 212) the user can press or tap the highlight clip element 208. In the example shown, the highlight clip element 208 is a fire symbol. To generate or capture a video clip of important, negative footage (e.g., a turnover, missed shot, error, mistake, blunder, underperformance, inappropriate behavior of a coach, or other lowlight) the user can press or tap the lowlight clip element 210. In the example shown, the lowlight clip element 210 is an ice or icicle symbol. When the user is ready, such as at the end of the game, the user can press or tap the wrap-up or exit element 206. In response, the programmed device 120 displays the publish decision interface 156 (FIG. 13A) which, in turn, displays the continue recording element 158 and publish now element 160, as described above.

Figure 26:
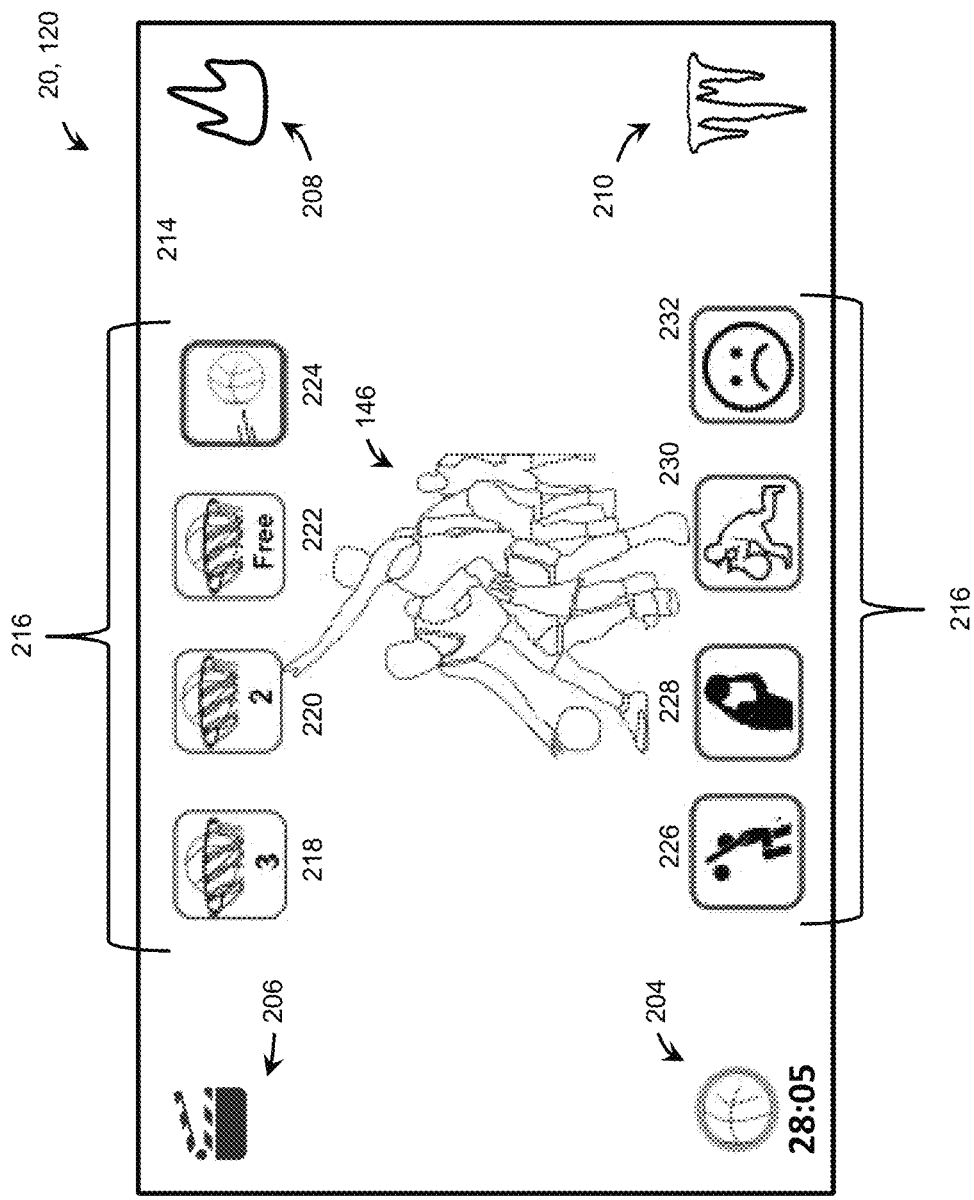
FIG. 26 is a top view of an embodiment of the programmed device, illustrating the recording interface having different categories of clip elements (e.g., highlight clip elements and lowlight clip elements) and selectable statistics symbols for the advanced mode recording session.

In another embodiment illustrated in FIG. 26, the programmed device 120 generates a recording interface 214 in response to the user's activation of the video camera symbol 78 (FIG. 3A). In this embodiment, the recording interface 214 displays a set of statistics symbols 216. In the basketball example shown, the statistics symbols 216 include a three point symbol 218, a two point symbol 220, a free throw (one point) symbol 222, an assist symbol 224, a block symbol 226, a rebound symbol 228, a steal symbol 230, and a turnover symbol 232.

In an embodiment, the recording interface 214 enables the user to generate video clips while recording statistics through use of the statistics symbols 216. Depending upon the embodiment, the recording interface 214: (a) displays the solid images of the statistics symbols 216 on top of the recorded imagery; or (b) displays the translucent or partially transparent images of the statistics symbols 216 on top of the recorded imagery.

In an embodiment, the recording interface 214 includes and displays a statistics icon (not shown), such as an image of a clipboard or statistics book. During the recording session, the recording interface 214 displays such statistics icon, and the default is to hide (or otherwise not display) the statistics symbols 216. When the user presses the statistics icon, the recording interface 214 displays or pops-up the statistics symbols 216. This enables the user to select the appropriate statistics symbols 216 to record the applicable statistic.

In various embodiments described above, the type of inputs from the user to the programmed device 120 involves a touching or tapping of the touchscreen 148. It should be appreciated that, in other embodiments, the user can provide alternate types of inputs. In such embodiments, it is not necessary for the programmed device 120 to have a touchscreen 148.

In an embodiment, the system 13 enables the programmed device 120 to receive audio or sound inputs for voice commands. In a setup process, the programmed device 120 enables the user to train the programmed device 120 to recognize sound signatures or unique voice sounds produced by the user. For example, the user can output different oral statements into the microphone of the programmed device 120. The oral statements corresponds to different types of statistics, such as "ONE," "TWO," "THREE," "ASSIST," "REBOUND," "STEAL," "BLOCK," and "TURNOVER."

In this embodiment, the programmed device 120 includes a comparator that compares the user's unique voice to the environmental sounds, such as the roars of the crowd and voice commands of other attendees in the audience who are using programmed devices 120 on their electronic devices. The comparator identifies the user's voice so that the programmed device 120 does not register non-user sounds as voice commands by the user. In an embodiment, the programmed device 12 includes a sound confusion inhibitor that enables the user to record a unique voice activation sound, such as the first name, last name, initial or jersey number of the particular player for which the user is recording statistics. For example, the voice activation sound could be "JOHN," JUSTICE" or "J." In such example, the oral statements corresponding to the different types of statistics could be as follows: "J ONE," "J TWO," "J THREE," "J ASSIST," "J REBOUND," "J STEAL," "J BLOCK," and "J TURNOVER." If the user does not speak "J" before speaking the applicable statistic, the system 13 will not record such statistic.

In an embodiment, the programmed device 120 displays a pop-up or confirmation of the recorded statistic to confirm the statistic that the user input through his/her voice. For example, the system 13 can cause the programmed device 120 to display "ONE POINT" by itself or "ONE POINT" adjacent to a garbage symbol, in which case the user can press the garbage symbol if such statistic is wrong. If the user taps the garbage symbol, the programmed device 120 discards or otherwise does not record such erroneous statistic.

In another embodiment, the programmed device 120 enables the user to provide inputs through physical interaction with the programmed device 120, such as by applying forces to the programmed device 120, accelerating or moving the programmed device 120 or changing the orientation or position of the programmed device 120 (e.g., rotating or twisting the programmed device 120). In such embodiment, the programmed device 120 includes one or more sensors (including, but not limited to, accelerometers) configured to sense or detect forces, light changes, movement or positional change of the programmed device 120. For example, to start or stop a recording session, the system 13 can enable the user to quickly turn the programmed device 120 face up (to start) or face down (to stop). In another example, the system 13 can enable the user to record inputs for different statistics by: (a) sharply tapping the back case of the programmed device 120 one time to record one point; (b) sharply tapping the back case of the programmed device 120 two times to record two points; and (c) sharply tapping the back case of the programmed device 120 three times to record three points.

As described above, the recording options 110 (FIG. 6A) enable the user to select the default or standard cutback 116 and cutforward 120 or to input a custom cutback 118 and custom cutforward 122. The user can, for example, input ten seconds for the custom cutback 118. If the user selects the standard cutback 116 (e.g., five seconds), the video generator 28 reaches backward five seconds to initiate the cut for the applicable video clip, as described below.

Figure 27:
FIG. 27 is a top view of an embodiment of a cutback pop-up of the programmed device.

In an embodiment, when the user provide an input to generate a video clip, the programmed device 120 displays a cutback pop-up 234 as illustrated in FIG. 27. This enables the user to switch to the custom cutback 118 on a case-by-case basis. For example, a player may have been involved in action that lasted for a relatively long period, such as a 75 yard run by a football player or a basketball player's steal, then turnover, then recovery of the ball, then drive and dunk. If the user encounters such lengthy action, the user may desire to tap the cutback pop-up 234. In response, the programmed device 120 will cut the beginning of the clip, ten seconds before the time of the user's clip input.

Referring to FIGS. 28-30B, in an embodiment, the electronic device 120 generates a video through a clipping process. During the recording session, the video generator 28 of the programmed device 120 is operable to generate a data list 236. Also, during the recording session, the programmed device 120 generates a video track 238 (FIGS. 30A-30B) over a period of time.

In the examples described, the time increments are seconds. It should be appreciated, however, that the time increments can be milliseconds or any other suitable increment. Also, the programmed device 120 is operable to generate and store the video track 238 through a rate capture rate within the range of thirty to one thousand frames per second (FPS) or through a rate capture rate of any other suitable FPS.

In the example shown, once the recording session starts, the programmed device 120 generates and stores a continuous stream, track or series of timestamps in chronological order based on a suitable time increment. In the example shown, the increment is seconds, and the programmed device 120 generated timestamps one through twenty-three. In this example, the user provided a first clip input at the point of twelve seconds, as indicated by the first arrow A1 shown in FIG. 30B. In response, the programmed device 120 flagged, marked or bookmarked the twelve second point by storing a suitable data marker A1 (FIG. 28), which corresponds to the first clip input. At the same time or thereafter, the programmed device 120 flagged, marked or bookmarked the seven second point by storing a suitable data marker A2 (FIG. 28), which corresponds to the first rearward point. Later, the user provided a second clip input at the point of twenty seconds, as indicated by the second arrow A3 shown in FIG. 30B. In response, the programmed device 120 flagged, marked or bookmarked the twenty second point by storing a suitable data marker A3 (FIG. 29), which corresponds to the second clip input. At the same time or thereafter, the programmed device 120 flagged, marked or bookmarked the fifteen second point by storing a suitable data marker A4 (FIG. 29), which corresponds to the second rearward point.

Figure 30A:
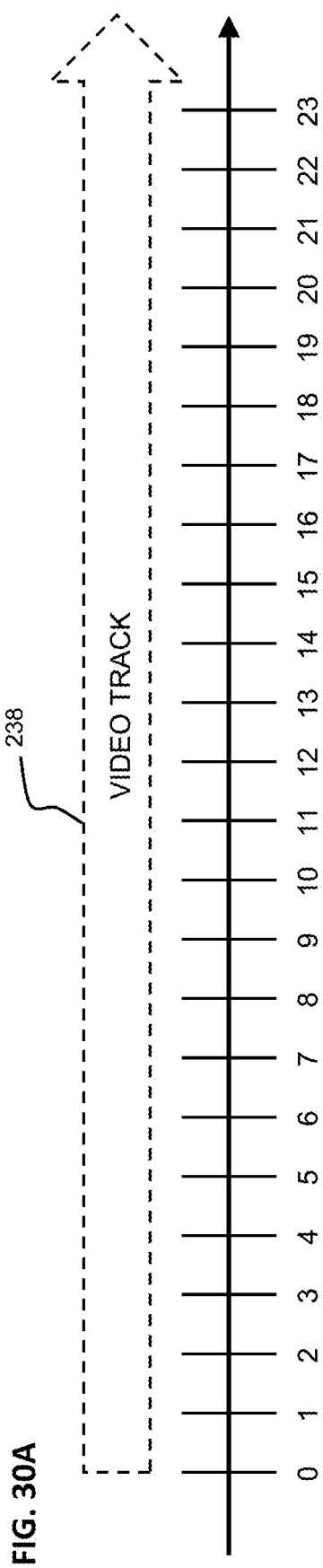
FIG. 30A is a schematic diagram illustrating a video track generated during a period of time during a recording session of the programmed device.
Figure 30B:
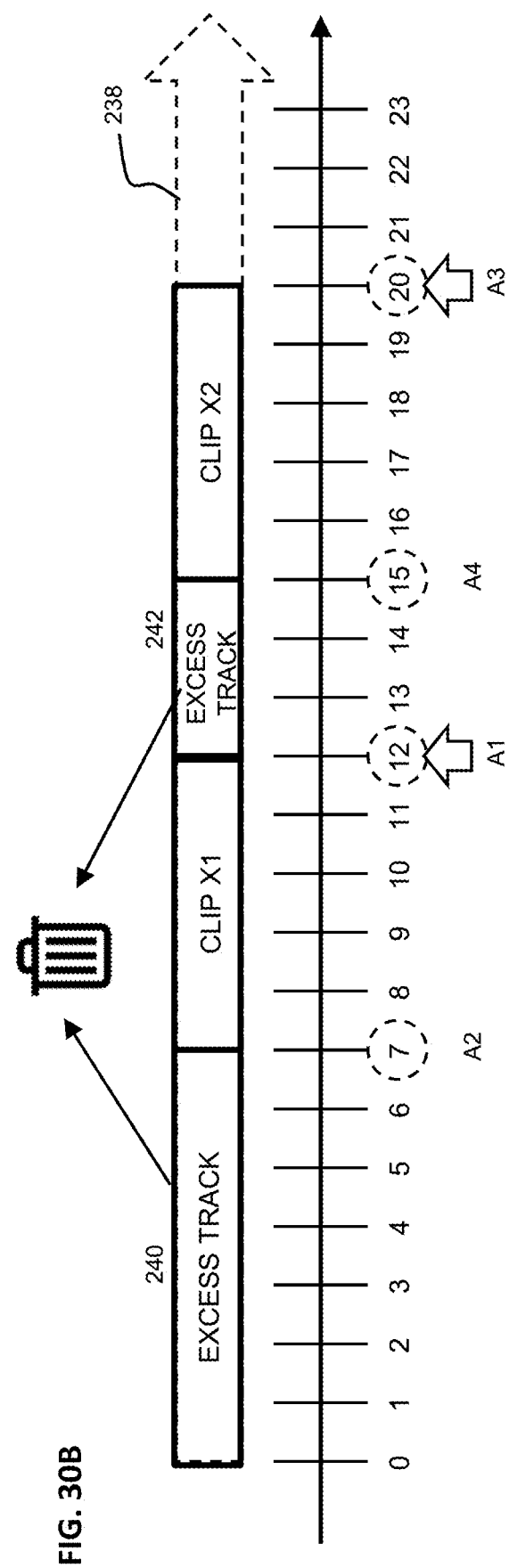
FIG. 30B is a schematic diagram illustrating the bookmarking process corresponding to the data list of FIGS. 28-29 to determine or identify excess tracks and desired clips.

As illustrated in FIG. 30B, the video track 238 includes a video clip X1 between the data markers A2 and A1, and the video track 238 includes a video clip X2 between the data markers A4 and A3. In this example, during the recording session the programmed device 120 automatically cut-out and deleted the excess tracks 240, 242 from the video track 238, and the programmed device 120 automatically deleted the excess track 240 before recording the excess track 242. As described above, this helps preserve data storage capacity on the programmed device 120. In an embodiment, the programmed device 120 automatically deletes the excess track 240 immediately in response to the first clip input at A1, and the programmed device 120 automatically deletes the excess track 242 immediately in response to the second clip input at A3. In other embodiments, as described below, the programmed device 120 deletes the excess tracks after the recording session ends, not during the recording session.

In another embodiment, the clipping process involves look-rearward and look-forward steps. In the example shown in FIGS. 30-33, once the recording session starts, the video generator 28 of programmed device 120 is operable to generate a data list 244. The video generator 28 stores a continuous stream, track or series of timestamps in chronological order based on a suitable time increment. In the example shown, the increment is seconds, and the programmed device 120 generated timestamps one through twenty-three. In this example, the user provided a first clip input at the point of ten seconds, as indicated by the first arrow B1 shown in FIG. 33. In response, the programmed device 120 flagged, marked or bookmarked the ten second point by storing a suitable data marker B1 (FIG. 31), which corresponds to the first clip input. At the same time or thereafter, the programmed device 120 flagged, marked or bookmarked the five second point by storing a suitable data marker B2 (FIG. 31), which corresponds to the first rearward point. Simultaneously or a moment thereafter, the programmed device 120 flagged, marked or bookmarked the twelve second point by storing a suitable data marker B3 (FIG. 31), which corresponds to the first forward point.

Later, the user provided a second clip input at the point of twenty seconds, as indicated by the second arrow B4 shown in FIG. 33. In response, the programmed device 120 flagged, marked or bookmarked the twenty second point by storing a suitable data marker B4 (FIG. 32), which corresponds to the second clip input. At the same time or thereafter, the programmed device 120 flagged, marked or bookmarked the fifteen second point by storing a suitable data marker B5 (FIG. 32), which corresponds to the second rearward point. Simultaneously or a moment thereafter, the programmed device 120 flagged, marked or bookmarked the twenty-two second point by storing a suitable data marker B6 (FIG. 33), which corresponds to the second forward point.

Figure 33:
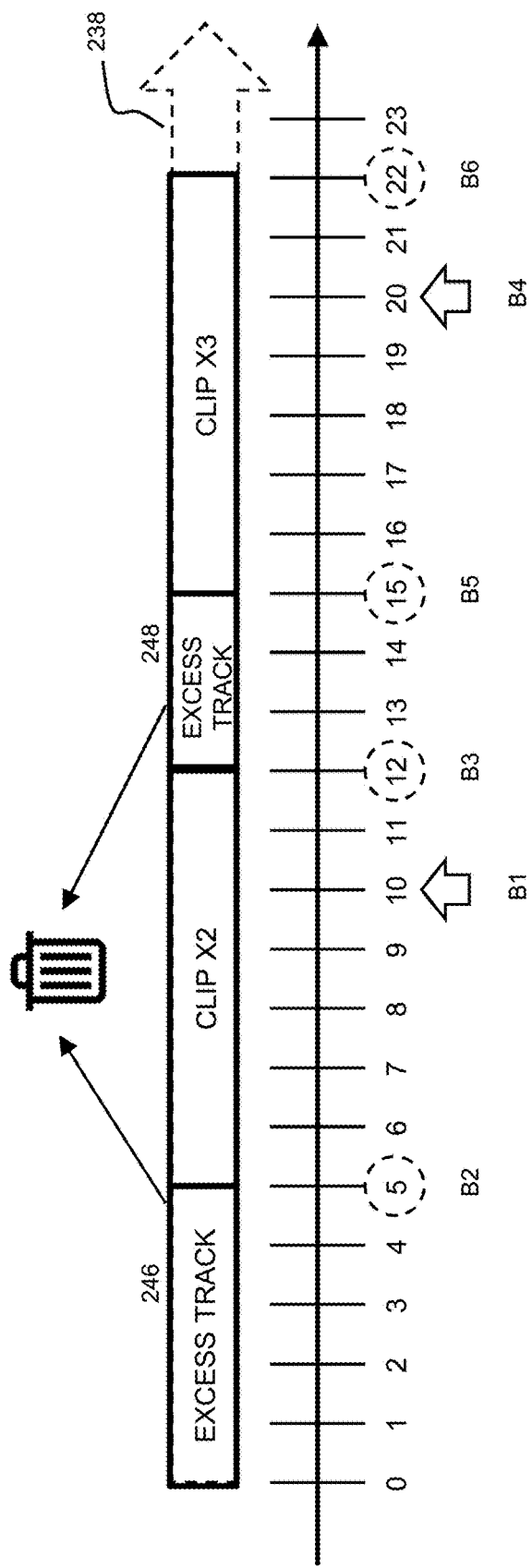
FIG. 33 is a schematic diagram illustrating the bookmarking process corresponding to a data list of FIGS. 31-32 to determine or identify excess tracks and desired clips.

As illustrated in FIG. 33, the video track 238 includes a video clip X2 extending continuously between the data markers B2 and B3, and the video track 238 includes a video clip X3 extending continuously between the data markers B6 and B5. In this example, during the recording session the programmed device 120 automatically cut-out and deleted the excess tracks 246, 248 from the video track 238, and the programmed device 120 automatically deleted the excess track 246 before recording the excess track 248. As described above, this helps preserve data storage capacity on the programmed device 120. In other embodiments, as described below, the programmed device 120 deletes the excess tracks after the recording session ends, not during the recording session.

In another embodiment, the clipping process involves interference management in addition to the look-rearward and look-forward steps described above. In the example shown in FIGS. 34-36, once the recording session starts, the video generator 28 of programmed device 120 is operable to generate a data list 250. The video generator 28 stores a continuous stream, track or series of timestamps in chronological order based on a suitable time increment. In the example shown, the increment is seconds, and the programmed device 120 generated timestamps one through twenty-three. In this example, the user provided a first clip input at the point of ten seconds, as indicated by the first arrow C1 shown in FIG. 36. In response, the programmed device 120 flagged, marked or bookmarked the ten second point by storing a suitable data marker C1 (FIG. 34), which corresponds to the first clip input. At the same time or thereafter, the programmed device 120 flagged, marked or bookmarked the five second point by storing a suitable data marker C2 (FIG. 36), which corresponds to the first rearward point. At the same time or thereafter, the programmed device 120 flagged, marked or bookmarked the twelve second point by storing a suitable data marker C3 (FIG. 36), which corresponds to the first forward point.

Later, the user provided a second clip input at the point of fourteen seconds, as indicated by the second arrow C4 shown in FIG. 36. Notably, the second clip input occurs soon after the first clip input, only four seconds later. This could occur, for example, if the user provides a sequence of two or more clip inputs in rapid successions to capture separate, important moments, such as a football player's sacking of a quarterback, obtaining the football and then scoring a touchdown. Since the clip inputs occur close in time, the programmed device 120 ensures that subsequent clip inputs do not interfere with previously captured video clips and do not cause the deletion of desired video clips.

Accordingly, in response to the second clip input at C4, the programmed device 120 checks to determine whether any forward point timestamp has been marked that occurs in time less than five seconds before the second clip input C4. In this case, five seconds before C4 is the nine second point, and the first forward point C3 occurs at the twelve second point. Consequently, the programmed device 120 uses the marker C3 as the data marker for the second rearward point. Therefore, the data marker C3 is associated with both a forward point and a rearward point. At the same time or thereafter, the programmed device 120 flagged, marked or bookmarked the sixteen second point by storing a suitable data marker C5 (FIG. 36), which corresponds to the second forward point.

Figure 36:
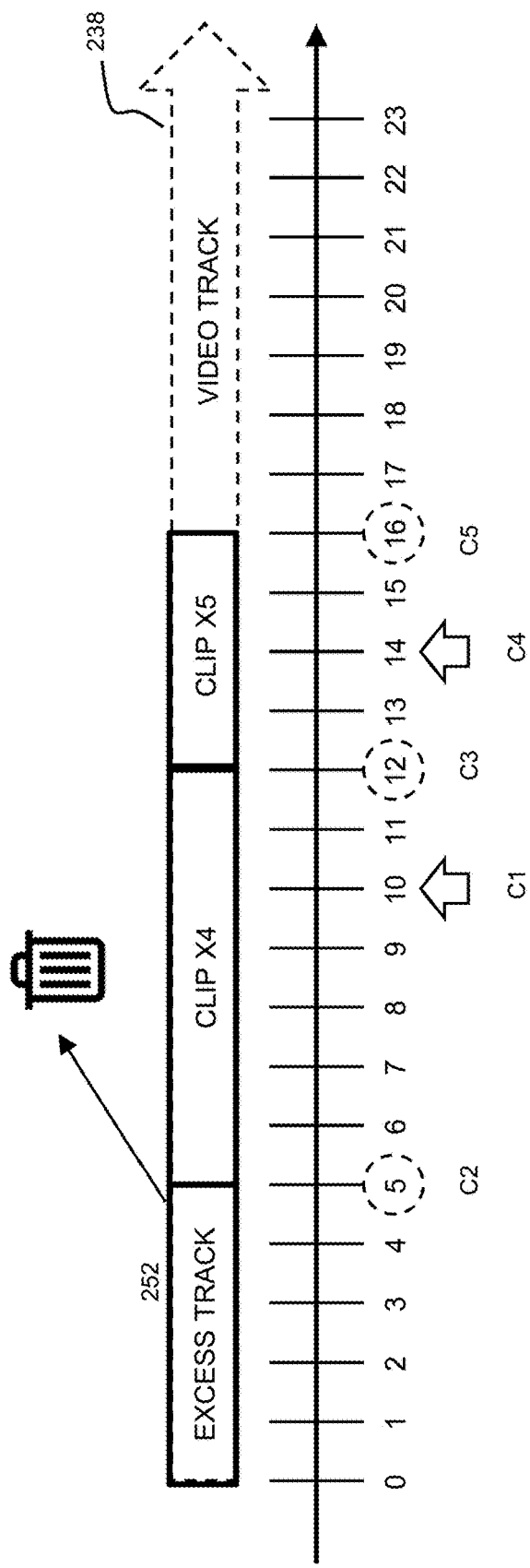
FIG. 36 is a schematic diagram illustrating the bookmarking process corresponding to the data list of FIGS. 34-35 to determine or identify excess tracks and desired clips.

As illustrated in FIG. 36, the video track 238 includes a video clip X4 extending continuously between the data markers C2 and C3, and the video track 238 includes a video clip X5 extending continuously between the data markers C3 and C5. In this example, during the recording session the programmed device 120 automatically cut-out and deleted the excess track 252 from the video track 238, and the programmed device 120 automatically deleted the excess track 252 after determining that the rearward point C2 is not the forward point of any previous video clip. As described above, in this example, the second clip input C4 did not cause the programmed device 120 to delete any portion of video clip X4 because the programmed device 120 determined that the rearward point C3 of the video clip X5 is the forward point C3 of video clip X4. An advantage of this interference management function is to safeguard against the undesirable deletion of video clips. In other embodiments, as described below, the programmed device 120 deletes the excess tracks after the recording session ends, not during the recording session.

Figure 37:
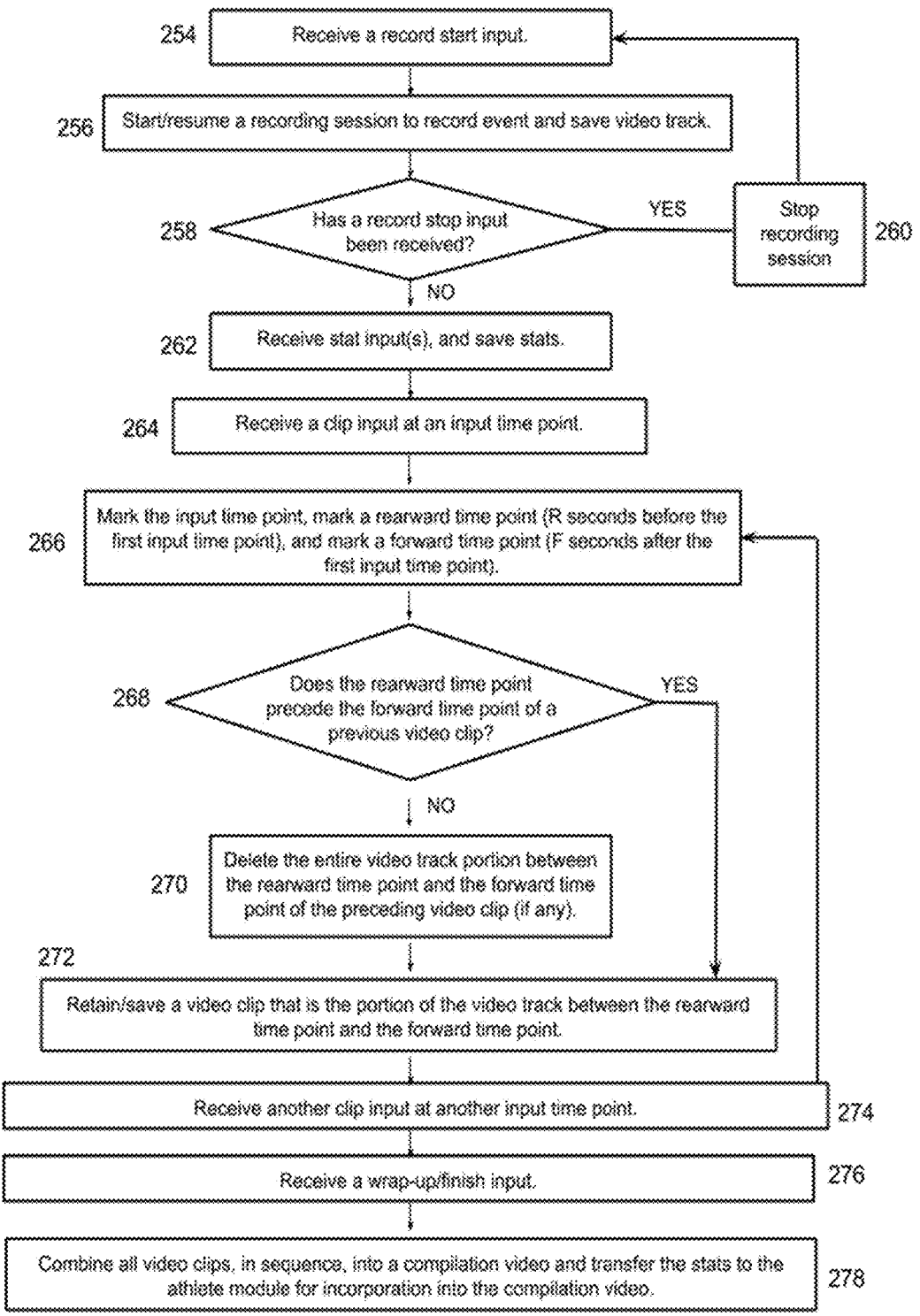
FIG. 37 is a flow chart illustrating an embodiment of the recording method of the programmed device.
Figure 38:
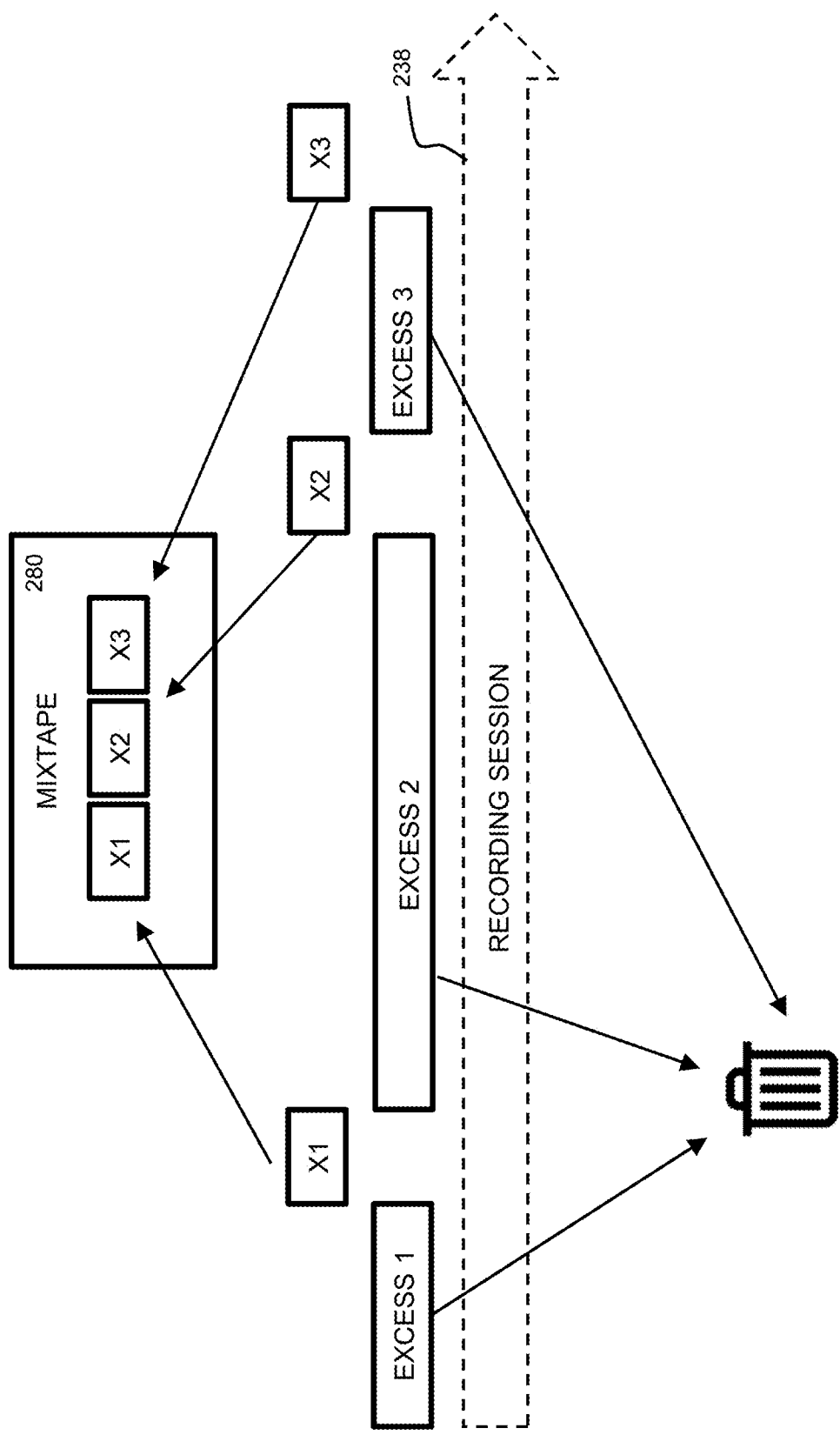
FIG. 38 is a schematic diagram illustrating the results of the recording method of FIG. 37.

Referring to FIGS. 37-38, in an embodiment, the programmed device 120 generates a video based on a bookmarking process. First, as indicated by step 254, the programmed device 120 receives an input that starts the recording session, such as the user's tapping of the start/stop element 144 (FIG. 8) or start/stop element 204 (FIG. 24A). In this example, the user taps the start/stop element at the zero time point. As indicated by step 256, the programmed device 120 then records the event (e.g., a basketball game or debate competition), and the programmed device 120 continuously stores or saves the footage or video track 238 as the event is being recorded. The programmed device 120 can save the video track 238 within a memory device component of the programmed device 120, within a data storage disk operatively coupled to the programmed device 120, or within a data storage device that is remote from the programmed device 120, such as a webserver or data storage device 12 (FIG. 1).

During the recording session, the programmed device 120 determines whether the user has provided a stop input as indicated by the decision diamond 258. If the answer is yes, the programmed device 120 pauses or stops the recording session, as indicated by the step 260, and then awaits for another start input as indicated by the step 254. If the answer is no, the programmed device 120 continues the recording session.

During the recording session, the programmed device 120 is operable to receive a plurality of different statistic inputs from the user as indicated by step 262. The programmed device 120 stores the statistics (e.g., statistical data) associated with the statistic inputs. The programmed device 120 can save the statistics within a memory device component of the programmed device 120, within a data storage disk operatively coupled to the programmed device 120, or within a data storage device that is remote from the programmed device 120, such as a webserver or data storage device 12 (FIG. 1).

Next, the programmed device 120 receives a clip input at an input time point as indicated by step 264. Next, as indicated by step 266, the programmed device 120 performs the following steps: (a) flags or bookmarks the input time point; (b) flags or bookmarks a rearward time point at R seconds (e.g., five seconds) before the input time point; and (c) flags or bookmarks a forward time point at F seconds (e.g., two seconds) after the input time point.

The automatic marking rearward in time and the automatic marking forward in time solve a pervasive problem experienced by typical users of prior art (conventional) recording devices. Users often miss important footage because they start or stop the video recording at the wrong times. For example, to save data storage capacity, users manually decide when to start and stop recording. When distracted, they often press the start button too late, so that the first part of the important footage is lost. Also, they often press the stop button too early, cutting off important footage. The programmed device 120 solves this problem by enabling the user to continuously record, taking advantage of the auto-deletion function described below. While recording, the programmed device 120 automatically captures the valuable moments by causing the clip marking to occur rearward and forward of the user's input time point.

After step 266, the programmed device 120 determines whether the rearward time point precedes the forward time point of the previous video clip, if any, as indicated by decision diamond 268. This step is important to avoid the undesired deletion of previously saved video clips, as described above. If the answer is no, the programmed device 120 proceeds to step 270. If the answer is yes, the programmed device 120 proceeds to step 272.

The answer may be no because there were no previously saved video clips. Also, the answer may be no because the forward time point of the most recently saved video clip is before the rearward time point. In any case, if the answer is no, the programmed device 120 automatically deletes the entire portion of the video track 238 that occurs between the rearward time point and the forward time point of the most recent, preceding video clip as indicated by step 270. If there are no previously saved video clips, the programmed device 120 automatically deletes the entire portion of the video track 238 that occurs before the rearward time point.

The programmed device 120 achieves several technical advantages by performing this auto-deletion function. Many events involve one or more relatively short, valuable actions or moments nested among dull, uninteresting or unimportant moments. For example, this is often the case for sports games, school debates, personal interviews and other events that are relatively long in duration. The prior art (conventional) process of editing a video after the recording is finished, can be time consuming, painstaking and burdensome. For example, producing a highlight video using the prior art process can take hours to edit the video tracks of an athlete's performance in a single game. Consequently, many videos with valuable moments are rarely viewed. People do not have the time or patience to watch long videos only to see a few valuable moments in the video. Nonetheless, for the sake of saving the valuable moments, users commonly save the full length of the videos on their prior art (conventional) mobile devices or on prior art (conventional) web servers.

This causes their prior art (conventional) mobile devices to reach maximum storage capacity, often in the midst of an event. Also, when users upload the full length videos to prior art (conventional) webservers, the webserver data centers consume substantial amounts of energy. For example, it has been reported that the data centers of Facebook®, YouTube® and others consume the equivalent of the energy output of numerous coal-fired power plants. Much of this energy goes to powering the webservers and keeping them cool. This energy is known to cause greenhouse gas emissions, resulting in a rising level of global pollution.

As described above, the auto-deletion function of the system 13 helps free-up data storage capacity in electronic devices 120 (e.g., smartphones) and in data storage devices 12 (e.g., webservers). In an embodiment, while the user records an event, the programmed device 120 purges or deletes the portions of the video track that contain dull, uninteresting or unvaluable footage. In such embodiment, the programmed device 120 performs this deletion dynamically during and throughout the recording session. By automatically deleting the excess tracks during the recording session, the programmed device 120 is less likely to reach maximum data storage capacity.

After the deletion step 270, the programmed device 120 proceeds to step 272. At step 272, the programmed device 120 retains or otherwise saves a video clip that is the portion of the video track 238 between the rearward time point and the forward time point. Accordingly, the programmed device 120 captures the applicable video clip of interest to the user. In an embodiment, the programmed device 120 retains such video clip within the video track 238 that is saved by the programmed device 120. In another embodiment, the programmed device 120 generates and saves a copy of such video clip and then deletes the original video clip from the video track 238.

As the recording session continues, the programmed device 120 receives another clip input at another input time point as indicated by step 274. Eventually, the user will be ready to end the recording session, such as at the end of the event. To do so, as indicated by step 276, the user provides a publish input or finish input by providing an input associated with the wrap-up, finalization or publication of a compilation video. Depending upon the embodiment, the user can provide this finish input by pressing the exit element 145 (FIG. 8), covering the rear camera lens 154 (FIG. 11), providing a sound input or providing another type of input.

In response to the finish input, the programmed device 120 performs the following steps as indicated by step 278: (a) combines and consolidates all of the saved video clips X1, X2, X3 (FIG. 38) in a chronological sequence with the first generated video clip occurring first, and the last generated video clip occurring last, resulting in a compilation video 280 (FIG. 38); and (b) transfers the recorded stats to the publication module 31. Based on the auto-deletion function described above, the programmed device 120 deleted the video track portions EXCESS 1, EXCESS 2, and EXCESS 3 from the video track 238. In an embodiment, the compilation video 280, such as a highlight video or so-called mixtape, has no blanks, null periods or blackout screens between the video clips X1, X2, X3. The compilation videos 60, 61, 62 shown in FIG. 3A are videos, such as compilation video 280, produced by the programmed device 120. As described below, the programmed device 120 enables the user to add the recorded stats to a front video image of the compilation video 280.

It should be appreciated that, depending upon the embodiment, the programmed device 120 can perform the auto-deletion function during or after the recording session. For example, in an embodiment, the programmed device 120 deletes the track portions EXCESS 1, EXCESS 2, and EXCESS 3 after the recording session ends in response to the finish input provided by the user. Such embodiment addresses the possibility that deleting the excess tracks during the recording session can overload or impair the processor of programmed device 120 depending upon the power of the processor. For example, by bookmarking during the recording without deleting, the processor of the programmed device 120 will have more power availability to generate the video track 238. By automatically deleting the excess tracks after the recording session, the programmed device 120 is less likely to reach maximum data storage capacity during subsequent recording sessions.

Figure 39:
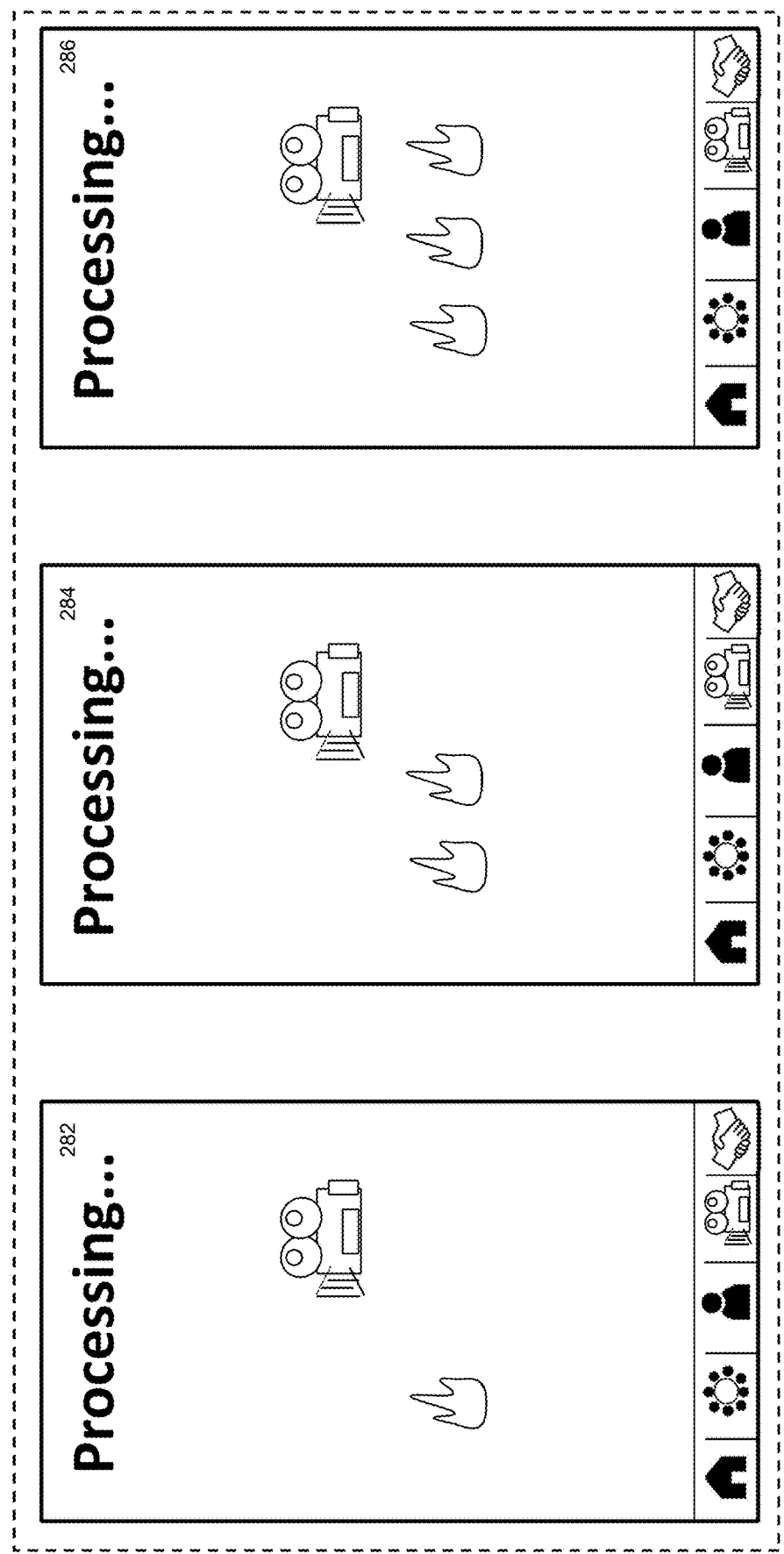
FIG. 39 is a top view of an embodiment of the processing interfaces of the programmed device.

As illustrated in FIG. 39, in response to the finish input, the programmed device 120 generates processing interfaces 282, 284, 286. This indicates that the programmed device 120 is in the process of generating the compilation video 280. Depending upon the embodiment, this process could take a fraction of second to several seconds. Next, referring to FIG. 40A, the programmed device 120 generates the primary video categorizer interface 287 in accordance with the publication module 31 (FIG. 1). The primary video categorizer interface 287 enables the user to enter a plurality of participant descriptors corresponding to a plurality of different descriptor categories, such as the event type, gender, age and zip code of or associated with the participant in the event. In response to the next element 289, the programmed device 120 generates the secondary video categorizer interface 288 in accordance with the publication module 31 as illustrated by FIG. 40B. The secondary video categorizer interface 288 indicates a plurality of selectable video categories, such as Athlete Highlights, Athlete Development, Athlete Lowlights, AAU Team, Camp, College Recruiter, Physical Therapist, Sports Agent, Trainer and Tutor. In the example shown, the user selected the Athlete Highlights category.

In an embodiment, the programmed device 120 requires the user or video submitter to input at least one descriptor or a minimum amount of descriptors through the primary video categorizer interface 287. If the video submitter fails to do so, the programmed device 120 blocks, prevents or disables the distribution of the applicable compilation video to the home interface 54 (FIG. 3A). Accordingly, such video will not be published through the home interface 54.

In another embodiment, the programmed device 120 requires the user or video submitter to input a minimum amount of descriptors through the primary video categorizer interface 287 and the secondary video categorizer interface 288. If the video submitter fails to do so, the programmed device 120 blocks, prevents or disables the distribution of the applicable compilation video to the home interface 54 (FIG. 3A). Accordingly, such video will not be published through the home interface 54.

Referring again to FIG. 40B, in response to the user's selection of the next element 291, the programmed device 120 generates a public publication interface 290 in accordance with the publication module 31 as illustrated by FIG. 40C. As shown, the public publication interface 290 shows the first frame 292 of the compilation video 280. Also, the public publication interface 290 displays a plurality of data fields, including: (a) a caption field enabling the user to enter text describing the video, such as "Power Bornfreedom's Triple-Double!;" (b) a game date field; (c) an athlete field for the name of the highlighted athlete who is registered with the system 13, which is selectable from a list of athletes via a search interface; (d) a video shooter field for the name of the videographer or video producer (e.g., "MadSkilz TV") registered with the system 13 who is selectable from a list of video producers via a search interface; (e) a home field enabling the user to enter text describing the name of the home team, such as "Brightmore High School," which may be selectable via a search interface; (f) a mascot field for the name of the home team's mascot, which may be pre-populated based on the selection of the home team; (g) a visitor field enabling the user to enter text describing the name of the visitor team, such as "Calvary High School," which may be selectable via a search interface; (h) a league field for entry of the applicable sports league (e.g., "Chicago Public League") which may be selectable via a search interface; and (i) a plurality of statistics fields, such as a points field, steals field, assists field, blocks field, rebounds field and turnovers field. If the user inputs statistics during the recording sessions, as described above, the programmed device 120 automatically pre-populates the statistics fields with the different totals of the statistics input by the user. For example, the public publication interface 290 may automatically display "18" in the points field, "12" in the assists field, "10" in the rebounds field, "3" in the blocks field, and "5" in the steals field. If any of the statics fields are blank because the user decided not to record or input the applicable statistic during the recording session, the user can manually enter statistical text in such field. Also, the user can override any of the pre-populated statistics fields by changing the statistical text in such field.

The public publication interface 290 also displays a sound field or sound symbol. By selecting the sound symbol, the user can upload, download or otherwise capture a desired sound track or musical recording. Depending upon the embodiment, the source of the sound track can be the local data storage of the programmed device 120 or a web server. In an embodiment, once the user captures the sound track, the programmed device 120 automatically: (a) cuts or trims the length of the sound track to match the length of the compilation video 280; and (b) incorporates the sound track into the compilation video 280, replacing the original audio of the compilation video 280 with the sound track.

After these steps, the user can press the public post element 294. In response, the programmed device 120 generates the front video interface 296 as illustrated in FIG. 41. In an embodiment, the front video interface 296 includes: (a) at least one advertisement section 298 providing space for a promotion or advertisement of a company or organization, such as the sports drink advertisement 300; and (b) an athlete portrait section 302 providing space for an image or photo of the athlete displayed in the applicable compilation video 280, such as the athlete photo 304; (c) a video summary section 306 displaying the key information regarding the athlete, the event and the athlete's statistics, such as the athlete's name (e.g., Power Bornfreedom), jersey number (e.g., #15), high school (e.g., Brightmore High School), the date (e.g., Nov. 8, 2018), the final score of the game (e.g., Brightmore: 74, Calvary: 64), and the athlete's points, assists, rebounds, blocks and steals.

Figure 51B:
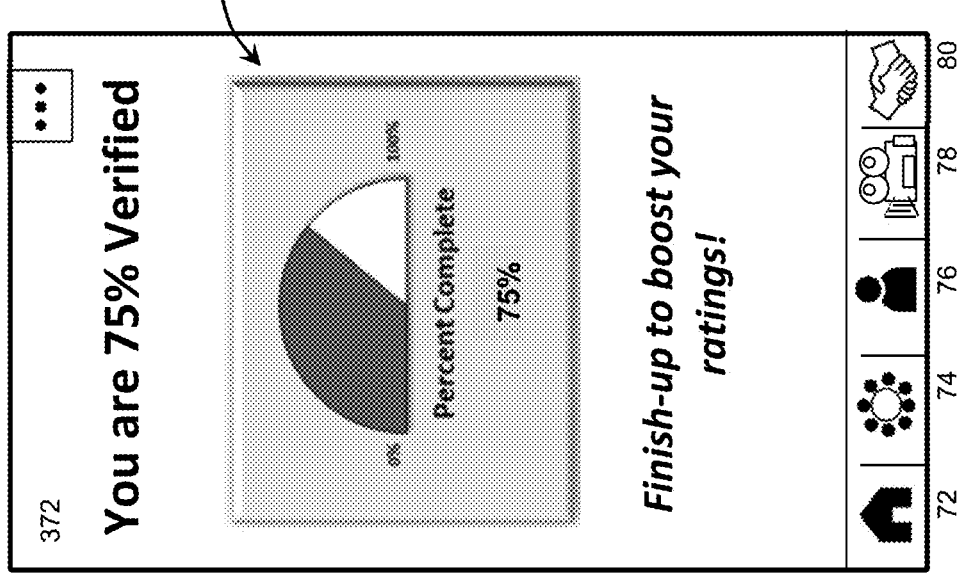
FIG. 51B is a top view of an embodiment of the verification progress interface of the programmed device.
Figure 51A:
FIG. 51A is a top view of an embodiment of the personal data verification interface of the programmed device.

In an embodiment, the participant center interface 308 (FIG. 51) enables the user (e.g., the athlete or the athlete's friend or parent) to capture and store a photo of the athlete, such as the athlete photo 310 shown in FIG. 41. In such case, the programmed device 120 automatically loads and displays the athlete photo 310 in the athlete portrait section 302. If there is no prestored athlete photo, the front video interface 296 enables the user to take a photo of the athlete or upload or download the athlete's photo from the programmed device 120 or a webserver. Then, the front video interface 296 enables the user to capture and display such photo in the athlete portrait section 302. If the user adds no photo to the athlete portrait section 302, the programmed device 120 adds the first frame of the compilation video 280 to the athlete portrait section 302.

In publishing the compilation video 280, the programmed device 120 transfers the compilation video 280 to the one or more data storage devices 12 (FIG. 1). Using the search interface 312 (FIG. 3A), users (e.g., participants, fans and other non-participants) can locate, access and view the compilation video 280, such as the compilation videos 60, 61, 62 shown in FIG. 3A.

Figure 42A:
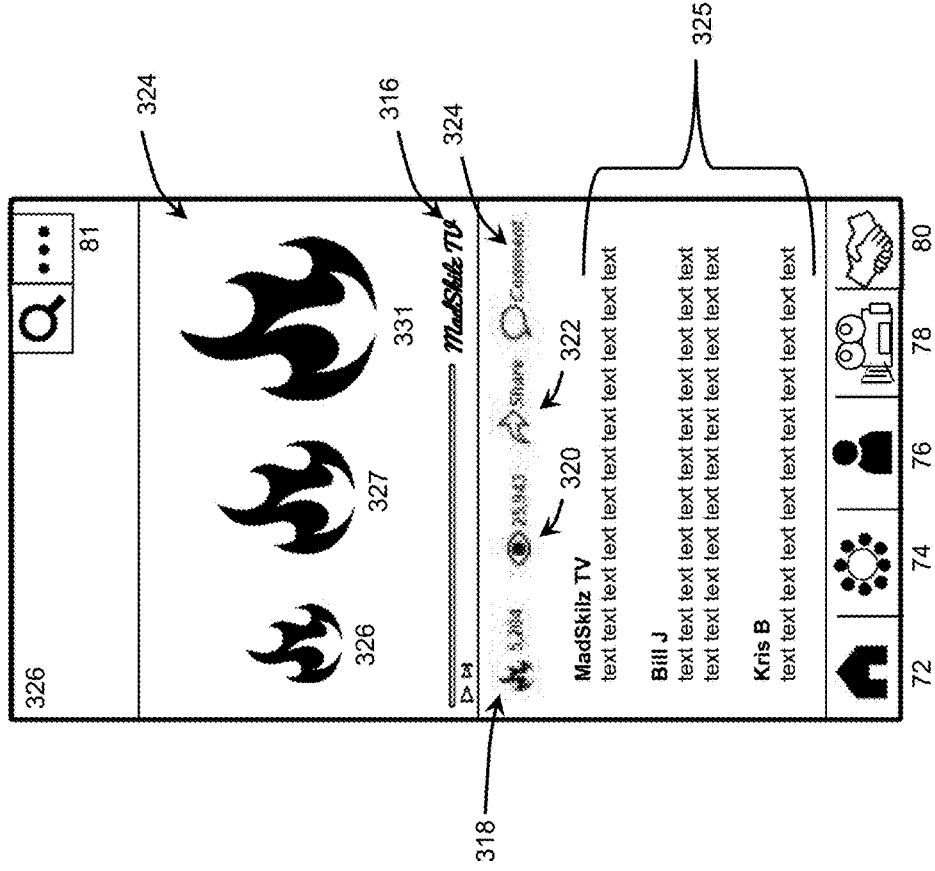
FIG. 42A is a top view of an embodiment of the social interface of the programmed device.

When the user clicks or selects a compilation video, such as the compilation video 60 (FIG. 3A), the programmed device 120 displays the social interface 314 as illustrated in FIG. 42A. In an embodiment illustrated in FIG. 42A, the social interface 314 includes: (a) the front video interface 296, which functions as the introductory frame or introductory image of the compilation video 280; (b) the name, trademark or identifier 316 of the video shooter, for example, "MadSkilz TV"; (c) a flame quantity 318; (d) a view quantity 320; (e) a share element 322, the selection of which enables users to share the compilation video 60 with, or send the compilation video 60 to, other users; and (f) a comment element 324, the selection of which enables users to post comments 325 related to the compilation video 60.

Figure 42B:
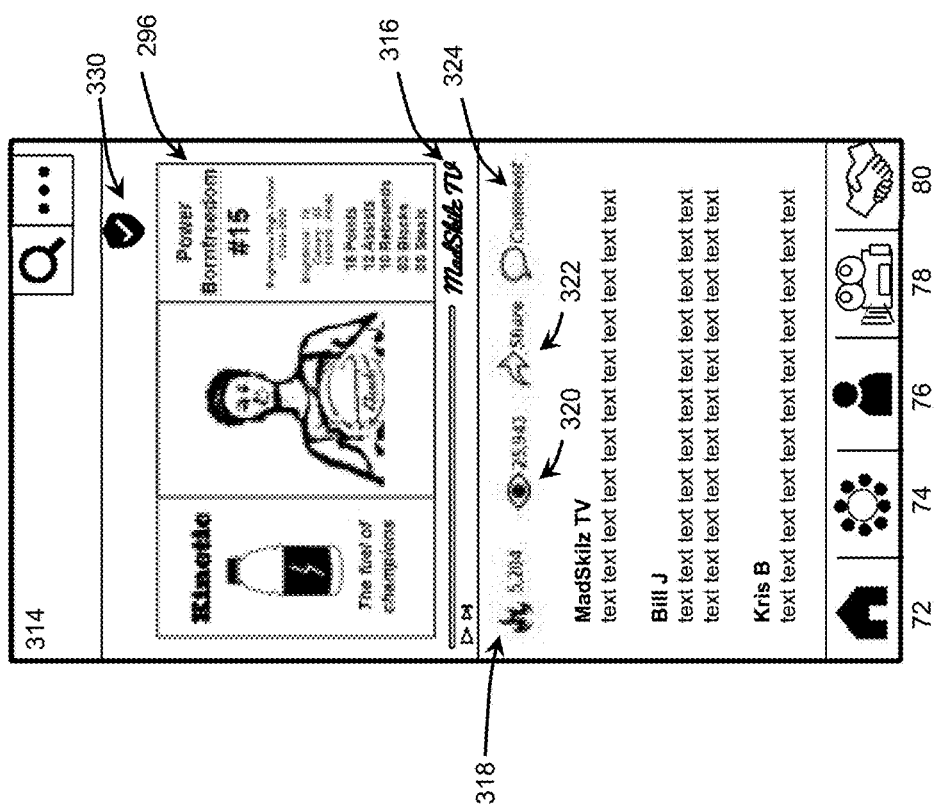
FIG. 42B is a top view of an embodiment of the rating interface of the programmed device.
Figure 44:
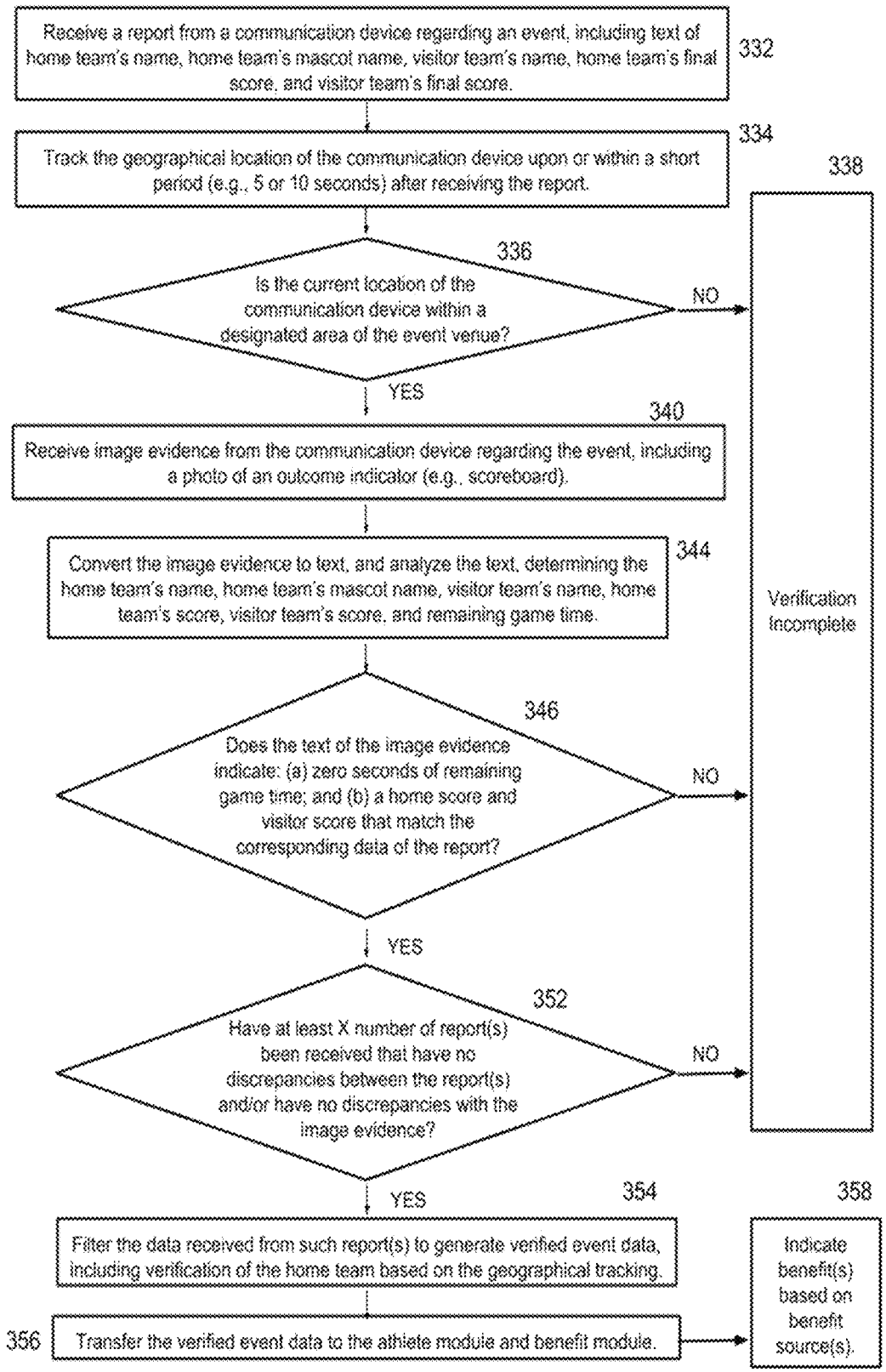
FIG. 44 is a flow chart of an embodiment of a method for verifying or confirming the accuracy of event information reported by users of programmed devices.

When the user taps, pauses or finishes watching the compilation video 60, the programmed device 120 displays a flame rating interface 326 as illustrated in FIG. 42B. The flame rating interface 326 includes: (a) a small flame 326 associated with a count of one flame, a relatively low level of likeness; (b) a medium flame 327 associated with a count of two flames, a moderate level of likeness; and (c) a large flame 331 associated with a count of three flames, a relatively high level of likeness. The system 13 keeps count of the quantity of flames input by users, and the system 13 displays the current flame total at the flame quantity 318.

In an embodiment, the system 13 calculates a fire rating 390 (FIG. 52A), an internal metric, that depends on the current quantity of flames and the current quantity of views. In an embodiment, the fire rating is equal to the current quantity of flames divided by the current quantity of views resulting in a flames per view metric. This ratio reflects the assumption that a highly interesting video should have a relatively high quantity of flames per view.

In an embodiment, the system 13 includes a video auto-deletion function to automatically purge the one or more data storage devices 12 of redundant videos—videos that highlight the same athlete in the same event. This video auto-deletion function reduces clutter and saves storage space in the one or more data storage devices 12. Also, this video auto-deletion function simplifies the home interface 54 (FIG. 3A) so that users do not have to sort through redundant videos. In an embodiment, the system 13 determines the first-in time at which each compilation video 280 is published (e.g., 10:20 pm Eastern Time, Nov. 26, 2018), and the system 13 also determines a video profile associated with such video, such as the name of the highlighted athlete, the date of the game, and the names of the home and visitor teams. The system 13 has a setting for a designated time window. The time window starts or opens at the first-in time, and the time window ends or closes at a designated time point following such first-in time (e.g., four hours after the first-in time or 2:20 am Eastern Time, Nov. 27, 2018). The system 13 determines the fire rating (e.g., flames per view) of each subsequent compilation video 280 with the same video profile that is published within the time window. The system 13 compares the fire ratings and determines which one of such compilation videos 280 has the highest fire rating. Next, the system 13 automatically deletes all of the other compilation videos 280. At that point, only the compilation video 280 with the highest fire rating, considered the winning video, remains stored in the one or more data storage devices 12.

In an embodiment, the system 13 automatically blocks the publication of compilation videos 280 of such video profile once the time window ends or closes. In this case, the programmed device 120 automatically displays a closed indicator (e.g., "POSTING TIME ENDED" or "CLOSED") when the user enters enough data in the public publication interface 290 (FIG. 40C). For example, the user may enter the game date, athlete name, home team and visitor team. In response, the programmed device 120 may display "CLOSED" and disable the submit element 294.

In an embodiment, the system 13 enables the athlete highlighted in the winning compilation video 280 to replace such compilation video 280 with an alternate compilation video 280 published by the athlete. This may be desirable, for example, if such athlete is displeased with the quality of the winning compilation video 280. Depending upon the embodiment, the system 13 can also enable such athlete to takedown or delete winning compilation videos 280 that emphasize such player's mistakes or poor or unflattering performance.

In the example illustrated in FIG. 43A, the user selected Athlete Lowlights in the secondary video categorizer interface 288. The Athlete Lowlights category is associated with a private setting corresponding to the private posting interface 328. In response to the user's input through the private post element 329, the programmed device 120 transfers the lowlight compilation video 280 to the participant module 32 (FIG. 1). This makes the lowlight compilation video 280 privately accessible to the user through the participant center interface 308 shown in FIG. 50A, as described below.

In many cases, relatively low profile events, such as amateur sports games and high school games, receive little, if any, media coverage. Many of the events are not broadcast live by news channels. As a result, the participants do not receive timely exposure from the events, which can result in lost opportunities. Furthermore, the information that does circulate, such as a player's statistics or performance, can be inaccurate. For example, a high school team may have a game that is not covered by the local news media. When the game finishes at 9:00 pm on a Friday, a spectator might publish a Twitter™ message, such as "Chris Carlson scores 34 in Brightmore Tigers' win over Glendale Bears!" In this example, such information is false or fake news. The truth is that Chris Carlson scored 22 points, and the Glendale Bears won the game. The misinformation can be inaccurate or misleading. This can cause harm to the reputation and opportunities of the event participants.

In an embodiment, the verification module 34 (FIG. 1) in conjunction with the publication module 31, described above, provides an improvement to overcome or lessen these disadvantages. In an embodiment, the verification module 34 enables a crowd or relatively large pool of users to help verify or increase the reliability of the event information provided by submitters of compilation videos 280.

As described above, the public publication interface 290 (FIG. 40C) includes a plurality of data fields related to the event (e.g., game). Any user attending the game can use any programmed device 120 to enter text into these fields and press the submit element 294 (FIG. 40C). The system 13 processes the event data entered by each such user.

In an embodiment, the verification module 34 includes verification logic that is executable to compare the event data provided by one user for a certain video profile to the event data provided by the other users for the same video profile. If the system 13 determines that the event data of a designated quantity of users match, the system 13 confirms such event data as verified and indicates the verification by displaying a verification indicator 330 (FIG. 42A) within the social interface 314.

For example, thirty users may submit thirty compilation videos 280 with the same video profile within one hour after the end of a Friday night high school basketball game, resulting in a sequence of event data submissions one through thirty as follows:

| Submission | Final Score | Comparison |
|---|---|---|
| 1 | Brightmore 74, Calvary 68 | Match |
| 2 | Brightmore 74, Calvary 68 | Match |
| 3 | Brightmore 70, Calvary 66 | |
| 4 | Brightmore 72, Calvary 85 | |
| 5 | Brightmore 74, Calvary 68 | Match |
| 6 | Brightmore 74, Calvary 68 | Match |
| 7 | Brightmore 74, Calvary 68 | Match |
| . | . | . |
| . | . | . |
| . | . | . |
| 30 | . | . |

In this example, the system 13 includes a verification factor that requires a minimum of five final score submissions to match each other. Once the first five submissions have matching final scores, the system 13 designates the final score as verified or confirmed. Then, the system 13 automatically either: (a) adds the confirmed event data 316 (FIG. 41) to the front video interface 296 of each one of the compilation videos 280; or (b) changes the existing, original data of such compilation videos 280 to match the confirmed event data 316. This verification or confirmation functionality increases the credibility and objectivity of the video information published through the system 13, which enables recruiters, colleges and other users to place greater reliance on the video information for athlete evaluation purposes.

In another embodiment illustrated in FIGS. 44-48, the system 13 includes an empirical evidence-based verification or confirmation system. As indicated by step 332, the programmed device 120 receives a video submission from a user incorporating a report or event data that includes text of the home team's name, home team's mascot, visitor team's name, home team's final score, and visitor team's final score. As indicated by step 334, based on the user's permission, the system 13 tracks the geographic location of the programmed device 120 upon receiving the report or within a relatively short time period (e.g., five seconds) after receiving the report. In an embodiment, the system 13 is operatively coupled to a webserver having the addresses of the home team. Based on that address information and the location tracking, the system 13 determines whether the current location of the programmed device 120 is within a designated area surrounding (or radius from) the venue of the home team as indicated by decision diamond 336. For example, the system 13 may determine whether the programmed device 120 is within one thousand feet or one-half mile from the stadium of the home team. If the answer is no, the programmed device 120 indicates that the confirmation or verification is incomplete as indicated by step 338 and verification failure indicator 339 (FIG. 48C). This is based on the reasoning that the report is more likely to be accurate if it is received by a user who is physically present at or nearby the location of the event. If the answer is yes, the programmed device 120 generates an image submitted by the user pertaining to the event as indicated by block 340. In an embodiment, the image includes a photo of an outcome indicator 342 (FIG. 46), such as the physical scoreboard mounted to the stadium wall or otherwise coupled to the stadium or gymnasium. Next, the system 13 receives and converts the image evidence to text and analyzes the text, determining the following information displayed on the outcome indicator 342: the home team's name, home team's mascot's name, visitor team's name, home team's score, and the remaining game time as indicated by block 344. The system 13 can convert such image to text through optical character recognition (OCR) or any other suitable conversion method.

Figure 48C:
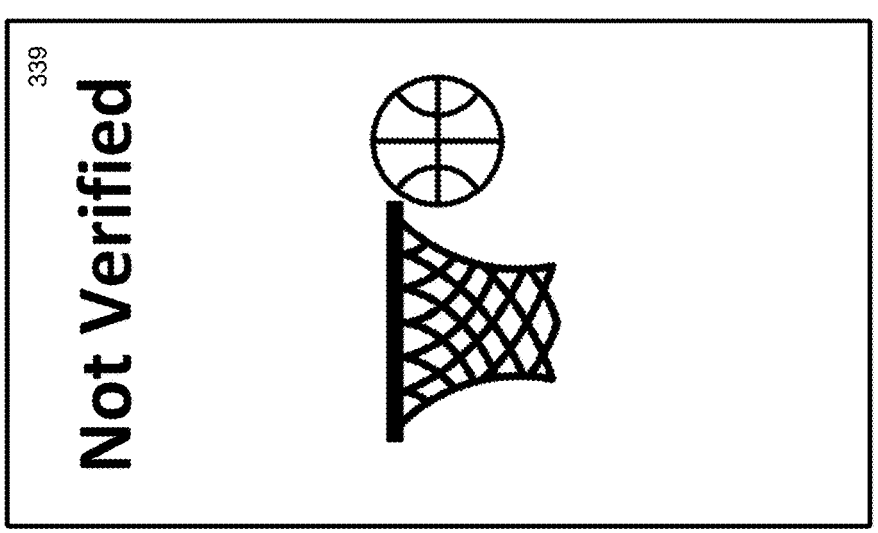
FIG. 48C is a top view of an embodiment of the verification failure indicator of the programmed device.

Next, as indicated by decision block 346, the system 13 determines whether the text extracted from the outcome indicator 342 indicates: (a) zero seconds of remaining game time 347; and (b) a home score 348 and visitor score 350 that match the corresponding data reported with the compilation video 280 submitted by the user. If the answer is no, the programmed device 120 indicates that the confirmation or verification is incomplete as indicated by step 338 and verification failure indicator 339 (FIG. 48C). If the answer is yes, the system 13 determines, as indicated by decision block 352, whether the system 13 has received X number of one or more reports of the same video profile that: (a) have no discrepancy with a certain percentage of the other reports; and/or (c) have no discrepancy with the text evidence extracted from the outcome indicator 342. Next, as indicated by block 354, the system 13 filters the data reported with the compilation video 280, determines any such data that conflicts with the text evidence extracted from the outcome indicator 342, and automatically replaces such data with the applicable text data derived from the outcome indicator 342. The programmed device 120 then generates the verification success indicator 355 (FIG. 48B) and the verification indicator 330 (FIG. 42A). As indicated by block 356, the system 13 then transfers the verified data to the participant module 32 of the athlete who is identified within the video profile of such compilation video 280. Next, as indicated by step 358, the programmed device 120 indicates benefits to such athlete based on such verified data, as described below.

Figure 45:
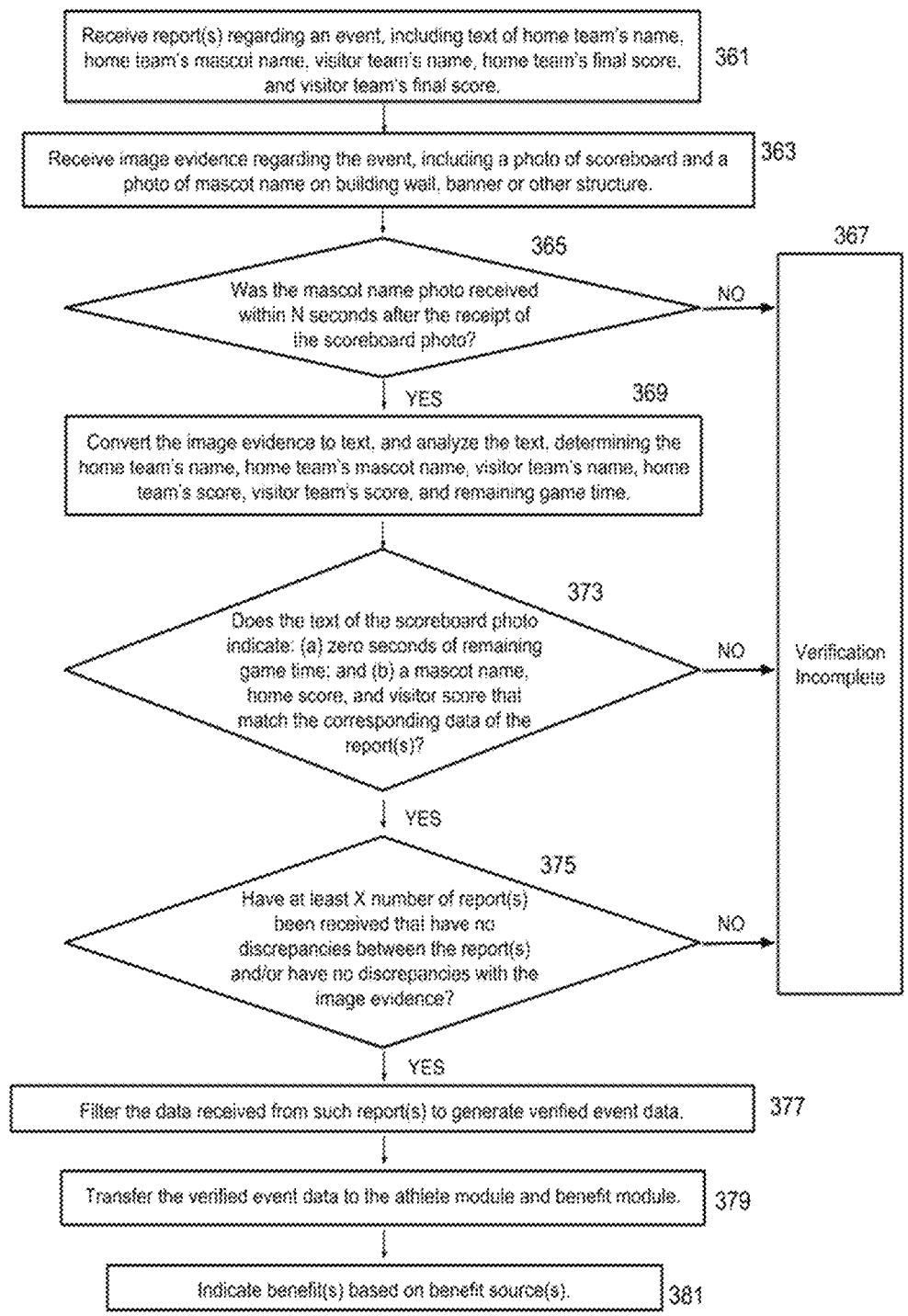
FIG. 45 is a flow chart of an embodiment of another method for verifying or confirming the accuracy of event information reported by users of programmed devices.

In another embodiment illustrated in FIG. 45, the programmed device 120 receives a video submission from a user incorporating a report or event data as indicated by block 361. The report or event data can include text of the home team's name, home team's mascot, visitor team's name, home team's final score, and visitor team's final score. The programmed device 120 then generates one or more images submitted by the user pertaining to the event as indicated by block 363. In an embodiment, the one or more images include a photo 323 (FIG. 47A) of the outcome indicator 342 (FIG. 46) and a photo 365 (FIG. 47B) of a mascot name 364 (FIG. 46) painted or mounted to the stadium wall or otherwise coupled to the stadium or gymnasium.

Figure 46:
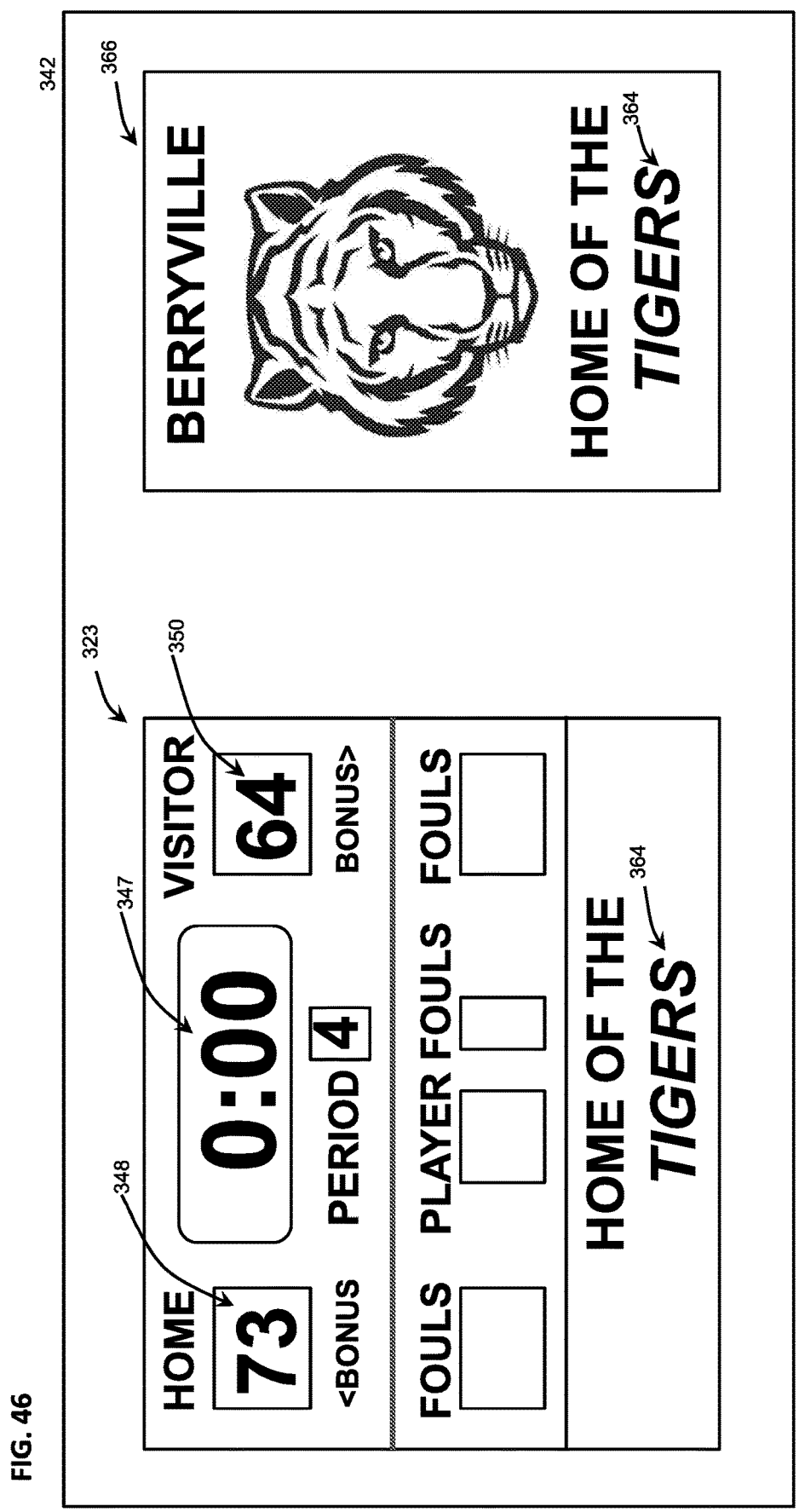
FIG. 46 is a top view of an embodiment of an outcome indicator of an event site or facility.
Figure 47A:
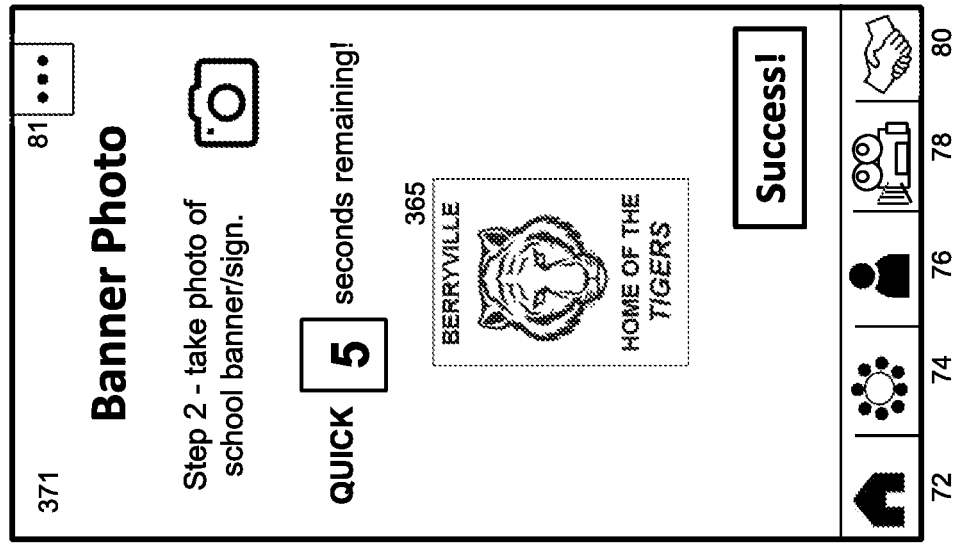
FIG. 47A is a top view of an embodiment of the image capture interface of the programmed device, illustrating a scoreboard photo of the outcome indicator of FIG. 46.
Figure 47B:
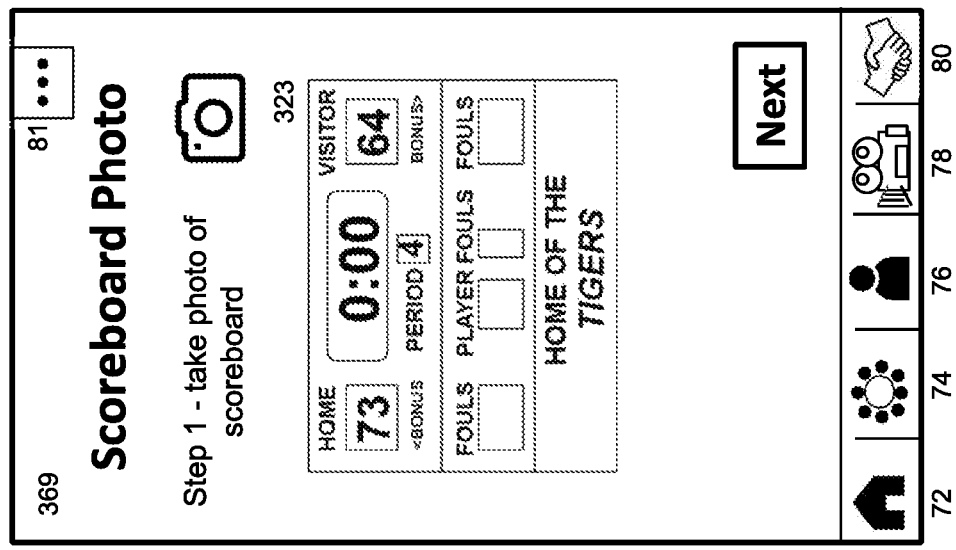
FIG. 47B is a top view of an embodiment of the image capture interface of the programmed device, illustrating a photo of a physical display medium, such as a mascot banner.

The mascot name 364 can be indicated on a banner, on a painted section of a wall, on the outcome indicator 342 or on another physical display medium 366 (FIG. 46). In the example shown, the mascot name is "TIGERS." Next, as indicated by decision diamond 365, the system 13 determines whether the photo of the mascot name 364 was submitted by the user (and received by the system 13) within a designated period of time (e.g., five seconds) after the system 13 received the user's submission of the photo of the outcome indicator 342. If the answer is no, the programmed device 120 indicates that the verification is incomplete as indicated by block 367 and verification failure indicator 339 (FIG. 48C). This is based on the reasoning that, if the user is actually at the site of the game, the user will be able to photograph the outcome indicator 342 and the mascot name 364 in quick succession.

In the example illustrated in FIG. 47, the programmed device 120 displays image capture interfaces 369, 371. The image capture interface 369 enables the user to photograph and upload the scoreboard photo 323, and the image capture interface 371 enables the user to photograph and upload the mascot banner photo 365.

Referring back to FIG. 45, if the answer to decision diamond 365 is yes, the system 13 receives and converts the image evidence to text and analyzes the text, determining the following information displayed on the outcome indicator 342: the home team's name, home team's mascot's name, visitor team's name, home team's score, and the remaining game time as indicated by block 369. The system 13 can convert such image to text through OCR or any other suitable conversion method.

Next, as indicated by decision block 373, the system 13 determines whether the text extracted from the outcome indicator 342 indicates: (a) zero seconds of remaining game time 347; and (b) a home score 348 and visitor score 350 that match the corresponding data reported with the compilation video 280 submitted by the user. If the answer is no, the programmed device 120 indicates that the confirmation or verification is incomplete as indicated by step 367 and verification failure indicator 339 (FIG. 48C). If the answer is yes, the system 13 determines, as indicated by decision block 375, whether the system 13 has received X number of one or more reports of the same video profile that: (a) have no discrepancy with a certain percentage of the other reports; and/or (c) have no discrepancy with the text evidence extracted from the outcome indicator 342. Next, as indicated by block 377, the system 13 filters the data reported with the compilation video 280, determines any such data that conflicts with the text evidence extracted from the outcome indicator 342, and automatically replaces such data with the applicable text data derived from the outcome indicator 342. The programmed device 120 then generates the verification success indicator 355 (FIG. 48B) and the verification indicator 330 (FIG. 42). As indicated by block 379, the system 13 then transfers the verified data to the participant module 32 of the athlete who is identified within the video profile of such compilation video 280. Next, as indicated by step 381, the programmed device 120 indicates benefits to such athlete based on such verified data, as described below.

Figure 48B:
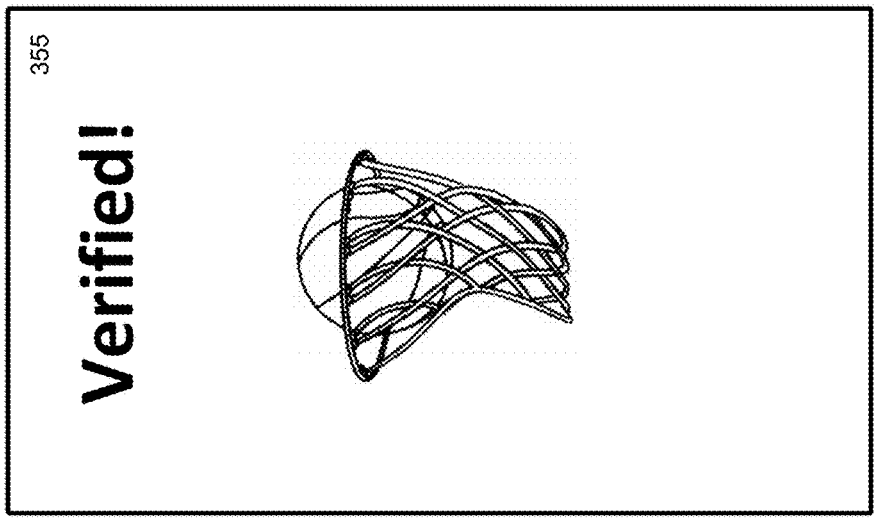
FIG. 48B is a top view of an embodiment of the verification success indicator of the programmed device.
Figure 48A:
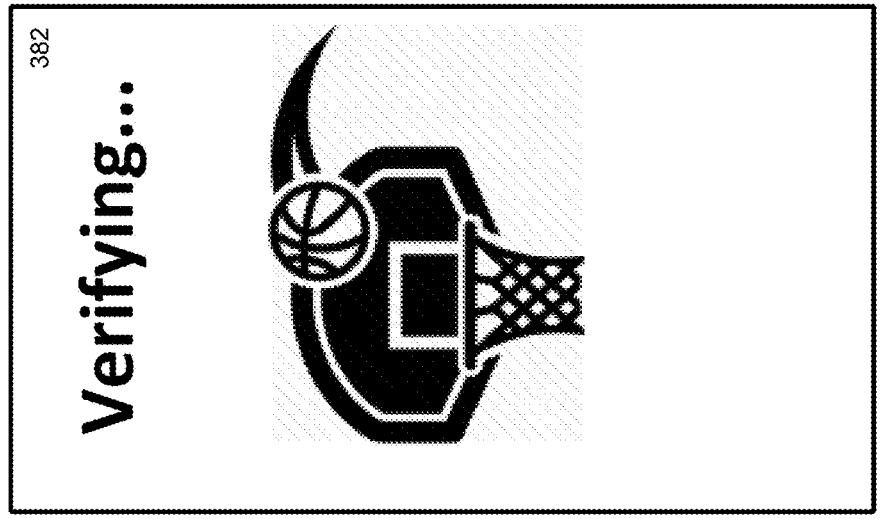
FIG. 48A is a top view of an embodiment of a process indicator of the programmed device.

As illustrated in FIGS. 48A-48C, the programmed device 120 displays: (a) the verification in process indicator 382 (e.g., an image or animation of a basketball moving toward a hoop) during the verification processes described above; (b) the verification success indicator 355 (e.g., an image or animation of a basketball within a hoop) in response to a successful verification of reported video data; and (c) a verification failure indicator 339 (e.g., an image or animation of a basketball outside of a hoop) in response to a failure of an attempted verification described above.

Many types of events, such as sports games, talent shows, theatrical plays and concerts, have venues where relatively large numbers of people attend. At the end of the event, the participants, their friends in the audience and other attendees often are hungry and wish to visit a local restaurant or eatery for a meal or snack. The food providers or restaurants compete with each other for these customers. Often times, restaurants located further from the venue receive less customers from the event than those restaurants located closer to the venue.

Figure 49A:
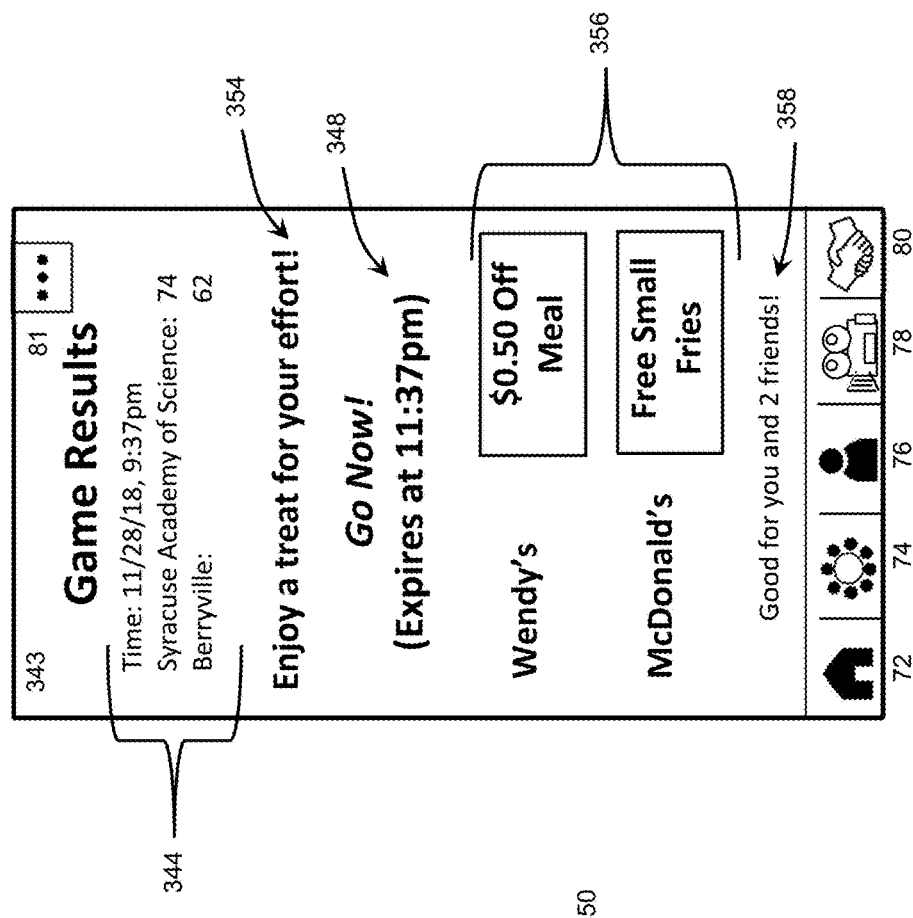
FIG. 49A is a top view of an embodiment of the winner benefit interface of the programmed device.
Figure 49B:
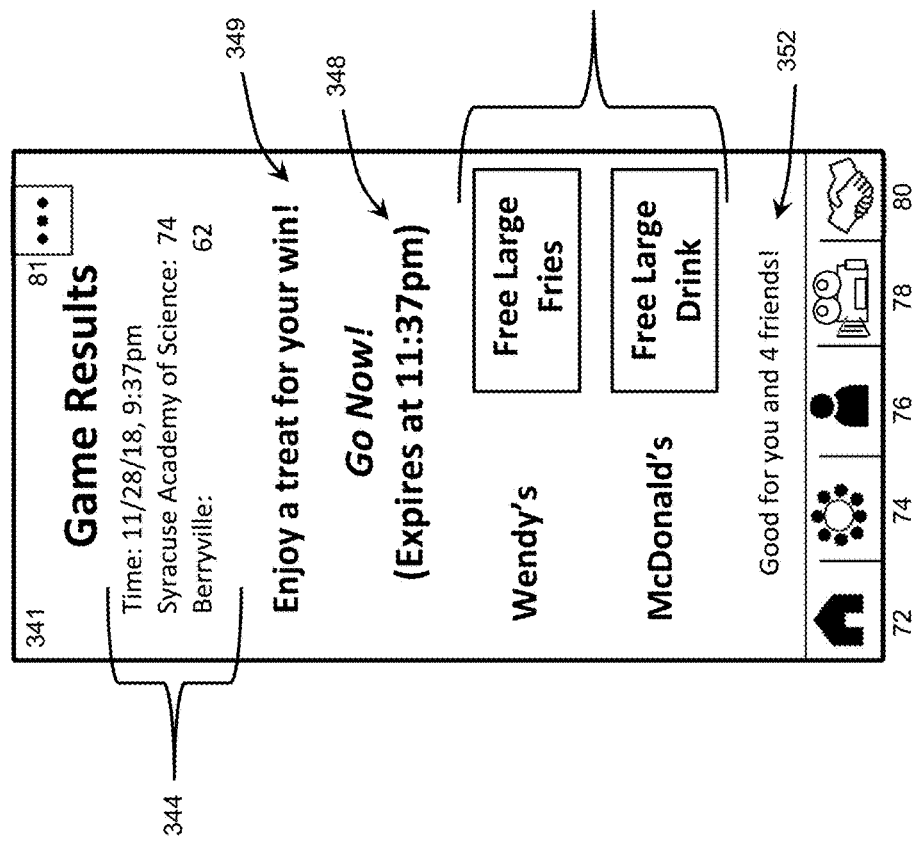
FIG. 49B is a top view of an embodiment of the loser benefit interface of the programmed device.

At or after the end of the event, the system 13 receives, verifies and transfers the event outcome data to the participant module 32 as described above. Referring to FIGS. 49A-49B, in an embodiment, the system 13 determines when a logged-in user is a participant (e.g., an athlete) who is registered with the system 13, as described below. For example, a registered athlete may access the system 13 through a programmed device 120 in the locker room shortly after the game ends. If the athlete's team won the game, the programmed device 120 displays a winner benefit interface 341 as illustrated in FIG. 49A. If the athlete's team lost the game, the programmed device 120 displays a loser benefit interface 343 as illustrated in FIG. 49B.

The winner benefit interface 341 displays: (a) the verified event outcome data 344; (b) a win indicator 349, such as "Enjoy a treat for your win!"; (c) an expiration notice 348, such as "Expires at 11:37 pm"; (d) a plurality of award indicators or benefit indicators 350, such as free food items offered by various fast food restaurants; and (e) benefit terms 352, such as "Good for you and 4 friends!"

The loser benefit interface 343 displays: (a) the verified event outcome data 344; (b) a win indicator 354, such as "Enjoy a treat for your effort!"; (c) an expiration notice 348, such as "Expires at 11:37 pm"; (d) a plurality of award indicators or benefit indicators 356, such as food discounts and free food items offered by various fast food restaurants; and (e) benefit terms 358, such as "Good for you and 2 friends!" In this example, the value of the benefit indicators 356 is less than the value of the benefit indicators 350. Similarly, the benefit terms 358 are less favorable than the benefit terms 352. It should be appreciated that, in other examples, the interfaces 341, 342 can have different expiration notices 348 and other differences that grant more favor to the winning registered player than the losing registered player.

With the benefits indicated by the winner benefit indicator 340 or the losing benefit indicator 342, as applicable, the registered athlete can visit the applicable restaurant, before the applicable expiration time, with companions or friends. Upon arrival, for example, a winning athlete can obtain five items of large fries for the athlete and four friends. The transaction can be performed through different methods. In an embodiment, the programmed device 120 displays a unique code, such as a unique numeric or alphanumeric code or a scannable code (e.g., a 1D or 2D barcode, such as QR code datamatrix). In another embodiment, the programmed device 120 generates a signal, such as a radio frequency ("RF") or infrared radiation ("IR") signal. In yet another embodiment, to enroll for the benefit indicated at winner benefit indicator 341 and the losing benefit indicator 342, the benefit providers or restaurants require the participants to create loyalty card accounts with the restaurants, associating the participants' phone numbers with their accounts. Depending upon the embodiment, the cashiers of the restaurants can ascertain the benefits awarded to the participants by: (a) entering codes provided by the participants; (b) scanning barcodes displayed on the participants' programmed devices 120; (c) establishing an electronic communication between the point of sale machines and the programmed devices 120 to receive signals from the programmed devices 120; (d) entering the participants' phone numbers; or (e) any other suitable benefit transfer method. In an embodiment, each benefit provider (e.g., restaurant) has a webserver, database or benefit source 44 (FIG. 1) that is operatively coupled to the system 13 through the network 16. Such benefit provider manages the distribution and accounting of benefits (e.g., discounts and freebies) to each unique event participant who is registered through the system 13.

In an embodiment, the programmed devices 120 are enabled for near-field communication ("NFC"). For example, the programmed devices 120 can have RF transceivers, NFC protocols and NFC code operable to perform NFC with the point of sale devices of restaurants and other providers. For example, the NFC code can include a mobile wallet app such as Google Wallet™ or Apple Pay™. In another embodiment, the participant module 32 (FIG. 1) includes computer code the enables users to load their credit, debit, gift and loyalty cards to the system 13 so that they may use their programmed devices 120 to make payments and perform transactions in stores. In yet another embodiment, the system 13 is operatively coupled to the Samsung Pay™ platform to enable such functionality.

As described above, the user can tap or activate the menu element 81 to cause the programmed device 120 to display the features interface 82 (FIG. 3B). At any time, the user can tap or activate the participant center element 90 of the features interface 82. In response, the programmed device 120 will display the participant center interface 308, as illustrated in FIG. 50A. The participant center interface 308 has: (a) a public zone 360 that archives and stores the registered participant's information, images and videos intended for public viewing; and (b) a private zone 362 that archives and stores the registered participant's information, images and videos that are intended to be kept private. In the example shown, the public zone 360 includes personal data, highlight compilation videos, one or more interview videos for viewing by colleges and recruiters, one or more reference videos provided by teachers or coaches, a personal photo of the participant, a biography page regarding the participant, and a video distribution element for sending desired ones of these videos to colleges, recruiters or others. In the example shown, the private zone 362 includes lowlight videos, development videos (e.g., videos of the participant's training sessions) and a list of the participant's gift cards and sponsors.

The system 13 publishes the public zone 360 to the public, and the system 13 blocks public access to the private zone 362. The programmed device 120 enables the participant to provide select people (e.g., trainers, coaches, family members or recruiters) with access to the private zone 362. It should be understood that the video generator 28 (FIG. 1) could have been used to record and capture all of the videos within the public zone 360 and the private zone 362.

Figure 50B:
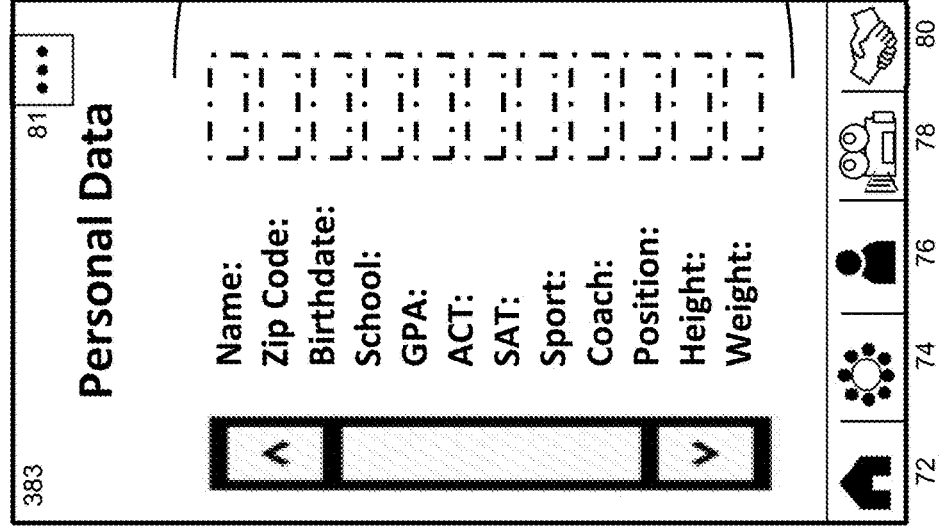
FIG. 50B is a top view of an embodiment of the personal data interface of the programmed device.
Figure 50A:
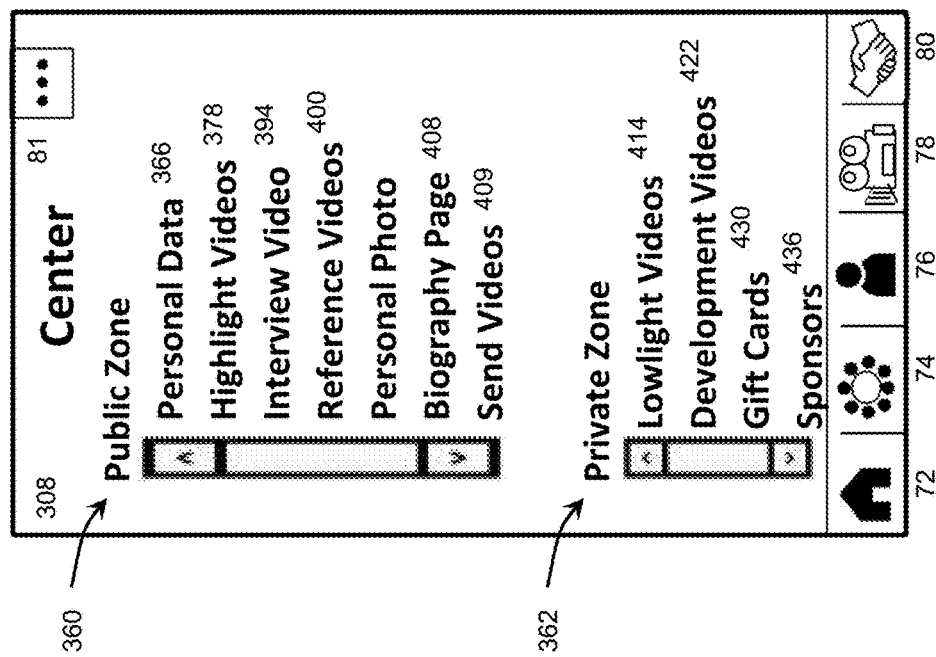
FIG. 50A is a top view of an embodiment of the participant center interface of the programmed device.

As illustrated in FIG. 50B, the programmed device 120 displays a personal data interface 383 in response to the participant's activation of the personal data element 366. In the example shown, the personal data interface 383 has a plurality data fields for collecting personal data 368. In the example shown, the personal data 368 includes the participant's name, zip code, birthdate, school, GPA, ACT score, SAT score, sport, coach's name, position, height, and weight.

As illustrated in FIG. 1, the system 13 enables the participant to setup data feeds from a plurality of data sources 18 (e.g., webservers or databases) of entities including, but not limited to, schools 38, healthcare providers 40, and testing organizations 42. In an embodiment illustrated in FIG. 51A, the programmed device 120 displays a personal data verification interface 370. The system 13, through communication with the data sources 18, automatically checks for matches between the personal data 368 input by the participant and the corresponding data documented in the records of the data sources 18. If there is a match, the personal data verification interface 370 indicates the match as a verification. In the example shown, the verifications are indicated by checkmarks. In addition, the programmed device 120 display a verification progress interface 372 that indicates the participant's progress in obtaining verifications. In the example shown, the verification progress interface 372 displays a progress meter 374.

In response to the participant's activation of the highlight video element 378 (FIG. 50A), the highlight video interface 376 (FIG. 52A) displays the highlight compilation videos 380, 382, 384 generated by the video generator 28. Also, the highlight video interface 376 displays a fire rating meter 386. The fire rating meter 386 displays the fire rating 390 (as described above in flames per view) of the participant's highest rated video 380.

Figure 52B:
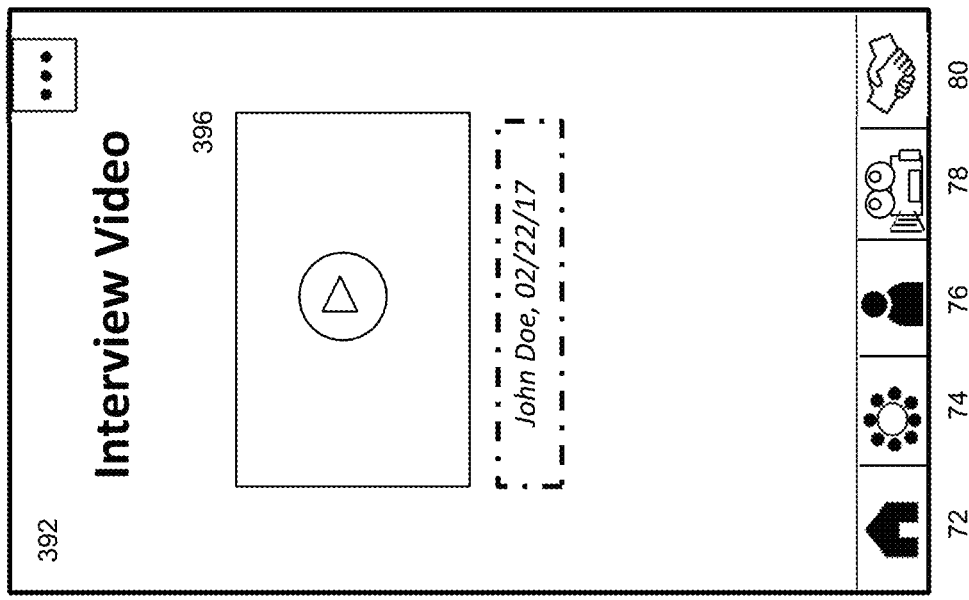
FIG. 52B is a top view of an embodiment of the interview video interface of the programmed device.
Figure 52A:
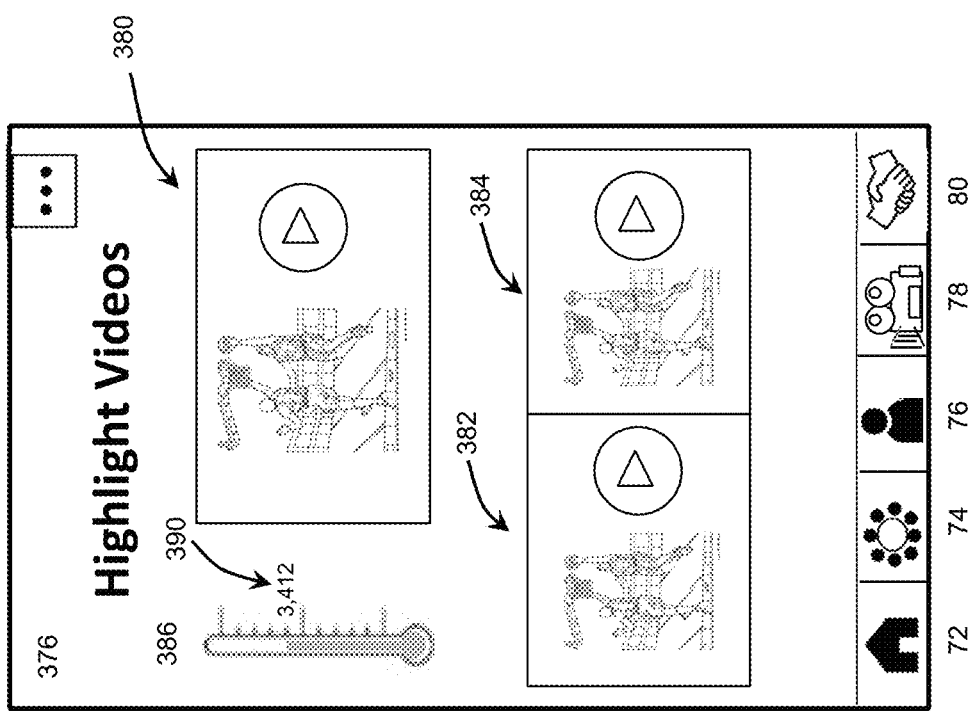
FIG. 52A is a top view of an embodiment of the highlight video interface of the programmed device.

As illustrated in FIG. 52B, the programmed device 120 displays an interview video interface 392 in response to the participant's activation of the interview video element 394 (FIG. 50A). The interview video interface 392 displays the participant's interview video 396.

As illustrated in FIG. 53A, the programmed device 120 displays a reference video interface 398 in response to the participant's activation of the reference video element 400 (FIG. 50A). The reference video interface 398 displays the participant's interview videos 402, 404, together with text regarding the interview videos. In the example shown, the text states the name and title of the interviewee, together with the date of the interview.

As illustrated in FIG. 53B, the programmed device 120 displays a biography interface 406 in response to the participant's activation of the biography page element 408 (FIG. 50A). The biography interface 406 displays a plurality of personal data fields 410. The participant can enter his/her data in the personal data fields 410.

Figure 54B:
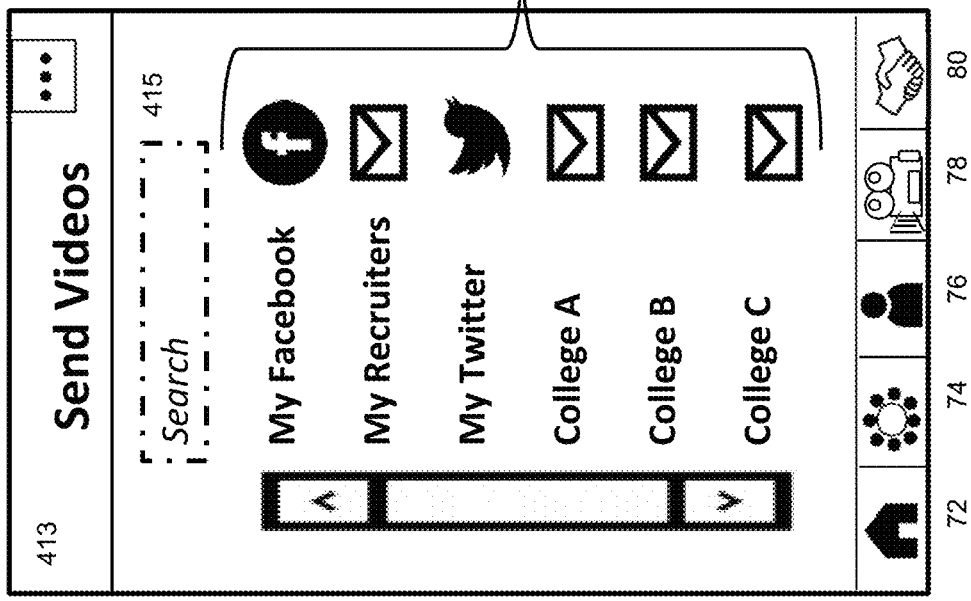
FIG. 54B is a top view of an embodiment of the recipient interface of the programmed device.
Figure 54A:
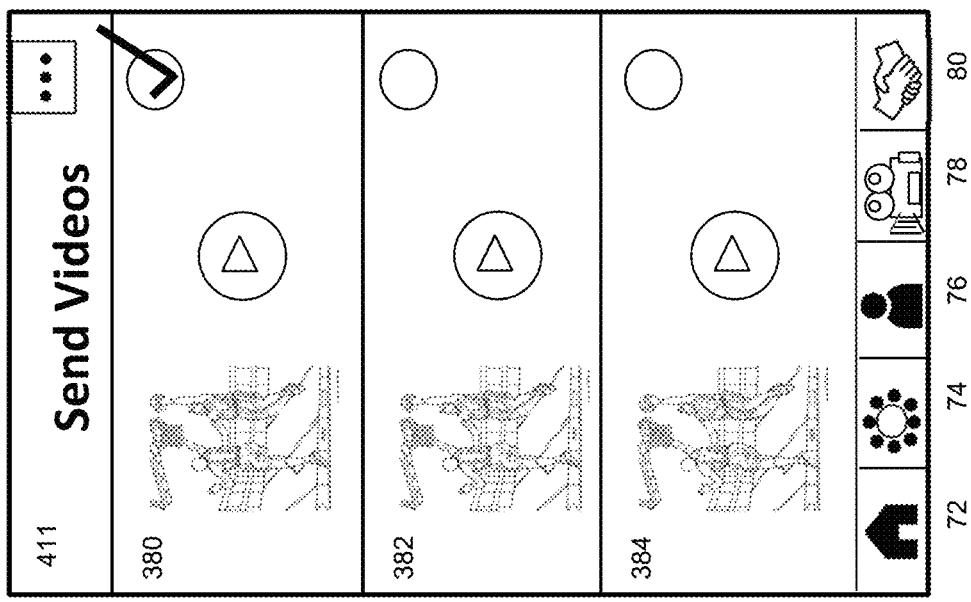
FIG. 54A is a top view of an embodiment of the send videos interface of the programmed device.

Referring back to FIG. 50A, the participant can press or select the send videos element 409 of the public zone 360. In response to such selection, the programmed device 120 displays a send videos interface 411, as illustrated in FIG. 54A. In the example shown, the send videos interface 411 displays the first frames of the highlight videos 380, 382, 384, and the participant selected the highlight compilation video 380. In response to such selection, the programmed device 120 displays a recipient interface 413. The recipient interface 413 displays a plurality of selectable recipients, which, in the example shown, include a Facebook™ account, an email account linked to a list of recruiters, a Twitter™ account, and a plurality of email addresses of designated contacts of a plurality of colleges A, B and C. The recipient interface 413 also displays a search field 415 that enables the user to enter text to search for a prestored recipient. In response to the participant's selection of one or more of the recipient elements 417, the programmed device 120 emails, sends or otherwise transfers the selected highlight compilation video 380 to the recipients associated with the selected recipient elements 417.

Figure 55B:
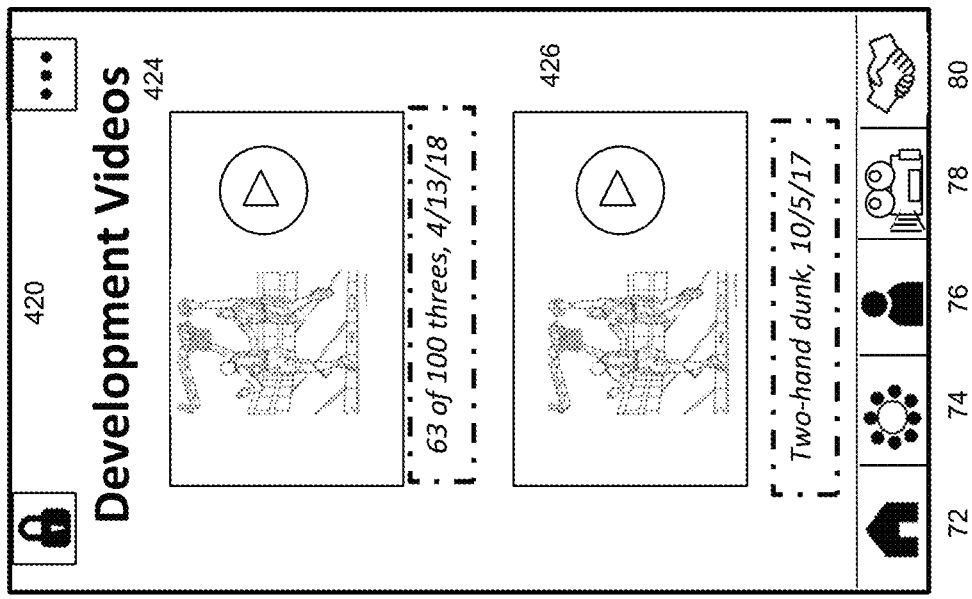
FIG. 55B is a top view of an embodiment of the development video interface of the programmed device.
Figure 55A:
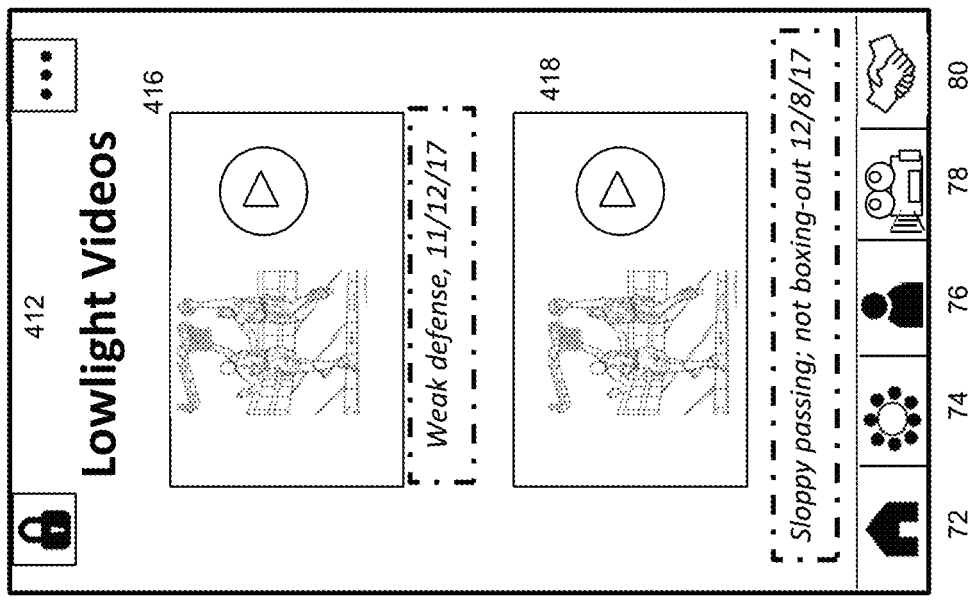
FIG. 55A is a top view of an embodiment of the lowlight video interface of the programmed device.

In response to the participant's activation of the lowlight video element 414 (FIG. 50A) in the private zone 362, the programmed device 120 displays a lowlight video interface 412 as illustrated in FIG. 55A. The lowlight video interface

412 displays the lowlight compilation videos 416, 418 generated by the video generator 28. Also, the lowlight video interface 412 displays text associated with the lowlight compilation videos 416, 418, such as "Weak defense, Nov. 12, 2017" or "Sloppy passing; not boxing-out, Dec. 8, 2017."

As illustrated in FIG. 55B, the programmed device 120 displays a development video interface 420 in response to the participant's activation of the development video element 422 (FIG. 50A). The development video interface 420 displays the development compilation videos 424, 426 generated by the video generator 28. Also, the development video interface 420 displays text associated with the development compilation videos 424, 426, such as "63 of 100 threes, Apr. 13, 2018" or "Two-hand dunk, Oct. 5, 2017."

Figure 56:
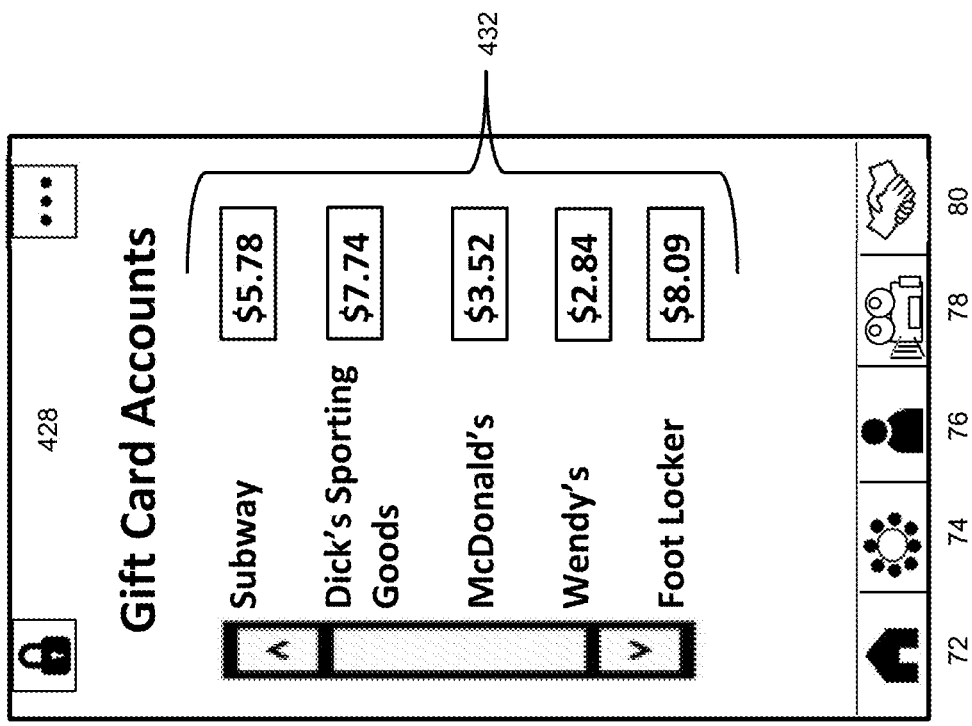
FIG. 56 is a top view of an embodiment of the gift card interface of the programmed device.

As illustrated in FIG. 56, the programmed device 120 displays a gift card interface 428 in response to the participant's activation of the gift card element 430 (FIG. 50A). The gift card interface 428 displays a list of the gift card accounts 432 of the various service providers and merchants with whom the participant is registered. As shown, the gift card interface 428 displays the purse values of the gift card accounts 432.

As illustrated in FIG. 57A, the programmed device 120 displays a sponsor level interface 434 in response to the participant's activation of the sponsor element 436 (FIG. 50A). In the example shown, the sponsor level interface 434 displays: (a) an athlete rating 438 that is limited to or is derived from one or more of the following factors: the participant's athletic performance statistics, the flame per view rating 390 (FIG. 52A), the participant's biographical data, or any suitable combination thereof; (b) a student rating 440 that is limited to or is derived from one or more of the following factors: the participant's school grades, ACT score, SAT score or any suitable combination thereof; and (c) the follower count 442 for the followers of the participant. Based on one or more of the athlete rating 438, the student rating 440, and the follower count 442, the system 13 determines the sponsor level of the participant. In the example shown, the sponsor level interface 434 displays a sponsor meter 444 having a plurality of thresholds indicated by $, $$ and $$$. In this example, the participant's sponsor level has risen to the $$ sponsor level.

In response to the get sponsored element 446, the programmed device 120 displays the sponsors interface 448 as illustrated in FIG. 57B. The sponsors interface 448 displays the list of participating sponsors 450. In the example shown, the sponsors 450 include sports shoe manufacturers and sports drink manufacturers. The sponsors 450 have certain terms and conditions regarding the sponsorship. Once the participant decides upon one or more of the sponsors 450, the participant can proceed with one or more of the sponsorships offered to the participant. In the example shown, the participant selected the Adidas element 452 corresponding to the sponsorship offered by the Adidas™ company. In response, the programmed device 120 displays the sponsor account interface 454 as illustrated in FIG. 57C. In the example shown, the sponsor account interface 454 displays information regarding the Adidas™ sponsorship, including the sponsor's name, the expiration date of the sponsorship, the sponsorship level, the purse or wallet value of the sponsorship, the gift awarded, and the grant of free academic, test preparation courses. In the example shown, the participant will receive $239.17 in spending money, a pair of free Adidas™ basketball shoes and a free ACT/SAT preparation course.

It can be difficult for event participants to find suitable partners or assistants for the pursuit of their objectives. For example, it can be challenging for athletes to find suitable AAU teams, sports camps, college recruiters, trainers and other partners. The connector module 36 (FIG. 1) provides an improvement to help overcome this challenge. Referring to FIG. 58A, the programmed device 120 executes the connector module 36 to display a connector interface 456 in response to the user's selection of the connection symbol 80 or the connector element 92 (FIG. 3B).

The connector interface 456, shown in FIG. 58A, enables the user (e.g., an athlete, other participant or parent of a participant) to search for, review, assess and matchup with providers of services, products or opportunities, such as people, organizations or businesses. The connector interface 456 displays a listing element 458 and a connection facilitator element 460. In response to the user's selection of the listing element 458, the programmed device 120 displays a listing interface 462 as illustrated in FIG. 58B. The listing interface 462 is usable by users who are providers, such as owners, operators, employees, agents or representatives of businesses or organizations, including, but not limited to, AAU teams/clubs, hosts of sports camps, athletic programs, training businesses, recruiting businesses, physical therapy businesses, healthcare providers and other providers of services or goods. As shown, the listing interface 462 displays a plurality of data fields, including, but not limited to, category (e.g., trainer or AAU team), name, address, description, logo, tryout schedule and requirements, practice schedule, game schedule, fees, director's name, website address, contact information, payment method and other information.

Figure 59B:
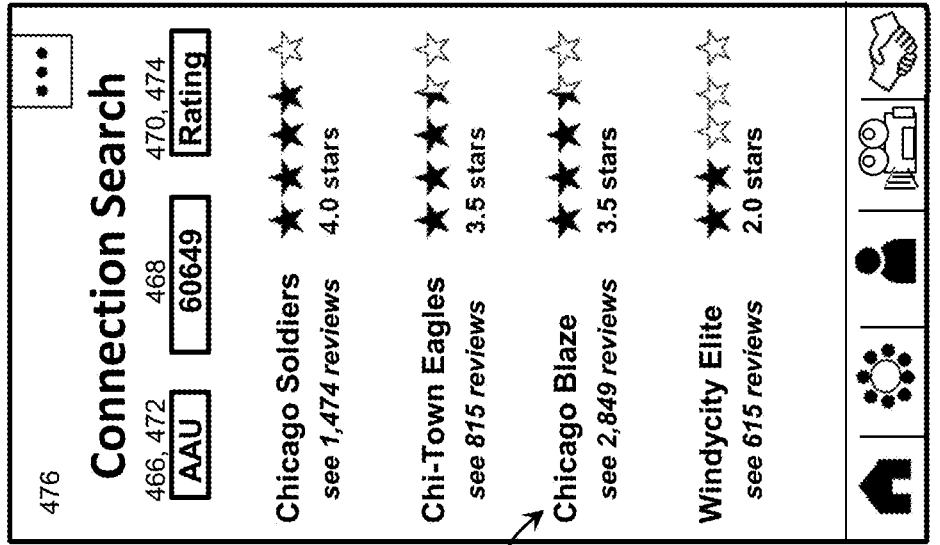
FIG. 59B is a top view of an embodiment of the search results interface of the programmed device.
Figure 59A:
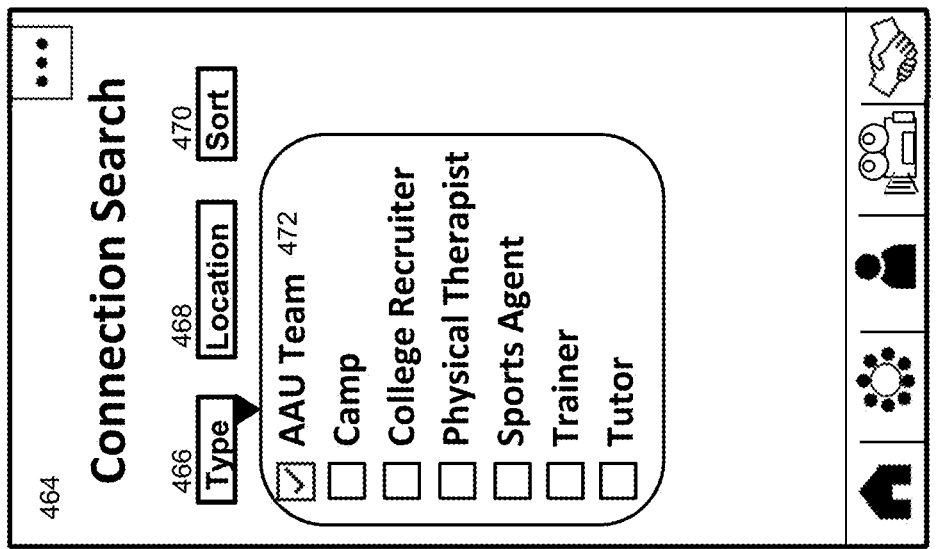
FIG. 59A is a top view of an embodiment of the connection search interface of the programmed device.

In response to the user's selection of the connection facilitator element 460, the programmed device 120 displays a connection search interface 464 as illustrated in FIG. 59A. The connection search interface 464 displays a type filter 466, a location filter 468 and a sort element 470. The activation of the type filter 466 enables the user to select a desired category or type of provider from a list of types or categories of providers. In the example shown, the list includes AAU team, camp, college recruiter, physical therapist, sports agent, trainer and tutor. The location filter 468 enables the user to filter the service/goods provider by specified location. The programmed device 120 displays the search results based on the sort preferences set by the user through the sort element 470.

In the example shown in FIG. 59A, the user selected the AAU team category 472 for the category or type 466, entered zip code 60649 for the location 468, and selected rating 474 for the sort element 470. In response, the programmed device 120 displayed the search results interface 476. In this example, the search results interface 476 displays a list of AAU basketball clubs, including the quantity of reviews and star rating on a scale of one to five stars. The club with the highest rating is displayed at the top of the list.

Figure 60B:
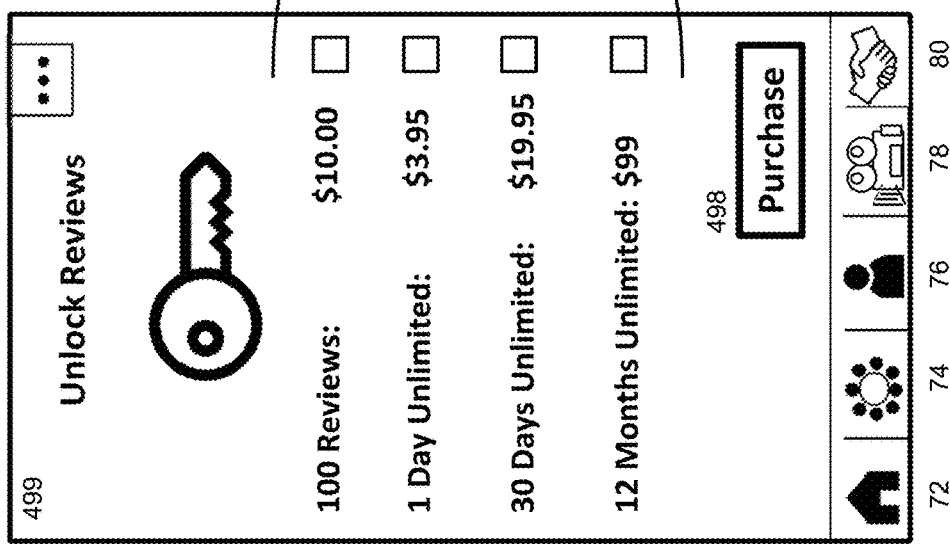
FIG. 60B is a top view of an embodiment of the review unlock interface of the programmed device.
Figure 60A:
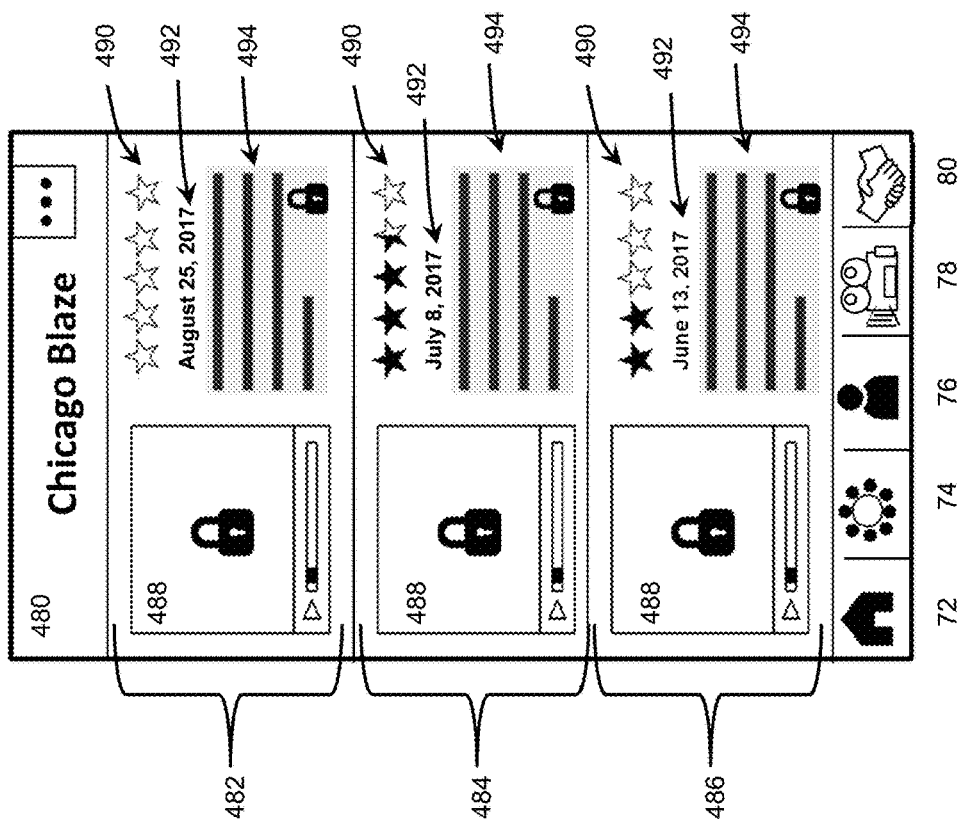
FIG. 60A is a top view of an embodiment of the provider interface of the programmed device, illustrating the masking of the videos and text of the reviews.

Continuing with this example, the user selected the Chicago Blaze club 478. In response, the programmed device 120 displayed the provider interface 480 as illustrated in FIG. 60A. The provider interface 480 displayed a plurality of review interfaces 482, 484, 486. Each of the review interfaces 482, 484, 486 is associated with a compilation video or other video produced by a user through the video generator 28 as described above. In this embodiment, each review interface 482, 484, 486 displays a locked mode by default as follows: (a) a video area 488 that is blank or otherwise masks the applicable video; (b) a star rating 490; (c) a review date 492; and (d) a text area 494 that is bank or masks the text of the applicable review. To unlock the reviews, the user can select a service plan from a plurality of different service plans 497 displayed by the review unlock interface 499 as illustrated in FIG. 60B. The user can then pay for and purchase a selected one of the plans by selecting the purchase element 498. After the user makes the payment, the programmed device 120 transitions to the unlocked mode.

Figure 61B:
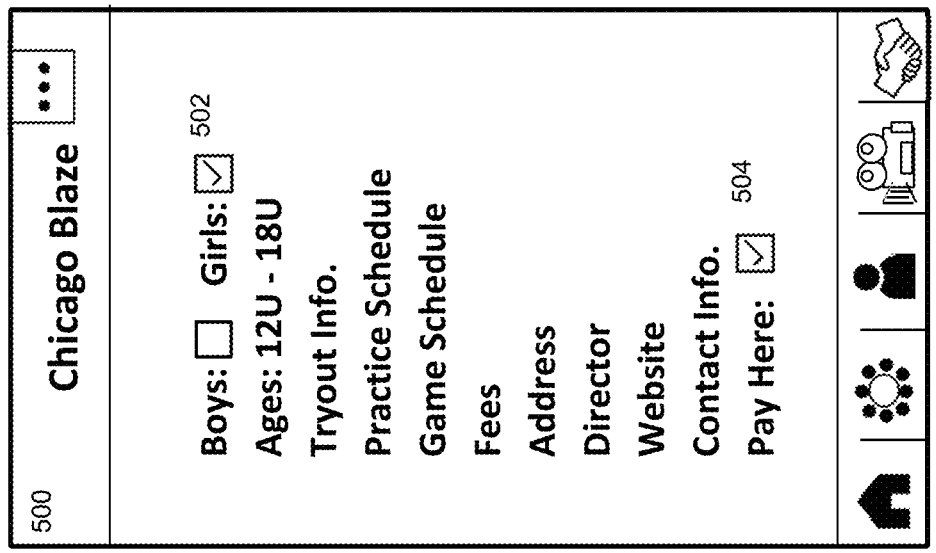
FIG. 61B is a top view of an embodiment of the provider profile of the programmed device.
Figure 61A:
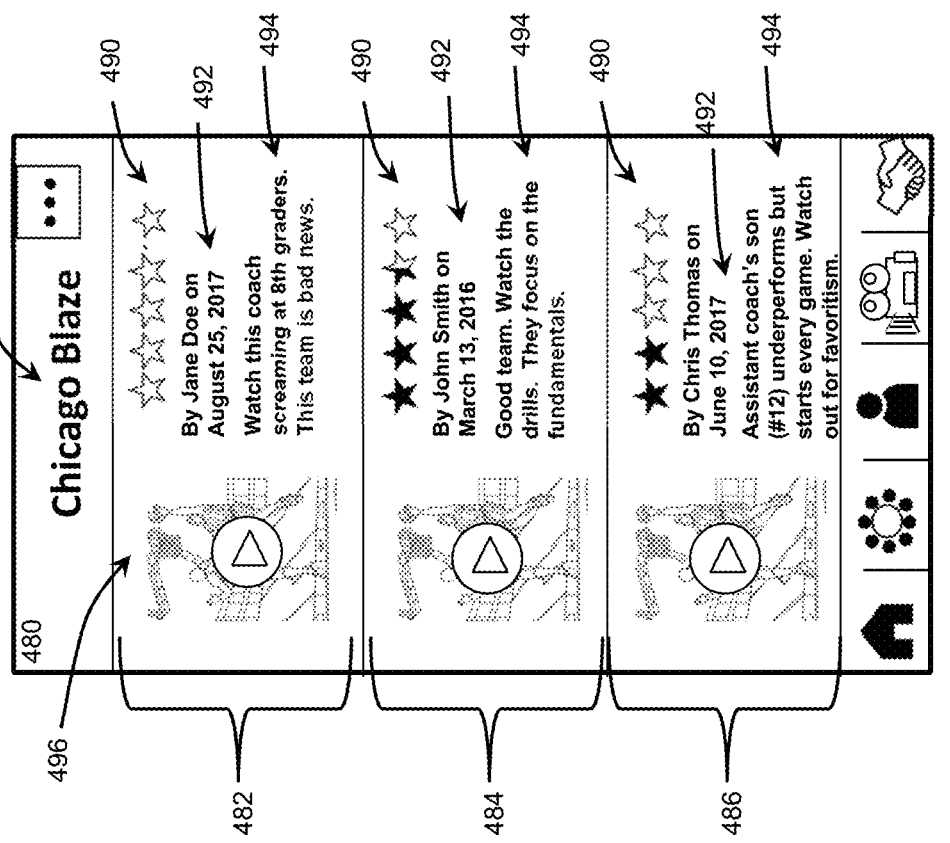
FIG. 61A is a top view of an embodiment of the provider interface of FIG. 60A, illustrating the unmasked videos and text of the reviews.

In the example shown in FIG. 61A, the programmed device 120 unmasked the reviews and videos within the review interfaces 482, 484, 486 (FIG. 60A). For example, the review interface 482 states, "By Jane Doe on Aug. 25, 2017. Watch this coach screaming at 8th graders. This team is bad news." The review interface 482 also includes a compilation video 496 produced by Jane Doe. The compilation video 496 shows the coach exhibiting the screaming behavior during a practice or game of the Chicago Blaze.

For parents of participants under the age of eighteen, it can be difficult to research and identify suitable organizations for their children. For example, most parents of student athletes rely on word-of-mouth information regarding AAU teams. This is because there is little online information regarding many of these teams, and there is no readily-accessible, reliable resource that provides transparency into the team activities or otherwise facilitates the integrity, accuracy and objectivity of the information. Consequently, parents often mistakenly select AAU teams that are lead or coached by adults who are lacking in ethics and competence or who engage in nepotism. This exposes children and youth to hostile environments involving bullying by coaches, embarrassment or ridicule by coaches, poor role models of coaches engaged in fighting, profanity and confrontations with referees and others, physical and psychological abuse by coaches and other acts that are harmful to the self esteem and development of children and youth. The provider interface 480 (FIG. 60A) provides an improvement to help overcome this problem. For example, the provider interface 480 enables parents to see inside an organization (e.g., AAU team) by watching truthful, review-based videos generated through the video generator 28 as described above.

If the user is interested in matching-up with, contracting with, joining or otherwise connecting with a provider who is listed through listing element 458 (FIG. 58A), the user can select the provider's name. In the example shown in FIG. 61A, the user selected the Chicago Blaze name 498, and, in response, the programmed device 120 displayed the provider profile 500 regarding the Chicago Blaze club as illustrated in FIG. 61B. The provider profile 500 includes a list of hyperlinks to detailed information regarding the Chicago Blaze club as well as a plurality of selectable options. In this example, the user selected the girls option 502 and the payment element 504. The payment element 504 enables the user to submit an electronic payment to join the Chicago Blaze club.

Conventionally, many providers such as AAU clubs, are not equipped to accept credit card or electronic payments. They require cash payments. The lack of receipts and handling of cash can cause security and fraud risks for payers. In an embodiment, the user can make one-time payments and periodic payments to the listed providers through the provider profile 500. This provides an improvement in security and convenience for athletes, participants and parents.

Figure 62B:
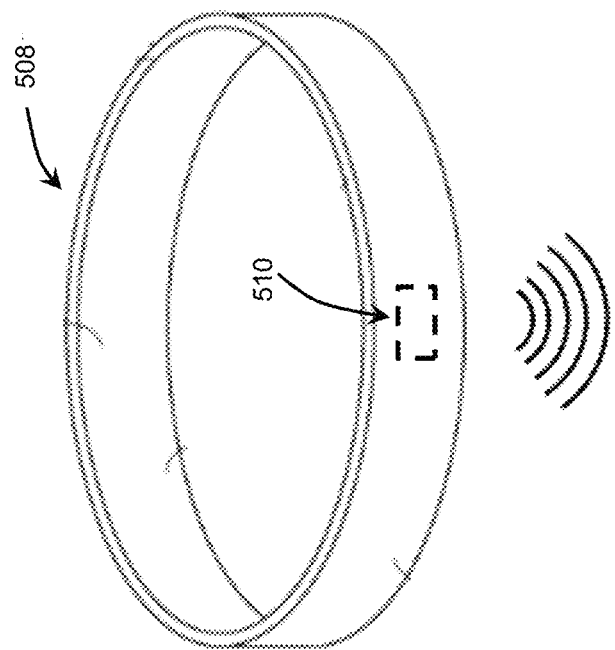
FIG. 62B is an isometric view of an embodiment of a bracelet configured to be operatively coupled to the programmed device.
Figure 62A:
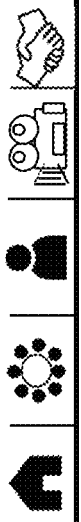
FIG. 62A is a top view of an embodiment of the order interface of the programmed device, illustrating an example of an order for a bracelet.

In an embodiment, the programmed device 120 is operable to display an item order interface 506 as illustrated in FIG. 62A. In the illustrated embodiment, the purchasable item includes a wearable device, a bracelet 508 as illustrated in FIG. 62B. The bracelet 508 includes an electrical element 510. The order interface 506 enables the user to customize the bracelet 508 with the user's name, a desired slogan, expression or quote, and the desired color. By selecting the payment element 512, the user can pay for and order the bracelet 508.

Figure 63B:
FIG. 63B is a top view of an embodiment of a shoestring tag configured to be operatively coupled to the programmed device.
Figure 63C:
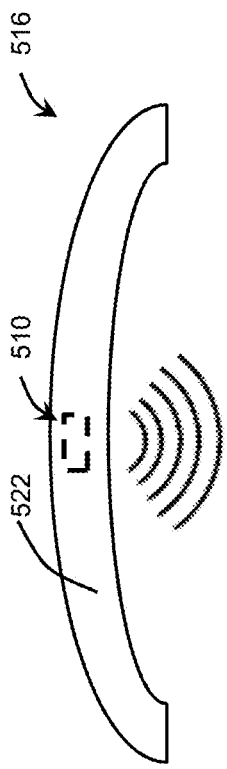
FIG. 63C is a schematic side view of the shoestring tag of FIG. 63B.
Figure 63A:
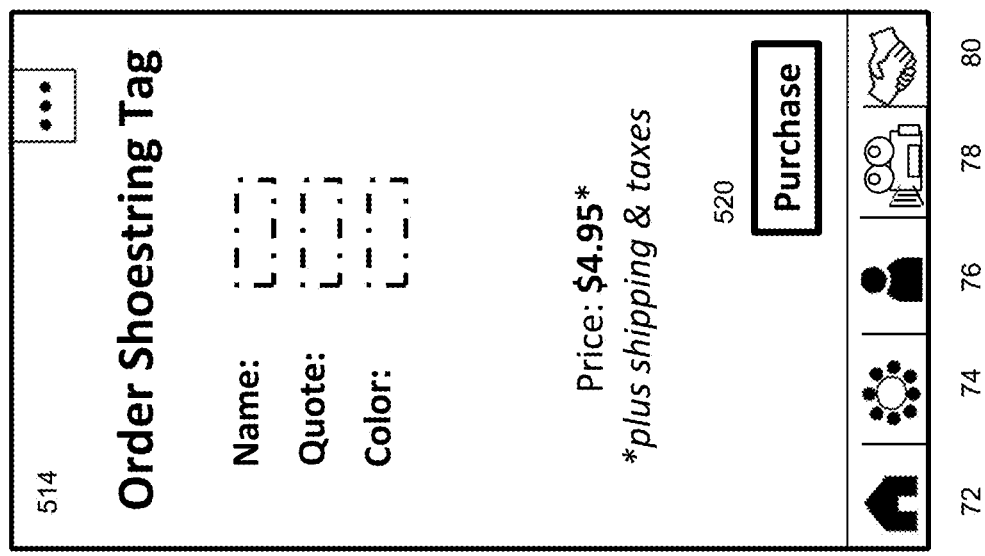
FIG. 63A is a top view of an embodiment of another order interface of the programmed device, illustrating an example of an order for a shoestring tag.

In an embodiment, the programmed device 120 is operable to display an item order interface 514 as illustrated in FIG. 63A. In the illustrated embodiment, the purchasable item includes a wearable device, a shoestring tag 516 as illustrated in FIGS. 63B and 63C. The shoestring tag 516 includes an electrical element 510. The order interface 514 enables the user to customize the shoestring tag 516 with the user's name (e.g., "J. SMITH"), an identification or member ID number (e.g., "#2849") generated by the system 13, a desired slogan, expression or quote (e.g., "NEVER QUIT"), and the desired color. By selecting the payment element 520, the user can pay for and order the shoestring tag 516.

In this embodiment, the shoestring tag 516 includes a body 522 that defines a plurality of fasteners or couplers which, in the example shown, include string receiving holes 524, 526. The body 522 has a downwardly-curved, arc shape as shown. It should be appreciated, however, that the body 522 can be flat, wavy or have any other suitable shape. As shown in FIG. 64A, the string receiving holes 524, 526 are configured to receive segments 528, 530, respectively, of a shoestring 536 of a shoe 534. The shoestring tag 516 is removably coupled to the shoestring 536 which, in turn, is removably coupled to the shoe 534.

In an embodiment, the electrical element 510 includes: (a) an antenna, transmitter or radiator operable to generate a wireless signal, such as a suitable RF; (b) a receiver operable to receive such a wireless signal; (c) a transceiver operable to generate and receive such a wireless signal; (d) a sensor operable to monitor or detect events and conditions related to the user who is wearing the bracelet 508 or shoestring tag 516 or the environment in which the user is running, walking, standing or participating; or (e) a memory unit operable to store data. In an embodiment, the electrical element 510 includes any suitable combination of the foregoing components. In an embodiment, the sensor has circuitry, including a data processor and memory, configured to sense foot speed, acceleration, impact, stress, fastest speed, the heights of jumps, biometric activity of the wearer and other performance-related factors that occur throughout the game or event.

In an embodiment, the electrical element 510 has circuitry coupled to a miniature battery power source. In another embodiment, the electrical element 510 includes a passive radio-frequency identification ("RFID") module having a circuit configured to: (a) store and process information that modulates and demodulates external RF signals; (b) a power receiver operable to receive electrical power from the external RF signals; and (c) a transceiver operable to receive and transmit the RF signals.

The electrical element 510 is configured to communicate with or transmit signals to one or more external transceivers. Depending upon the embodiment, the external transceivers can be components of one or more programmed devices 120 or components of one or more sensors installed in the facility where the wearer is performing. In an embodiment, each external transceiver includes an RF transceiver operable to send high frequency RF signals to, and receive high frequency RF signals from, the electrical element 510.

Figure 65:
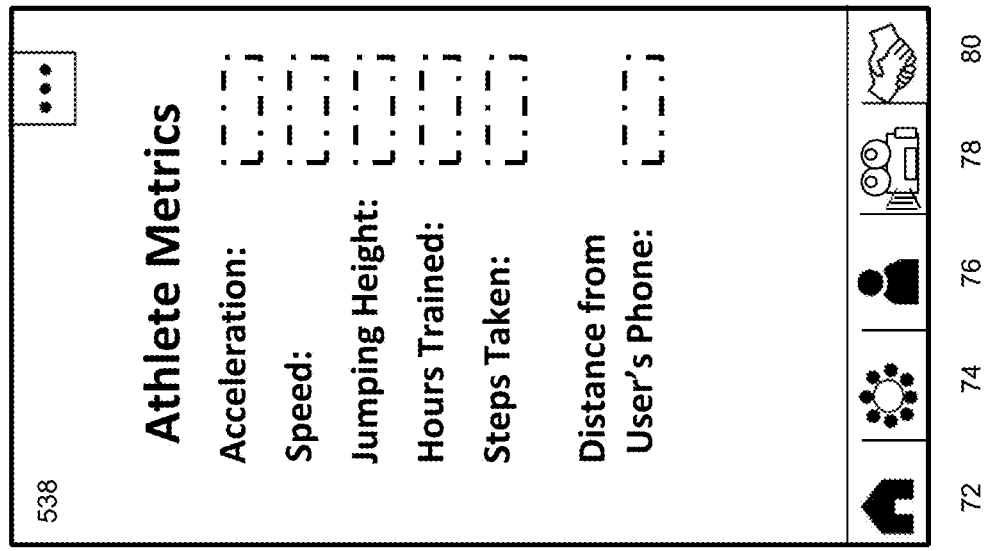
FIG. 65 is a top view of an embodiment of the athlete metrics interface of the programmed device.

In operation of an example, an athlete installs the shoestring tag 516 on the athlete's shoe 534 as illustrated in FIG. 64. The shoestring tag 516 is operable to receive and respond to a signal generated by an external RF transceiver, such as a programmed device 120 that is paired with the shoestring tag 516. A member of the audience, such as a parent of the athlete, is seated in bleachers holding the programmed device 120. The programmed device 120 wirelessly communicates with the shoestring tag 516. The electrical element 510 senses and stores information regarding the athlete's performance throughout the game. The programmed device 120 communicates with the shoestring tag 516 to receive such information. For example, as illustrated in FIG. 65, the programmed device 120 generates the athlete metrics interface 538. Based on the information received from the shoestring tag 516, the athlete metrics interface 538 displays data, including: the peak acceleration or history of accelerations; peak speed or history of speeds; peak vertical jumping height or history of jumping heights; playing time or hours trained; steps taken; and distance from the programmed device 120 to the shoestring tag 516.

Figure 66:
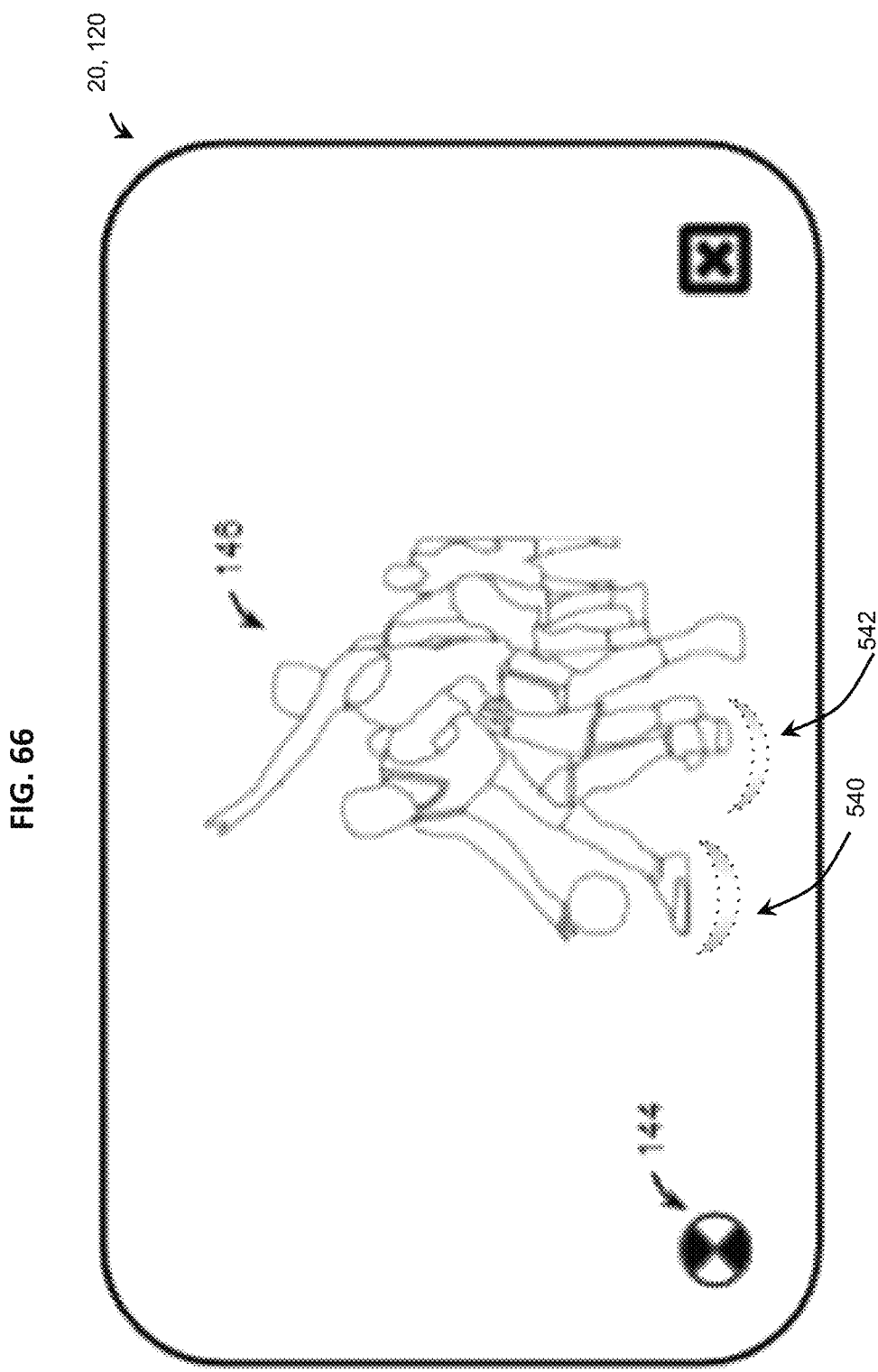
FIG. 66 is a top view of an embodiment of certain video footage (e.g., the dribbling player's feet) tracked by the tracking images generated by the programmed device.

In another embodiment, the electrical element 510 is configured to generate an energy signature, such as an RF signature, infrared light or other light within the invisible spectrum. In this embodiment, the programmed device 120 has a thermal imaging device, infrared radiation reader, video camera or other sensor that is configured to continuously track and detect the energy signature. Using the energy signature, the video generator 28 (FIG. 1) generates a tracking image on or adjacent to the video-recorded image of the participant in the event. In the example shown in FIG. 66, the video generator 28 generates the tracking images 540, 542 under the athlete's feet. It should be appreciated that the tracking images 540, 542 can have any other shape or color, including, but not limited to, circle, square, rectangle, star, translucent color, yellow, red or other graphical indications. As the wearer moves about the court, the tracking images 540, 542 also move, following the wearer. This provides an improvement by assisting video viewers with identifying the spotlighted athlete amongst a group of other athletes.

In an embodiment illustrated in FIG. 67, the video generator 28 is configured to generate an animation set 544 having a plurality of different animations of the tracking images 540, 542. The animations vary with the athlete's actual performance, which is recorded based on the stats collected by the programmed device 120. In the example shown, animation A (foot highlight) corresponds to a default mode, animation B1 (foot smoke) corresponds to a streak of two shots made by the tracked athlete, animation B2 (foot fire) corresponds to a streak of three shots made by the tracked athlete, animation B3 (foot blaze) corresponds to the tracked player achieving twenty points, animation C1 (foot snowflakes) corresponds to a streak of three shots missed by the tracked player, animation C2 (foot ice cubes) corresponds to over three turnovers by the tracked player, and animation C3 (foot icicles) corresponds to the tracked player having a ratio of made shots to missed shots (or shooting percentages) that is below a designated threshold.

Depending upon the embodiment, the network 16 can include one or more of the following: a wired network, a wireless network, an LAN, an extranet, an intranet, a WAN (including, but not limited to, the Internet), a virtual private network ("VPN"), an interconnected data path across which multiple devices may communicate, a peer-to-peer network, a telephone network, portions of a telecommunications network for sending data through a variety of different communication protocols, a Bluetooth® communication network, an RF data communication network, an IR data communication network, a satellite communication network or a cellular communication network for sending and receiving data through short messaging service ("SMS"), multimedia messaging service ("MMS"), hypertext transfer protocol ("HTTP"), direct data connection, Wireless Application Protocol ("WAP"), email or any other suitable message transfer service or format.

In an embodiment, such one or more processors (e.g., processor 14) can include a data processor or a central processing unit ("CPU"). Each such one or more data storage devices can include, but is not limited to, a hard drive with a spinning magnetic disk, a Solid-State Drive ("SSD"), a floppy disk, an optical disk (including, but not limited to, a CD or DVD), a Random Access Memory ("RAM") device, a Read-Only Memory ("ROM") device (including, but not limited to, programmable read-only memory ("PROM"), electrically erasable programmable read-only memory ("EPROM"), electrically erasable programmable read-only memory ("EEPROM"), a magnetic card, an optical card, a flash memory device (including, but not limited to, a USB key with non-volatile memory, any type of media suitable for storing electronic instructions or any other suitable type of computer-readable storage medium. In an embodiment, an assembly includes a combination of: (a) one or more of the databases 12 that store the system 13; and (b) one or more of the foregoing processors (e.g., processor 14).

Referring to FIG. 1, the users of the system 13 can use or operate any suitable input/output (I/O) device to transmit inputs to processor 14 and to receive outputs from processor 14, including, but not limited to, any of the devices 20 (FIG. 1). Depending upon the embodiment, the devices 20 can include a personal computer (PC) (including, but not limited to, a desktop PC, a laptop or a tablet), smart television, Internet-enabled TV, person digital assistant, smartphone, cellular phone or mobile electronic device. In one embodiment, such I/O device has at least one input device (including, but not limited to, a touchscreen, a keyboard, a microphone, a sound sensor or a speech recognition device) and at least one output device (including, but not limited to, a speaker, a display screen, a monitor or an LCD).

In an embodiment, the system 13 includes computer-readable instructions, algorithms and logic that are implemented with any suitable programming or scripting language, including, but not limited to, C, C++, Java, COBOL, assembler, PERL, Visual Basic, SQL Stored Procedures or Extensible Markup Language (XML). The system 13 can be implemented with any suitable combination of data structures, objects, processes, routines or other programming elements.

In an embodiment, the interfaces displayable by the devices 20 can include GUIs structured based on any suitable programming language. Each GUI can include, in an embodiment, multiple windows, pull-down menus, buttons, scroll bars, iconic images, wizards, the mouse symbol or pointer, and other suitable graphical elements. In an embodiment, the GUIs incorporate multimedia, including, but not limited to, sound, voice, motion video and virtual reality interfaces to generate outputs of the system 13 or the device 20.

In an embodiment, the memory devices and data storage devices described above can be non-transitory mediums that store or participate in providing instructions to a processor for execution. Such non-transitory mediums can take different forms, including, but not limited to, non-volatile media and volatile media. Non-volatile media can include, for example, optical or magnetic disks, flash drives, and any of the storage devices in any computer. Volatile media can include dynamic memory, such as main memory of a computer. Forms of non-transitory computer-readable media therefore include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, or any other medium from which a computer can read programming code and/or data. Many of these forms of computer readable media may be involved in carrying one or more sequences of one or more instructions to a processor for execution. In contrast with non-transitory mediums, transitory physical transmission media can include coaxial cables, copper wire and fiber optics, including the wires that comprise a bus within a computer system, a carrier wave transporting data or instructions, and cables or links transporting such a carrier wave. Carrier-wave transmission media can take the form of electric or electromagnetic signals, or acoustic or light waves such as those generated during RF and IR data communications.

It should be appreciated that at least some of the subject matter disclosed herein includes or involves a plurality of steps or procedures. In an embodiment, as described, some of the steps or procedures occur automatically or autonomously as controlled by a processor or electrical controller without relying upon a human control input, and some of the steps or procedures can occur manually under the control of a human. In another embodiment, all of the steps or procedures occur automatically or autonomously as controlled by a processor or electrical controller without relying upon a human control input. In yet another embodiment, some of the steps or procedures occur semi-automatically as partially controlled by a processor or electrical controller and as partially controlled by a human.

It should also be appreciated that aspects of the disclosed subject matter may be embodied as a method, device, assembly, computer program product or system. Accordingly, aspects of the disclosed subject matter may take the form of an entirely hardware embodiment, an entirely software embodiment (including firmware, resident software, micro-code, etc.), or an embodiment combining software and hardware aspects that may all, depending upon the embodiment, generally be referred to herein as a "service," "circuit," "circuitry," "module," "assembly" and/or "system." Furthermore, aspects of the disclosed subject matter may take the form of a computer program product embodied in one or more computer readable mediums having computer readable program code embodied thereon.

Aspects of the disclosed subject matter are described herein in terms of steps and functions with reference to flowchart illustrations and block diagrams of methods, apparatuses, systems and computer program products. It should be understood that each such step, function block of the flowchart illustrations and block diagrams, and combinations thereof, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create results and output for implementing the functions described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions described herein.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. A method comprising:
providing a plurality of computer-readable instructions that are executable to cause an electronic device to perform a plurality of steps, wherein the steps comprise:
storing a cutback time value;
receiving a start input to record an event involving a participant;
starting a recording session to record the event, wherein the recording of the event results in a video track;
during the recording session:
generating a data list comprising a series of timestamps in chronological order based on a time increment;
receiving a first clip input while the data list is being generated; and
in response to the first clip input:
determining a first one of the timestamps that coincides with an occurrence of the first clip input;
applying the cutback time value to the first timestamp to determine a first rearward one of the timestamps, wherein the first rearward timestamp chronologically occurs before the first timestamp; and determining a first ending one of the timestamps, wherein the first ending timestamp chronologically occurs at or after the first timestamp;

determining a first clip section of the video track, wherein the first clip section: (a) starts at the first rearward timestamp; and (b) ends at the first ending timestamp, wherein the video track comprises an excess section that precedes the first rearward timestamp, wherein the first clip section comprises a first clip length that depends on the cutback time value;

receiving a second clip input while the data list is being generated;

in response to the second clip input:
  determining a second one of the timestamps that coincides with an occurrence of the second clip input;
  applying the cutback time value to the second timestamp to determine a second rearward one of the timestamps, wherein the second rearward timestamp chronologically occurs before the second timestamp; and
  determining a second ending one of the timestamps, wherein the second ending timestamp chronologically occurs at or after the second timestamp; and determining a second clip section of the video track, wherein the second clip section: (a) starts at the second rearward timestamp; and (b) ends at the second ending timestamp, wherein the second clip section comprises a second clip length that depends on the cutback time value;

before or after the recording session, receiving information associated with a first output, wherein the first output comprises one of a visual output or an audio output; and generating a video that: (a) comprises the first and second clip sections, wherein the first and second clip sections are associated with a second output; (b) comprises the received information; and (c) excludes at least the excess section of the video track wherein the video, when played, outputs the first output and the second output.

2. One or more data storage devices comprising:
a plurality of computer-readable instructions that are executable to cause an electronic device to:
receive a start input to record an event involving a participant;
start a recording session, wherein the recording session results in a video track;
during the recording session:
  receive a plurality of clip inputs at different points in time; and
  in response to each of the clip inputs, store a set of bookmarks associated with each one of the clip inputs, wherein the set comprises a rearward bookmark and an ending bookmark, wherein the rearward bookmark of the set comprises a chronological position located before the point in time of the clip input associated with the set, wherein the chronological position depends on a time value stored in a memory device before the recording session begins, wherein the memory device is operatively coupled to or a part of the electronic device;
extract a clipped section from the video track as a result of each of the clip inputs, thereby resulting in a plurality of clipped sections, wherein the video track comprises at least one non-clipped section;
delete the at least one non-clipped section;
outside of the recording session, receive information associated with a first output, wherein the first output comprises one of a visual output or an audio output; and
process data associated with a video, wherein: (a) the video comprises the extracted clip sections that are associated with a second output; (b) the video comprises the received information; and (c) the video excludes the at least one non-clipped section, wherein the video, when played, outputs the first output and the second output.

3. A method comprising:
providing a program that is configured to be stored by an electronic device comprising an imaging device so that the electronic device is operable in accordance with the program to:
store a time value;
receive a start input to record an event involving a participant;
start a recording session, wherein the recording session results in a video track;
during the recording session:
  receive a plurality of clip inputs at different points in time; and
  store a set of bookmarks associated with each one of the clip inputs, wherein the set of bookmarks comprises a rearward bookmark and an ending bookmark, wherein the rearward bookmark of each of the sets: (a) is determined based on the time value; and (b) occurs before the point in time that coincides with the clip input associated with the set;
extract a clipped section from the video track in response to each of the clip inputs, thereby resulting in a plurality of clipped sections, wherein:
  each of the extracted clipped sections comprises a length;
  the lengths are identical in magnitude;
  the magnitude depends on the time value;
  the magnitude is independent of any user inputs after the recording session starts;
  the extracted clipped sections are associated with a first output; and
  the video track comprises at least one non-clipped section;
delete the at least one non-clipped section;
outside of the recording session, receive information associated with a second output, wherein the second output comprises one of an audio output or a visual output; and
process data associated with a video comprising a plurality of frames, wherein:
  the frames of the video comprise the extracted clip sections and the received information;
  the frames of the video exclude the at least one non-clipped section; and
  the video, when played, outputs the first output and the second output.

4. The method of claim 1, wherein:
the cutback time value is changeable before the recording session begins;
the information comprises one of musical data or textual data; and
the electronic device comprises a mobile device, wherein the mobile device comprises a camera, wherein the computer-readable instructions are executable by the mobile device to control the camera to record the event.

5. The method of claim 1, wherein:
the computer-readable instructions are executable by the electronic device to: (a) cause the first clip section to automatically, continuously extend from the first rearward timestamp to the first ending timestamp; and (b) cause the second clip section to automatically, continuously extend from the second rearward timestamp to the second ending timestamp;
the first clip length remains unchanged during the recording session;
the second clip length remains unchanged during the recording session;
the first clip length is determined independent of any user inputs provided during the recording session; and
the second clip length is determined independent of any user inputs provided during the recording session.

6. The method of claim 1, comprising:
storing a cutforward time value;
during the recording session and in response to the first clip input, applying the cutforward time value to the first timestamp to determine a first forward one of the timestamps, wherein the first forward timestamp chronologically occurs after the first timestamp, wherein the first ending timestamp chronologically occurs at the first forward timestamp, wherein the first clip length depends on the cutback time value and the cutforward time value; and
during the recording session and in response to the second clip input, applying the cutforward time value to the second timestamp to determine a second forward one of the timestamps, wherein the second forward timestamp chronologically occurs after the second timestamp, wherein the second ending timestamp chronologically occurs at the second forward timestamp, wherein the second clip length depends on the cutback time value and the cutforward time value.

7. The method of claim 1, wherein:
the participant can perform a plurality of activities during the event that are associated with a plurality of different statistics;
the first clip input comprise a first single clip input;
the first single clip input is associated with a first one of the statistics;
the first single clip input results in a plurality of first outcomes comprising the first clip section and storing of the first statistic during the recording session;
the second clip input comprise a second single clip input;
the second single clip input is associated with a second one of the statistics; and
the second single clip input results in a plurality of second outcomes comprising the second clip section and storing of the second statistic during the recording session.

8. The method of claim 1, wherein:
the participant can perform a plurality of activities during the event that are associated with a plurality of different statistics;
the first clip input is associated with a first one of the statistics;
the method comprises displaying a first statistics symbol indicating the first statistic;
the method comprises processing a selection of the first statistics symbol after receiving the first clip input;
the method comprises storing of the first statistic;
the second clip input is associated with a second one of the statistics;

the method comprises displaying a second statistics symbol indicating the second statistic;
the method comprises processing a selection of the second statistics symbol after receiving the second clip input; and
the method comprises storing of the second statistic.

9. The method of claim 1, wherein:
the participant can perform a plurality of activities during the event that are associated with a plurality of different statistics; and
the method comprises:
displaying a clipping symbol that is selectable to provide the first and second clip inputs;
displaying a statistic mode symbol that is selectable to activate or deactivate a statistics mode, wherein, in the statistics mode, the electronic device is operable to store a plurality of the statistics during the recording session; and
after the recording session, enabling editing of the stored statistics.

10. The one or more data storage devices of claim 2, wherein the computer-readable instructions are executable to cause the electronic device to delete the at least one non-clipped section during the recording session.

11. The one or more data storage devices of claim 2, wherein:
the video comprises a first video; and
the computer-readable instructions are executable to cause the electronic device to:
generate a second video;
display an interface that comprises a first image associated with the first video, and a second image associated with the second video;
play the first video as a result of the first image being selected for playing;
play the second video as a result of the second image being selected for playing;
send to a first recipient, the first video as a result of the first image being selected for sending; and
send to a second recipient, the second video as a result of the second image being selected for sending.

12. The one or more data storage devices of claim 2, wherein:
a second one of the sets is determined after a first one of the sets is determined; and
the computer-readable instructions are executable to cause the electronic device to:
determine, during the recording session, whether the rearward bookmark of the second set is chronologically located before the ending bookmark of the first set; and
use the ending bookmark of the first set as the rearward bookmark of the second set as result of the rearward bookmark of the second set being chronologically located before the ending bookmark of the first set.

13. The one or more data storage devices of claim 2, wherein:
the time value is changeable before the recording session begins;
the information comprises one of musical data or textual data; and
the electronic device comprises a mobile device, wherein the mobile device comprises a camera, wherein the computer-readable instructions are executable by the mobile device to control the camera to record the event.

14. The one or more data storage devices of claim 2, wherein:

the time value comprises a cutback time value;
the chronological position of the rearward bookmark comprises a rearward chronological position; and
the ending bookmark of the set comprises a forward chronological position located after the point in time of the clip input associated with the set, wherein the forward chronological position depends on a cutforward time value stored in the memory device before the recording session begins.

15. The one or more data storage devices of claim 2, wherein:
the participant can perform a plurality of activities during the event that are associated with a plurality of different statistics;
each of the clip inputs comprises a single clip input;
the single clip input is associated with one of the statistics; and
the single clip input results in a plurality of outcomes comprising one of the clipped sections and storing of the statistic.

16. The one or more data storage devices of claim 2, wherein:
the participant can perform a plurality of activities during the event that are associated with a plurality of different statistics; and
the computer-readable instructions are executable to cause the electronic device to:
display a statistics symbol indicating one of the statistics;
process a selection of the statistics symbol after receiving one of the clip inputs; and
store the statistic during the recording session.

17. The method of claim 3, wherein:
the video comprises a first video; and
the program is executable to cause the electronic device to:
generate a second video;
display an interface that comprises a first image associated with the first video, and a second image associated with the second video;
play the first video as a result of the first image being selected for playing;
play the second video as a result of the second image being selected for playing;
send to a first recipient, the first video as a result of the first image being selected for sending;
send to a second recipient, the second video as a result of the second image being selected for sending; and
change the time value before the recording session begins;
the information comprises one of musical data or textual data; and
the electronic device comprises a mobile device, and the imaging device comprises a camera, wherein the program is executable by the mobile device to control the camera to record the event.

18. The method of claim 3, wherein:
the time value comprises a cutback time value;
the rearward bookmark comprises a rearward chronological position located rearward of the point in time;
the ending bookmark comprises a forward chronological position located after the point in time of the clip input, wherein the forward chronological position is determined based on a cutforward time value; and
the magnitude depends on the cutback time value and the cutforward time value.

19. The method of claim 3, wherein:
the participant can perform a plurality of activities during the event that are associated with a plurality of different statistics; and
the program is executable to cause the electronic device to:
display a statistics symbol indicating one of the statistics;
process a selection of the statistics symbol after receiving one of the clip inputs; and
store the statistic during the recording session.

20. The method of claim 3, wherein:
the participant can perform a plurality of activities during the event that are associated with a plurality of different statistics;
each of the clip inputs comprises a single clip input;
the single clip input is associated with one of the statistics; and
the single clip input results in a plurality of outcomes comprising one of the extracted clipped sections and storing of the statistic.

* * * * *